(12) United States Patent (10) Patent No.: US 12,566,448 B2
Hatano et al. (45) Date of Patent: Mar. 3, 2026

(54) INFORMATION PROCESSING DEVICE, INFORMATION PROCESSING SYSTEM, AND INFORMATION PROCESSING METHOD

(71) Applicant: TOYOTA JIDOSHA KABUSHIKI KAISHA, Toyota (JP)

(72) Inventors: Yasuyoshi Hatano, Nisshin (JP); Kento Iwahori, Nagoya (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 59 days.

(21) Appl. No.: 18/895,677

(22) Filed: Sep. 25, 2024

(65) Prior Publication Data

US 2025/0123628 A1    Apr. 17, 2025

(30) Foreign Application Priority Data

Oct. 16, 2023    (JP) ................................. 2023-178246

(51) Int. Cl.
| | |
|---|---|
| *G06V 10/82* | (2022.01) |
| *G05D 1/243* | (2024.01) |
| *G06V 10/774* | (2022.01) |
| *G06V 10/776* | (2022.01) |
| G05D 101/15 | (2024.01) |
| G05D 107/70 | (2024.01) |

(52) U.S. Cl.
CPC ........... *G05D 1/243* (2024.01); *G06V 10/774* (2022.01); *G06V 10/776* (2022.01); *G05D 2101/15* (2024.01); *G05D 2107/70* (2024.01); *G06V 10/82* (2022.01)

(58) Field of Classification Search
CPC .............. G05D 1/243; G05D 2101/15; G05D 2107/70; G06V 10/774; G06V 10/776; G06V 10/82; G06V 20/54; G06V 20/56; G06V 10/25; G06V 10/764
See application file for complete search history.

(56) References Cited

U.S. PATENT DOCUMENTS

| | | | | | |
|---|---|---|---|---|---|
| 12,154,364 | B2 * | 11/2024 | Ikeda | ...................... | G06V 40/10 |
| 2012/0128204 | A1 * | 5/2012 | Aoba | ...................... | G06F 18/28 |
| | | | | | 382/103 |
| 2017/0320529 | A1 | 11/2017 | Nordbruch | | |
| 2019/0219998 | A1 * | 7/2019 | Harihara Subramanian | ................ | |
| | | | | | G09G 5/00 |
| 2023/0042572 | A1 * | 2/2023 | Mori | ......................... | G06T 7/73 |
| 2023/0059924 | A1 * | 2/2023 | Heinrich | .................. | G06N 3/09 |

FOREIGN PATENT DOCUMENTS

JP        2017-538619  A     12/2017

* cited by examiner

*Primary Examiner* — Richard M Camby

(74) *Attorney, Agent, or Firm* — Oblon, McClelland, Maier & Neustadt, L.L.P.

(57) ABSTRACT

An information processing device used to move a moving object that is capable of moving by unmanned driving includes an accuracy acquisition unit, a training data acquisition unit, and a training unit. The accuracy acquisition unit acquires an accuracy of a machine learning model. The training data acquisition unit acquires a training data group used to train the machine learning model when the accuracy is less than a predetermined threshold. The training unit performs a training process for training the machine learning model using the training data group.

12 Claims, 40 Drawing Sheets

Fig.16

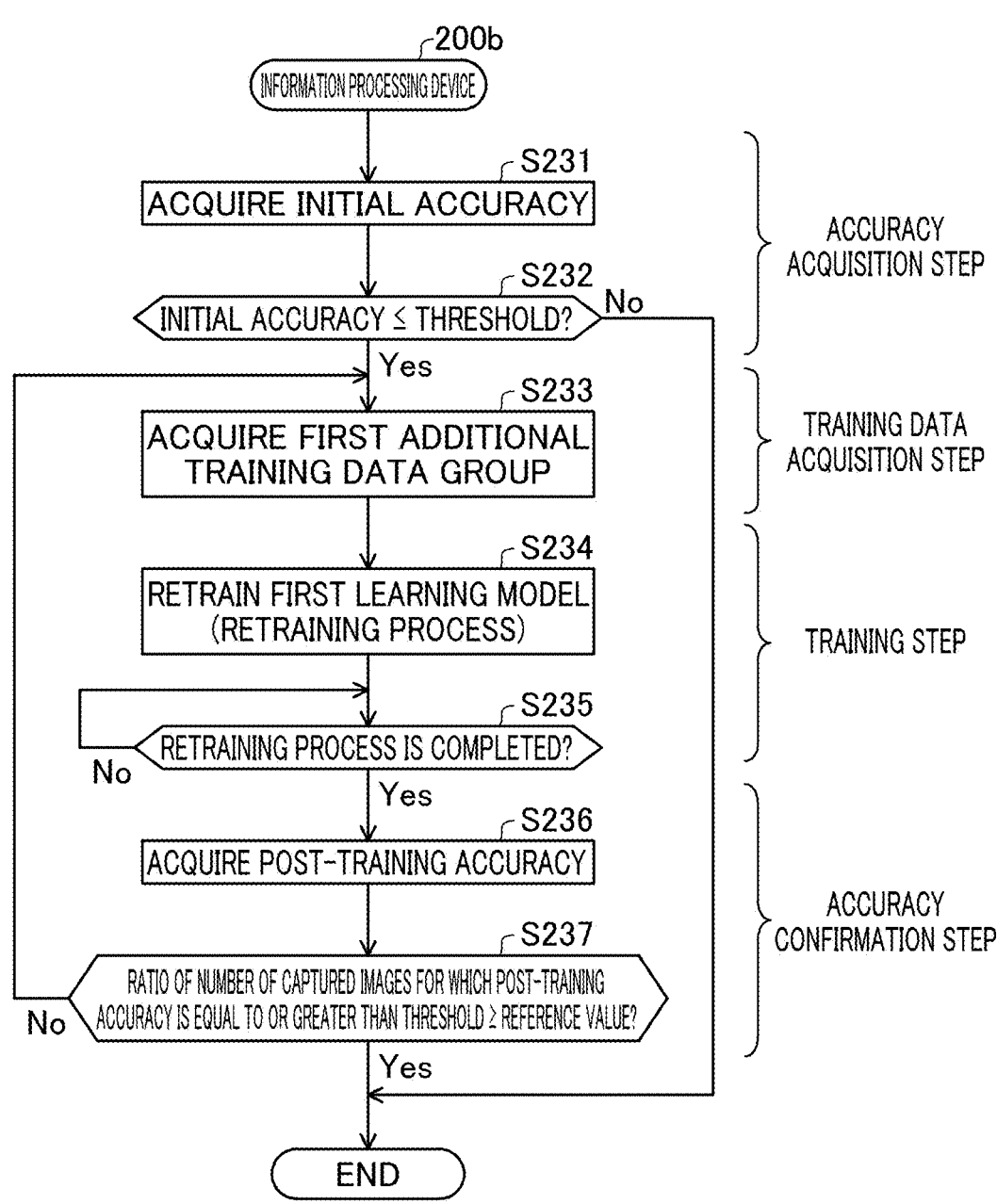

200b

INFORMATION PROCESSING DEVICE

S231
ACQUIRE INITIAL ACCURACY

S232
INITIAL ACCURACY ≤ THRESHOLD?   No

ACCURACY ACQUISITION STEP

Yes

S233
ACQUIRE FIRST ADDITIONAL TRAINING DATA GROUP

TRAINING DATA ACQUISITION STEP

S234
RETRAIN FIRST LEARNING MODEL (RETRAINING PROCESS)

S235
RETRAINING PROCESS IS COMPLETED?

No

TRAINING STEP

Yes

S236
ACQUIRE POST-TRAINING ACCURACY

S237
RATIO OF NUMBER OF CAPTURED IMAGES FOR WHICH POST-TRAINING ACCURACY IS EQUAL TO OR GREATER THAN THRESHOLD ≥ REFERENCE VALUE?

No

ACCURACY CONFIRMATION STEP

Yes

END

1

INFORMATION PROCESSING DEVICE, INFORMATION PROCESSING SYSTEM, AND INFORMATION PROCESSING METHOD

CROSS-REFERENCE TO RELATED APPLICATIONS

This application claims priority to Japanese Patent Application No. 2023-178246 filed on Oct. 16, 2023, which is incorporated herein by reference in its entirety.

BACKGROUND

Field

The present disclosure relates to an information processing device, an information processing system, and an information processing method.

Related Art

Heretofore, a technology for automatic running of vehicles by remote control by monitoring running of the vehicle using a camera located outside the vehicle has been known (Japanese Laid-Open Patent Application (PCT Application) Publication No. 2017-538619).

In order to move a moving object, such as a vehicle, by unmanned driving, in some cases, an image including a moving object captured by a camera is input to a machine learning model, thereby acquiring at least one of a control signal for defining the operation of the moving object and a parameter for generating a control signal. However, if the appearance state of the imaging range of the camera has changed from the appearance state at the time when the machine learning model was trained, the accuracy of the machine learning model may decrease.

SUMMARY (1) According to a first aspect of the present disclosure, an information processing device is provided. An information processing device used to move a moving object that is capable of moving by unmanned driving includes an accuracy acquisition unit, a training data acquisition unit, and a training unit. The accuracy acquisition unit acquires, when a captured image acquired by imaging the moving object by an external cameras provided in places different from a place of the moving object is input, an accuracy of a machine learning model that outputs at least one of a control signal for defining operation of the moving object to move the moving object by the unmanned driving and a parameter used in generating the control signal. The training data acquisition unit acquires a training data group used to train the machine learning model when the accuracy is less than a predetermined threshold. The training unit performs a training process for training the machine learning model using the acquired training data group. The training data group includes one or more training data sets in which a training image is associated with a correct answer label, the training image including a background image representing a target region including a pathway on which the moving object moves and a surrounding area of the pathway and a moving object image representing the moving object.

2

(2) According to a second aspect of the present disclosure, an information processing system is provided. An information processing system used to move a moving object that is capable of moving by unmanned driving includes a moving object, a plurality of external cameras provided in places different from a place of the moving object, and the information processing device according to the above aspect.

(3) According to a third aspect of the present disclosure, an information processing method is provided. An information processing method used to move a moving object that is capable of moving by unmanned driving includes an accuracy acquisition step, a training data acquisition step, and a training step. The accuracy acquisition step includes acquiring, when a captured image acquired by imaging the moving object by an external camera provided in places different from a place of the moving object is input, an accuracy of a machine learning model that outputs at least one of a control signal for defining operation of the moving object to move the moving object by the unmanned driving and a parameter used in generating the control signal. The training data acquisition step includes acquiring a training data group used to train the machine learning model when the accuracy is less than a predetermined threshold. The training step includes performing a training process for training the machine learning model using the acquired training data group. The training data group includes one or more training data sets in which a training image is associated with a correct answer label, the training image including a background image representing a target region including a pathway on which the moving object moves and a surrounding area of the pathway and a moving object image representing the moving object.

BRIEF DESCRIPTION OF THE DRAWINGS

FIG. 16 is a flowchart showing a method for training process in the third embodiment;

DETAILED DESCRIPTION

A. First Embodiment

A-1. Structure of Information Processing System

Figure 1:
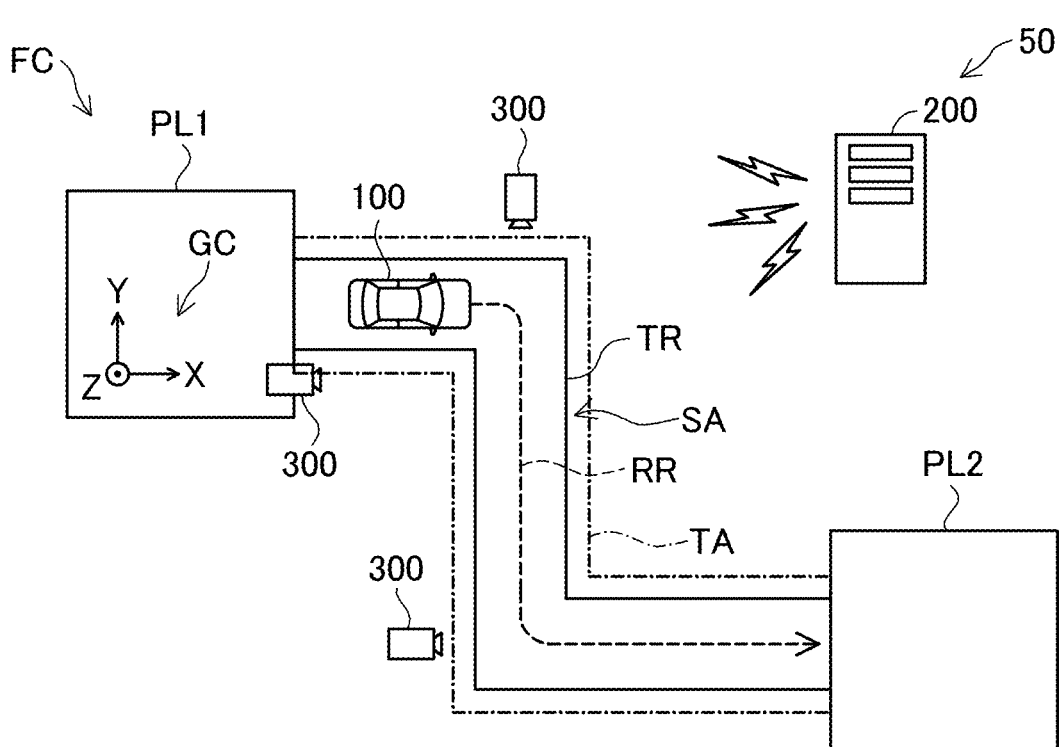
FIG. 1 is a conceptual diagram showing a structure of an information processing system in a first embodiment.

FIG. 1 is a conceptual diagram showing a structure of an information processing system 50 in the first embodiment. The information processing system 50 is a system for moving a moving object without running operation by a passenger riding on the moving object. The information processing system 50 includes one or more moving objects, a plurality of external cameras 300 provided at different places from the moving objects, and an information processing device 200.

In the present disclosure, the "moving object" means an object capable of moving, and is a vehicle 100 or an electric vertical takeoff and landing aircraft (so-called flying-automobile), for example. The vehicle 100 may be a vehicle 100 to run with a wheel or may be a vehicle 100 to run with a continuous track, and may be a passenger car, a track, a bus, a two-wheel vehicle, a four-wheel vehicle, a construction vehicle, or a combat vehicle, for example. The vehicle 100 includes a battery electric vehicle (BEV), a gasoline automobile, a hybrid automobile, and a fuel cell automobile. When the moving object is other than a vehicle 100, the term "vehicle" or "car" in the present disclosure is replaceable with a "moving object" as appropriate, and the term "run" is replaceable with "move" as appropriate.

The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving."

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 10, and "partial autonomous control" by which the vehicle 100 controls a motion of the vehicle 100 autonomously using information received from a device outside the vehicle 100.

In the present embodiment, the information processing system 50 is used in a factory FC where a vehicle 100 is produced. A reference coordinate system of the factory FC is a global coordinate system GC. That is, any location in the factory FC is expressed with X, Y, and Z coordinates in the global coordinate system GC. The factory FC has a first place PL1 and a second place PL2. The first place PL1 and the second place PL2 are connected by a pathway TR on which the vehicle 100 can run. In the factory FC, a plurality of external cameras 300 are provided along the pathway TR. The position of each external camera 300 in the factory FC is adjusted in advance. The vehicle 100 moves from the first place PL1 to the second place PL2 through the pathway TR by unmanned driving.

Figure 2:
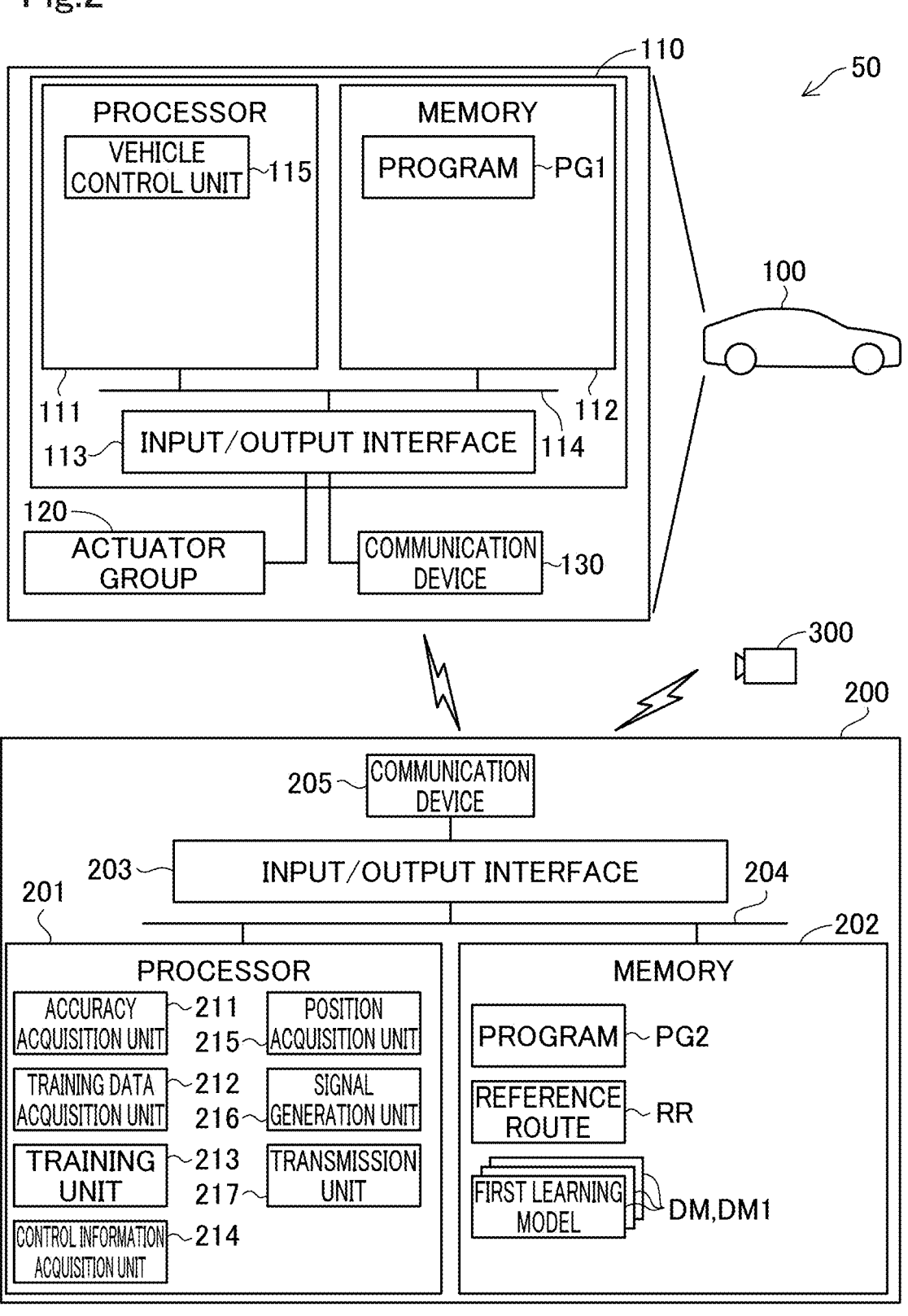
FIG. 2 is a block diagram showing a structure of an information processing system in the first embodiment.

FIG. 2 is a block diagram showing a structure of the information processing system 50. The vehicle 100 includes a vehicle control device 110 for controlling various units of the vehicle 100, an actuator group 120 including one or more actuators driven under the control of the vehicle control device 110, and a communication device 130 for communicating with external devices, such as the information processing device 200, via wireless communication. The actuator group 120 includes an actuator for a driving device for accelerating the vehicle 100, an actuator for a steering device for changing the traveling direction of the vehicle 100, and an actuator for a braking device for decelerating the vehicle 100.

The vehicle control device 110 includes a computer with a processor 111, a memory 112, an input/output interface 113, and an internal bus 114. The processor 111, the memory 112, and the input/output interface 113 are connected via the internal bus 114 to enable bidirectional communication. The actuator group 120 and the communication device 130 are connected to the input/output interface 113. The processor 111 functions as a vehicle control unit 115 by executing a program PG1 stored in the memory 112.

The vehicle control unit 115 controls the actuator group 120 to cause the vehicle 100 to run. The vehicle control unit 115 controls the actuator group 120 using a running control signal received from the information processing device 200, thereby causing the vehicle 100 to run. The running control signal is a control signal for enabling the vehicle 100 to run. The running control signal defines the operation of the vehicle 100 so as to cause the vehicle 100 to move by unmanned driving. In the present embodiment, the running control signal includes the acceleration and the steering angle of the vehicle 100 as parameters. In alternative embodiments, the running control signal may include the speed of the vehicle 100 as a parameter instead of, or in addition to, the acceleration of the vehicle 100.

The information processing device 200 is used to cause the vehicle 100 to run by unmanned driving. The information processing device 200 is, for example, a server provided at a place different from the vehicle 100. The information processing device 200 trains a machine learning model DM, or acquires and uses a machine learning model DM that has already been trained to cause the vehicle 100 to run by unmanned driving. The machine learning model DM outputs at least one of a running control signal and a signal generation parameter in response to input of captured images. The captured images are obtained by capturing images of an imaging range that includes the pathway TR on which the vehicle 100 shown in FIG. 1 runs, a surrounding area SA of the pathway TR, and the vehicle 100 running on the pathway TR, by the external camera 300. Each captured image is either an original image as a detection result output from the external camera 300, or an edited image obtained by editing the original image. The signal generation parameter is a parameter used in the generation of the running control signal. The signal generation parameter is, for example, either vehicle position information, a coordinate value used to acquire at least one of the position and orientation of the vehicle 100, or shape data used to acquire at least one of the position and orientation of the vehicle 100. The vehicle position information is position information that serves as the base in generating the running control signals. In the present embodiment, the vehicle position information includes the position and orientation of the vehicle 100 in the global coordinate system GC of the factory FC. The shape data indicates the exterior shape of the vehicle 100. The shape data is generated by detecting the vehicle 100 from a captured image. The shape data is, for example, a mask image in which a mask region is added to the captured image by masking a region representing the vehicle 100 among the regions constituting the captured image. Each of the regions constituting the captured image is, for example, a single pixel that constitutes the captured image.

As shown in FIG. 2, in the present embodiment, a first learning model DM1 as the machine learning model DM is used to cause the vehicle 100 to run by unmanned driving. The first learning model DM1 outputs the shape data as a signal generation parameter in response to input of a captured image. Therefore, the information processing device 200 acquires the shape data by inputting a captured image to the first learning model DM1. The information processing device 200 then acquires the vehicle position information using the shape data. The information processing device 200 then generates the running control signal using the vehicle position information, or the like, and transmits the running control signal to the vehicle 100. In this way, the information processing device 200 causes the vehicle 100 to run by remote control.

Here, the appearance state of the imaging range may change from the appearance state at the time when the first learning model DM1 was trained in the imaging ranges of some (one or more) of the plurality of external cameras 300. In this case, the detection accuracy is likely to decrease when the vehicle 100 is detected from a captured image(s) acquired by some of the plurality of external cameras 300. Therefore, the information processing device 200 performs the following process if the accuracy of the first learning model DM1 is less than a predetermined threshold when a captured image(s) acquired by some of the plurality of external cameras 300 are input to the first learning model DM1. In this case, the information processing device 200 executes a retraining process to retrain the first learning model DM1 that has already been trained using a training image corresponding to the imaging range of the external camera 300 that acquired the captured image for which accuracy was less than the threshold. The retraining is an example of additional learning. Therefore, the retraining process is an example of additional training process.

The factor affecting the change in the appearance state in the imaging range is, for example, dirt in the target region TA. As shown in FIG. 1, the target region TA is a region that includes the pathway TR on which the vehicle 100 runs and the surrounding area SA of the pathway TR. The factor affecting the change in the appearance state in the imaging range may be irregularities in the target region TA. The irregularities in the target region TA are, for example, depressions on the pathway TR that are generated as a road surface Rs wears down by, for example, an increase in the frequency of running of the vehicle 100. The irregularities in the target region TA may also be protrusions generated in the pathway TR due to rising of the road surface Rs. The factor affecting the change in the appearance state in the imaging range may also be an object other than the vehicle 100 movably disposed in the target region TA. Examples of the object movably disposed in the target region TA include fabrication facility with flexible disposition arrangement, tools such as road cones or signs, and the like. The object movably disposed in the target region TA may be flying objects such as fallen leaves. The factor affecting the change in the appearance state in the imaging range may also be the color of the road surface of the pathway TR. The road surface color of the pathway TR may be, for example, the color of lane marking, such as white lines, the color of the paint of the floor surface including the pathway TR, or the color of the paved road surface Rs. The factor affecting the change in the appearance state in the imaging range may also be the illumination condition of light that illuminates the pathway TR. The illumination condition varies, for example, due to a difference in illuminance depending on the cumulative lighting hours from the time point when the light is first used, a decrease in illuminance due to power supply interruption by power outage, or the like.

The information processing device 200 includes a computer with a processor 201, a memory 202, an input/output interface 203, and an internal bus 204. The processor 201, the memory 202, and the input/output interface 203 are connected via the internal bus 204 to enable bidirectional communication. The input/output interface 203 is connected to a communication device 205 for enabling communication with various devices outside the information processing device 200. The communication device 205 is capable of communication with the vehicle 100 via wireless communication, and is also capable of communication with each of the external cameras 300 via wired or wireless communication.

The memory 202 stores various types of information, including a program PG2 that controls operation of the information processing device 200, a reference route RR, and a plurality of first learning models DM1 prepared for the respective external cameras 300. The memory 202 includes, for example, RAM, ROM, and a hard disk drive (HDD).

The first learning model DM1 is a trained machine learning model DM that utilizes artificial intelligence, and outputs shape data by detecting the exterior shape of the vehicle 100 from the captured image. The first learning model DM1 has been trained in advance by supervised learning using a first initial training data group. The first initial training data group includes a plurality of first initial training data sets corresponding to respective imaging ranges of the plurality of external cameras 300. In each of the plurality of first initial training data sets, a training image including a background image corresponding to the imaging range of the external camera 300 and a vehicle image is associated with a region correct answer label. The background image is an image representing the target region TA. The background image includes the target region TA and does not include the vehicle 100. The vehicle image is an image representing the vehicle 100. In the present embodiment, the training image is a captured image acquired by capturing an image of the vehicle 100 under control of unmanned driving by the external camera 300. The region correct answer label indicates whether each region in the training image is a region representing the vehicle 100 or a region other than the vehicle 100. The region correct answer label is a correct answer label according to the shape data output from the first learning model DM1. As the first learning model DM1, for example, a convolutional neural network (hereinafter referred to as "CNN") for implementing either semantic segmentation or instance segmentation may be used. Upon the training of the CNN, for example, CNN parameters are updated by back-propagation (error back-propagation) to reduce errors between the output result of the first learning model DM1 and the region correct answer label.

The processor 201 functions as an accuracy acquisition unit 211, a training data acquisition unit 212, a training unit 213, a control information acquisition unit 214, a position acquisition unit 215, a signal generation unit 216, and a transmission unit 217, by executing the program PG2 stored in the memory 202.

The accuracy acquisition unit 211 acquires the accuracy of the first learning model DM1, which has been trained in advance using the first initial training data group. The accuracy of the first learning model DM1 is acquired by comparing the output result from the first learning model DM1 with the region correct answer label. The accuracy of the first learning model DM1 is, for example, either the accuracy, precision, recall, or F measure for the first learning model DM1. In the present embodiment, the first learning model DM1 is prepared for each external camera 300. Therefore, the accuracy acquisition unit 211 acquires the accuracy of each of the plurality of first learning models DM1 corresponding to the respective external cameras 300.

The training data acquisition unit 212 performs the following process if the accuracy of the first learning model DM1 is less than a predetermined threshold when captured images acquired by some of the plurality of external cameras 300 are input to the first learning model DM1. In this case, the training data acquisition unit 212 acquires a first additional training data group, which is used to retrain the first learning model DM1 as additional learning. The first additional training data group includes one or more first additional training data sets in which a training image including a background image corresponding to the imaging range of the external camera 300 that acquired the captured image for which accuracy is less than the threshold and a vehicle image is associated with a region correct answer label. In the present embodiment, the first learning model DM1 is prepared for each external camera 300. Therefore, the training data acquisition unit 212 acquires the first additional training data group for retraining the first learning model DM1 having accuracy less than the threshold.

The training unit 213 performs the following process if the accuracy of the first learning model DM1 is less than a predetermined threshold when captured images acquired by some of the plurality of external cameras 300 are input to the first learning model DM1. In this case, the training unit 213 performs a retraining process to retrain the first learning model DM1. As a retraining process, the training unit 213 updates, for example, at least some of the trained parameters of the first learning model DM1. The training unit 213 may also perform, as a retraining process, a process of adding layers of CNN that constitutes the first learning model DM1. In the present embodiment, the first learning model DM1 is prepared for each external camera 300. Therefore, the training unit 213 retrains the first learning model DM1 corresponding to the external camera 300 that acquired the captured image for which accuracy is less than the threshold using the acquired first additional training data group. At this time, the training unit 213 performs the retraining process during the period when control of unmanned driving is performed.

The control information acquisition unit 214 inputs a captured image to the first learning model DM1 to acquire control information, which is at least one of the running control signal and the signal generation parameter. In the present embodiment, the first learning model DM1 is prepared for each external camera 300. Further, the first learning model DM1 is a model that outputs the shape data as the signal generation parameter. Therefore, the control information acquisition unit 214 acquires the shape data by inputting a captured image to the first learning model DM1 corresponding to the external camera 300 that acquired the captured image. At this time, when the retraining process is completed, the control information acquisition unit 214 acquires the shape data by inputting a captured image to the first learning model DM1 that has been trained by the retraining process.

The position acquisition unit 215 acquires vehicle position information. In the present embodiment, the position acquisition unit 215 acquires the vehicle position information using the shape data. In the present embodiment, the position of the vehicle 100 is the position of a positioning point that is set in advance for a specific part of the vehicle 100. The orientation of the vehicle 100 is a direction represented by a vector that runs from the rear side to the front side of the vehicle 100 along the front-rear axis passing through the center of gravity of the vehicle 100.

The signal generation unit 216 generates a running control signal for controlling the actuator group 120 of the vehicle 100. The transmission unit 217 transmits the running control signal to the vehicle 100. In this way, the information processing device 200 causes the vehicle 100 to run by remote control. The processor 201 of the information processing device 200 may generate and output, in addition to the running control signal, for example, a control signal for controlling various auxiliary machines provided in the vehicle 100, as well as actuators for operating various equipment such as wipers, power windows, and lamps. That is, the processor 201 of the information processing device 200 may operate the various equipment and auxiliary machines by remote control.

A-2. Vehicle Running Control Method

Figure 3:
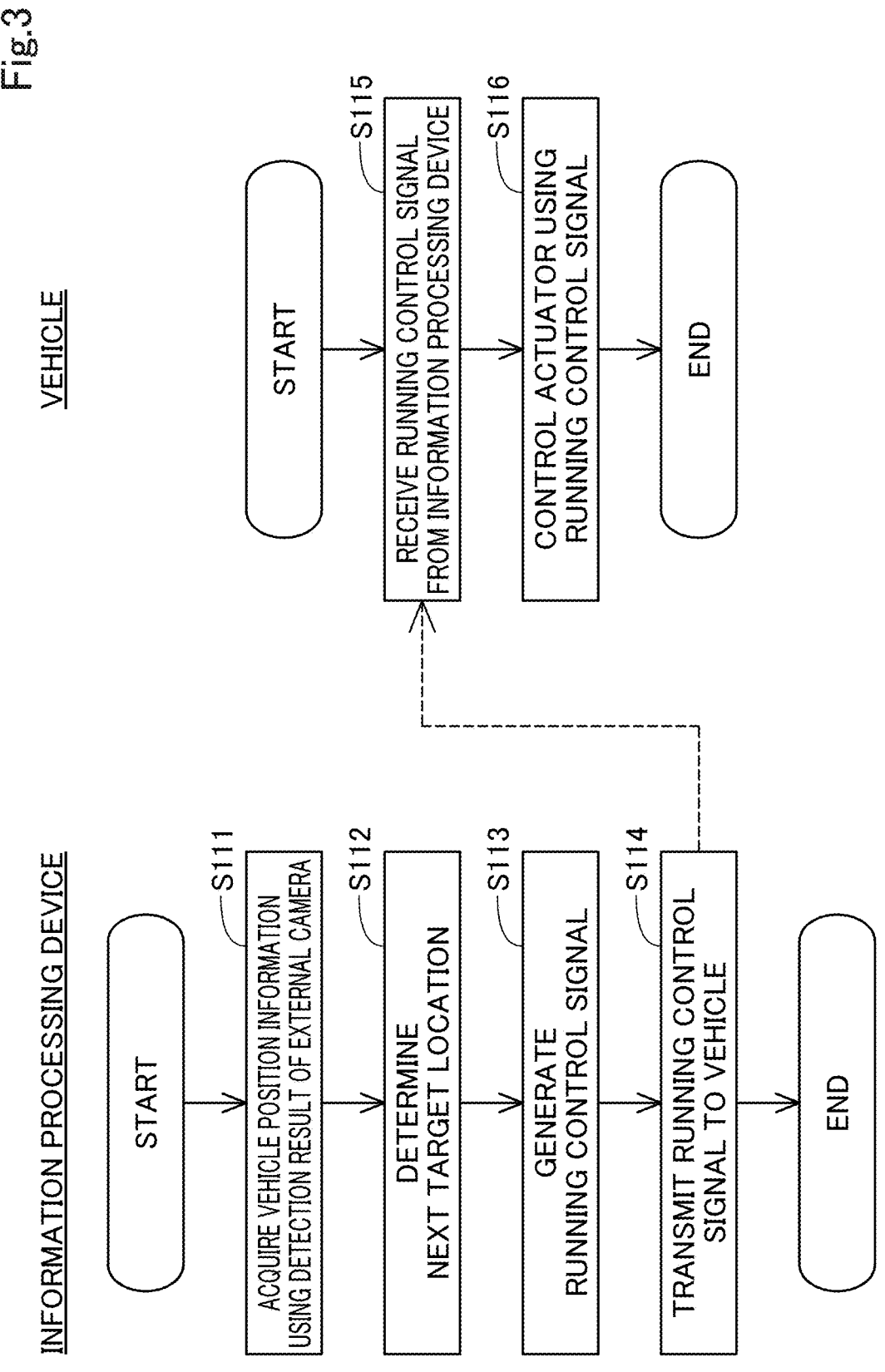
FIG. 3 is a flowchart showing procedures in the process of running control of a vehicle in the first embodiment.

FIG. 3 is a flowchart showing procedures in the process of running control of the vehicle 100 in the first embodiment. The flow shown in FIG. 3 is repeated, for example, every predetermined time from the time point at which the running of the vehicle 100 by unmanned driving is started.

In the step S111, the position acquisition unit 215 acquires the vehicle position information of the vehicle 100 using detection results output from the external camera 300. Specifically, in the step S111, the position acquisition unit 215 acquires the vehicle position information using a captured image acquired from a camera, which is the external camera 300.

Specifically, in the step S111, for example, the position acquisition unit 215 calculates the coordinates of the positioning point of the vehicle 100 in the coordinate system of the captured image, i.e., the local coordinate system, using the shape data acquired by inputting the captured image to the first learning model DM1, and transforms the calculated coordinates to the coordinates in the global coordinate system GC, thereby acquiring the position of the vehicle 100. Further, the position acquisition unit 215 acquires the orientation of the vehicle 100 by performing calculation based on the orientation of the motion vector of the vehicle 100 calculated from the positional changes of the feature points of the vehicle 100 between frames of the captured images using, for example, the optical flow method.

In the step S112, the signal generation unit 216 determines the target location to which the vehicle 100 should go next. In the present embodiment, the target location is expressed in the form of X, Y, Z coordinates in the global coordinate system GC. The memory 202 of the information processing device 200 stores in advance the reference route RR on which the vehicle 100 is supposed to run. The route is represented by a node indicating the departure point, a node indicating the transit point, a node indicating the destination, and a link connecting these nodes. The signal generation unit 216 determines the target location to which the vehicle 100 is supposed to go next using the vehicle position information and the reference route RR. The signal generation unit 216 determines the target location on the reference route RR ahead of the current location of the vehicle 100.

In the step S113, the signal generation unit 216 generates a running control signal to cause the vehicle 100 to run toward the determined target location. The signal generation unit 216 calculates the running speed of the vehicle 100 based on the positional transition of the vehicle 100 and compares the calculated running speed with the target speed. When the running speed is lower than the target speed, generally, the signal generation unit 216 determines the acceleration so that the vehicle 100 increases its speed, and when the running speed is higher than the target speed, the signal generation unit 216 determines the acceleration so that the vehicle 100 decreases its speed. Further, when the vehicle 100 is located on the reference route RR, the signal generation unit 216 determines the steering angle and the acceleration so that the vehicle 100 does not deviate from the reference route RR. When the vehicle 100 is not located on the reference route RR, in other words, when the vehicle 100 deviates from the reference route RR, the signal generation unit 216 determines the steering angle and the acceleration so that the vehicle 100 returns on the reference route RR.

In the step S114, the transmission unit 217 transmits the generated running control signal to the vehicle 100. The processor 201 repeats the acquisition of the position of the vehicle 100, the determination of the target location, the generation of the running control signal, the transmission of the running control signal, and the like, in a predetermined cycle.

In the step S115, the vehicle control unit 115 of the vehicle 100 receives the running control signal transmitted from the information processing device 200. In the step S116, the vehicle control unit 115 controls the actuator group 120 using the received running control signal, thereby causing the vehicle 100 to run at the acceleration and the steering angle indicated by the running control signal. The processor 111 of the vehicle 100 repeats the reception of the running control signal and the control of the actuator group 120 in a predetermined cycle. The information processing system 50 of the present embodiment enables the vehicle 100 to run by remote control, thereby moving the vehicle 100 without using transport equipment, such as a crane, a conveyor, or the like.

A-3. Information Processing Method

Figure 4:
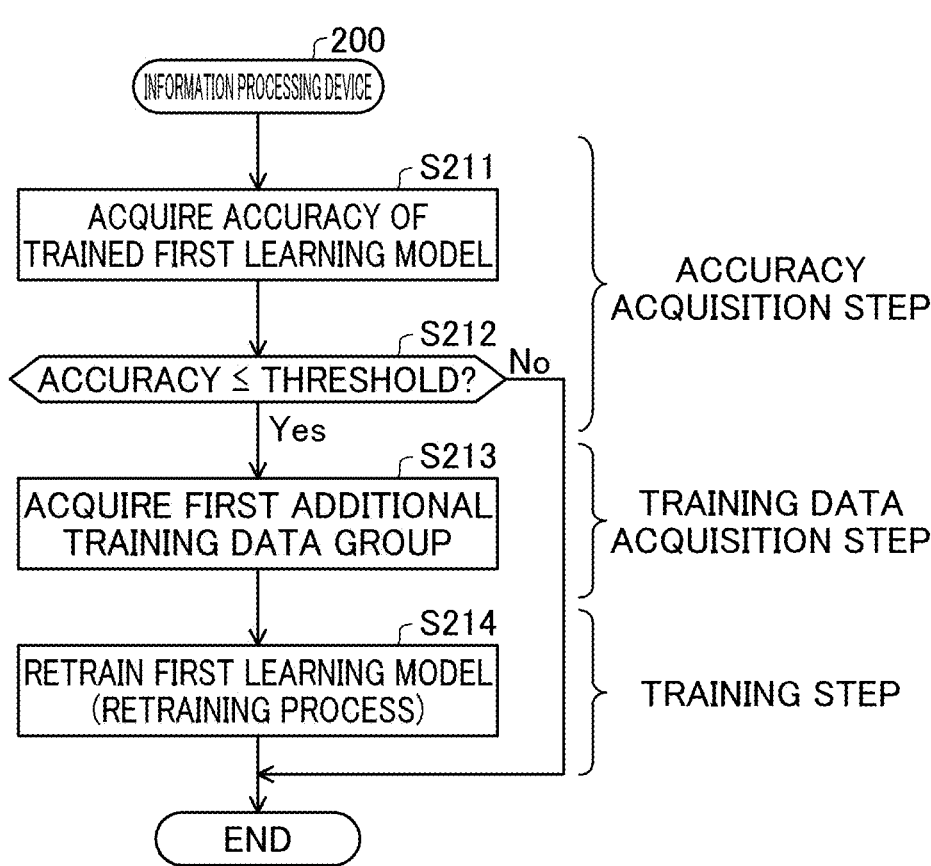
FIG. 4 is a flowchart showing a method for training process in the first embodiment.

FIG. 4 is a flowchart showing a method for training process in the first embodiment. The flow shown in FIG. 4 is repeated, for example, every predetermined time from the time point at which the running of the vehicle 100 by unmanned driving is started.

In an accuracy acquisition step, the accuracy acquisition unit 211 acquires the accuracy of the first learning model DM1, which has been trained in advance using the first initial training data group (step S211). A training data acquisition step is performed if the accuracy of the first learning model DM1 is less than a predetermined threshold when captured images acquired by some of the plurality of external cameras 300 are input to the first learning model DM1 (step S212: Yes). In the training data acquisition step, the training data acquisition unit 212 acquires the first additional training data group (step S213). After the training data acquisition step, a training step is performed. In the training step, the training unit 213 performs the retraining process for retraining the first learning model DM1 using the acquired first additional training data group (step S214). On the other hand, the processor 201 ends the flow without performing the training data acquisition step or the training step if the accuracy of the first learning model DM1 is equal to or greater than a predetermined threshold when captured images acquired by some of the plurality of external cameras 300 are input to the first learning model DM1 (step S212: No).

Figure 5:
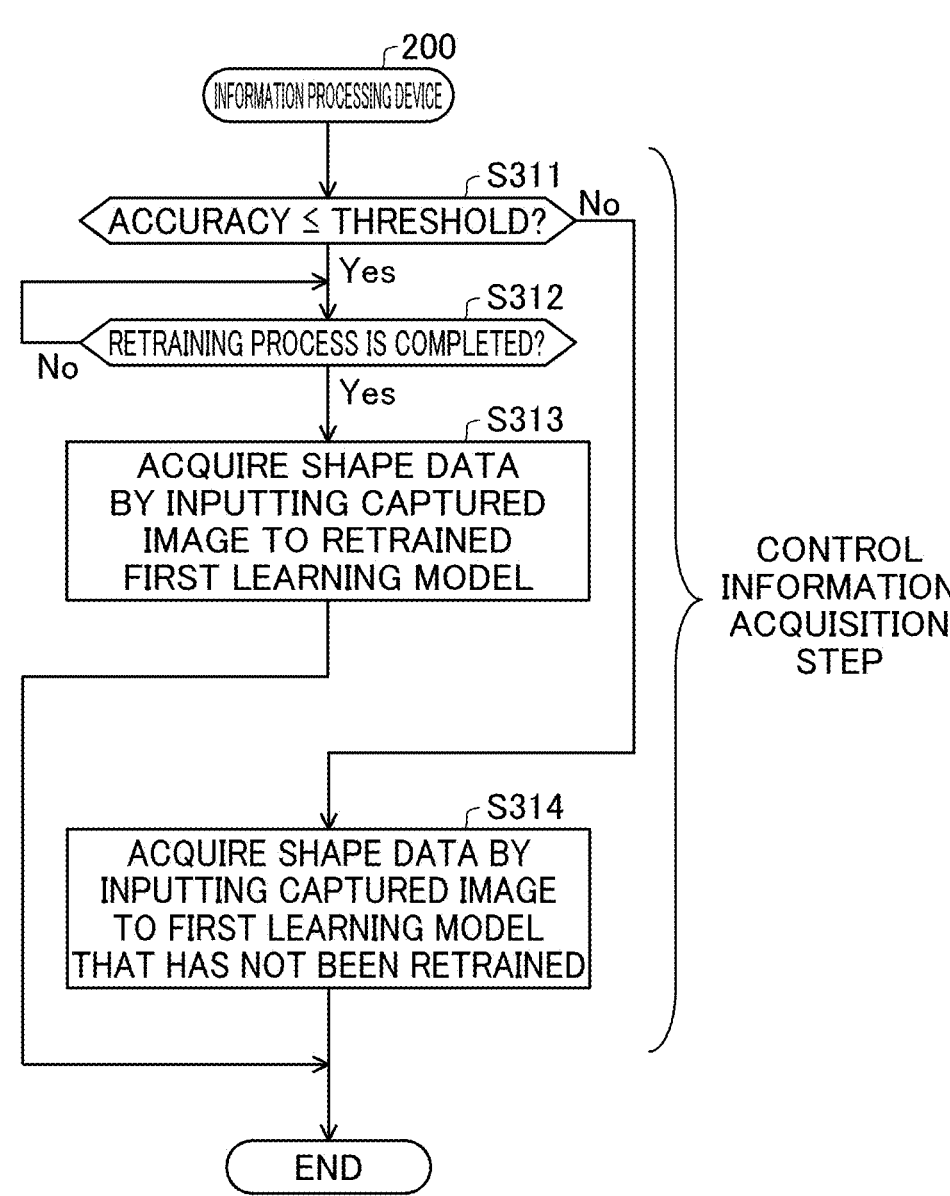
FIG. 5 is a flowchart showing a method for acquiring shape data in the first embodiment.

FIG. 5 is a flowchart showing a method for acquiring shape data in the first embodiment. The flow shown in FIG. 5 is repeated, for example, every predetermined time from the time point at which the running of the vehicle 100 by unmanned driving is started.

In a control information acquisition step, the control information acquisition unit 214 acquires the shape data by performing the following process. Specifically, if the accuracy of the first learning model DM1 is less than a predetermined threshold when captured images acquired by some of the plurality of external cameras 300 are input to the first learning model DM1 (step S311: Yes), when the retraining process is completed (step S312: Yes), the control information acquisition unit 214 acquires the shape data by inputting the captured images to the first learning model DM1 that has been trained by the retraining process (step S313). On the other hand, if the accuracy of the first learning model DM1 is equal to or greater than a predetermined threshold when captured images acquired by some of the plurality of external cameras 300 are input to the first learning model DM1 (step S311: No), the control information acquisition unit 214 acquires the shape data by inputting the captured images to the first learning model DM1 that has not been trained by the retraining process (step S314).

A-4. Vehicle Position Acquisition Method

Figure 6:
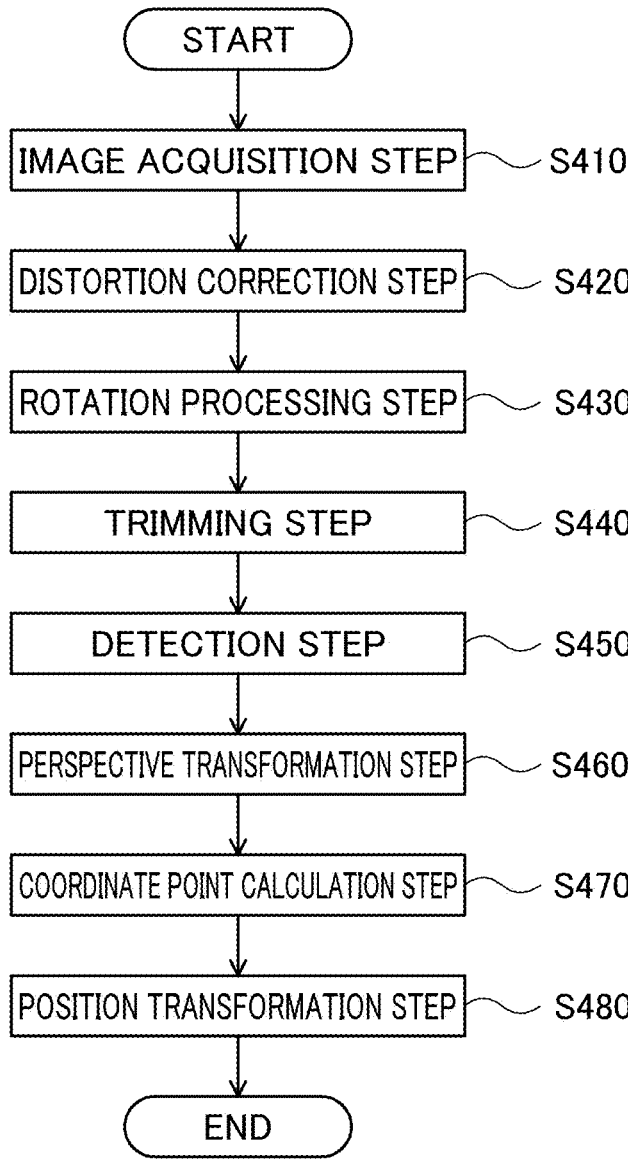
FIG. 6 is a flowchart showing an example of a method for acquiring vehicle position using shape data.
Figure 7:
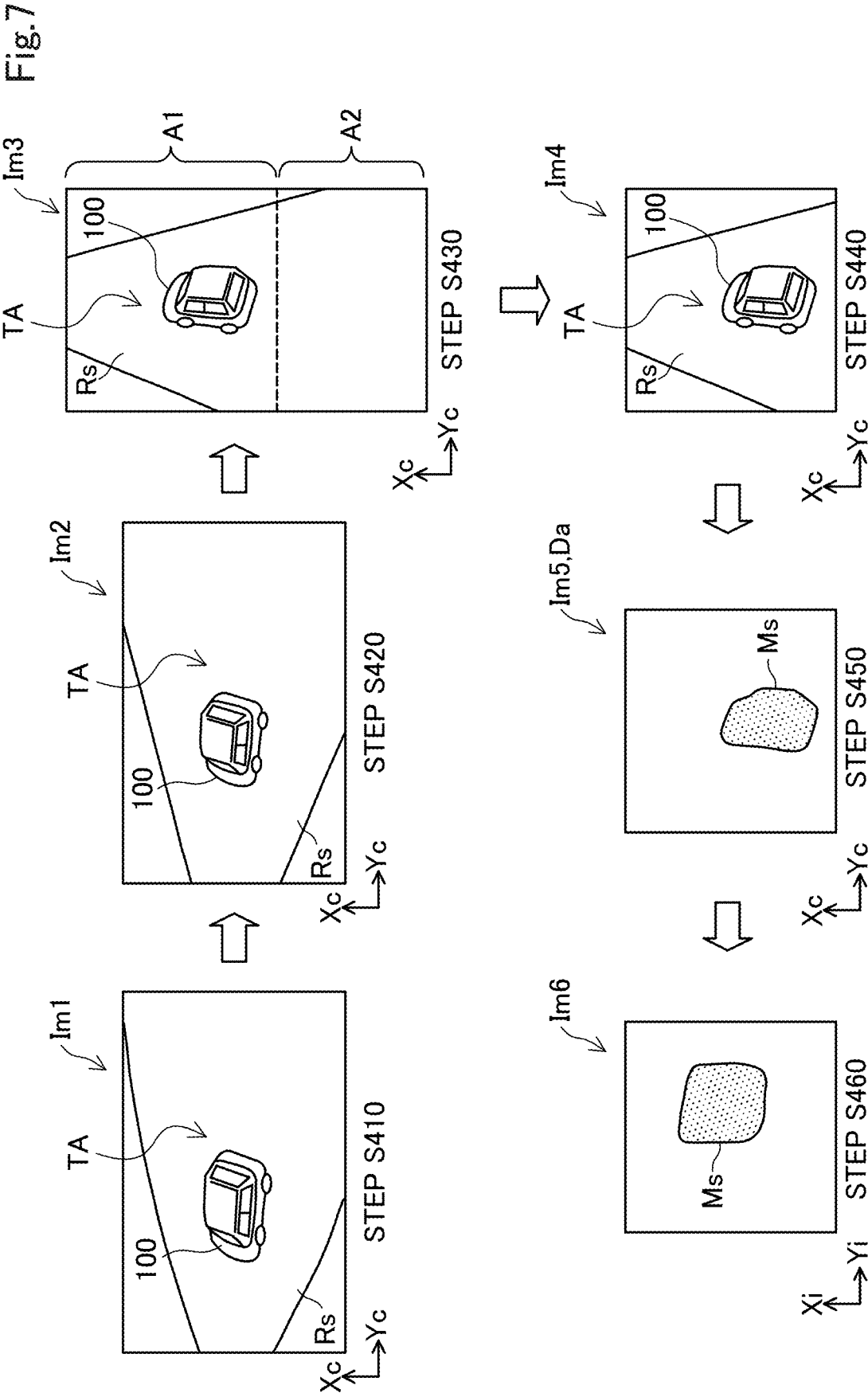
FIG. 7 is a schematic diagram showing examples of various images when the method shown in FIG. 6 is performed.

FIG. 6 is a flowchart showing an example of a method for generating shape data and a method for acquiring position of the vehicle 100 using the shape data. FIG. 7 is a schematic diagram showing examples of various images Im1 to Im6 when the method shown in FIG. 6 is performed. In FIG. 7, each step of FIG. 6 is labelled with a corresponding step number. In the present embodiment, a positioning point 10e of the vehicle 100 is the rear end in the left side surface of the vehicle 100. The positioning point 10e of the vehicle 100 may be a portion other than the rear end in the left side surface of the vehicle 100.

In an image acquisition step (step S410), the control information acquisition unit 214 acquires an original image Im1 output from the external camera 300. In a distortion correction step (step S420), the control information acquisition unit 214 generates a corrected image Im2 as an edited image by correcting distortion of the original image Im1. In a rotation processing step (step S430), the control information acquisition unit 214 rotates the corrected image Im2. In this way, the control information acquisition unit 214 generates a rotated image Im3 as an edited image. In a trimming step (step S440), from among the regions constituting the rotated image Im3, the control information acquisition unit 214 deletes an unnecessary region A2 from the rotated image Im3. The unnecessary region A2 is a region other than a necessary region A1 that includes the vehicle 100 and the surrounding area of the vehicle 100. In this way, the control information acquisition unit 214 generates a processed image Im4 as an edited image. The respective steps from the step S420 to the step S440 are pre-processing steps for improving the detection accuracy when the vehicle 100 is detected from the captured images Im1 to Im4. Therefore, at least one step from the step S420 to the step S440 may be omitted.

In a detection step (step S450), the control information acquisition unit 214 inputs the processed image Im4 to the first learning model DM1. In this way, the control information acquisition unit 214 detects the vehicle 100 from the processed image Im4 and acquires a first mask image Im5 as shape data Da. The first mask image Im5 is an image in which a mask region Ms is added to the processed image Im4 by masking the region representing the vehicle 100 among the regions constituting the processed image Im4.

In a perspective transformation step (step S460), the position acquisition unit 215 generates a second mask image Im6 by subjecting the first mask image Im5 to perspective transformation. The position acquisition unit 215 performs perspective transformation on the first mask image Im5, for example, using a predetermined perspective transformation parameter, thereby generating a bird's-eye view image that is viewed from a viewpoint above the vehicle 100 that is substantially perpendicular to the road surface Rs. The perspective transformation parameter is, for example, a parameter related to the position information and internal parameter of the external camera 300 obtained by calibration. As a result, the position acquisition unit 215 generates the second mask image Im6 represented by the local coordinate system from the first mask image Im5 represented by the camera coordinate system. The camera coordinate system is a coordinate system with the focal point of the external camera 300 as the origin and the coordinate axes indicated by the Xc axis and the Yc axis, which is orthogonal to the Xc axis. The local coordinate system is a coordinate system with one point in the image plane as the origin and the coordinate axes represented by the Xi axis and the Yi axis, which is orthogonal to the Xi axis.

Figure 8:
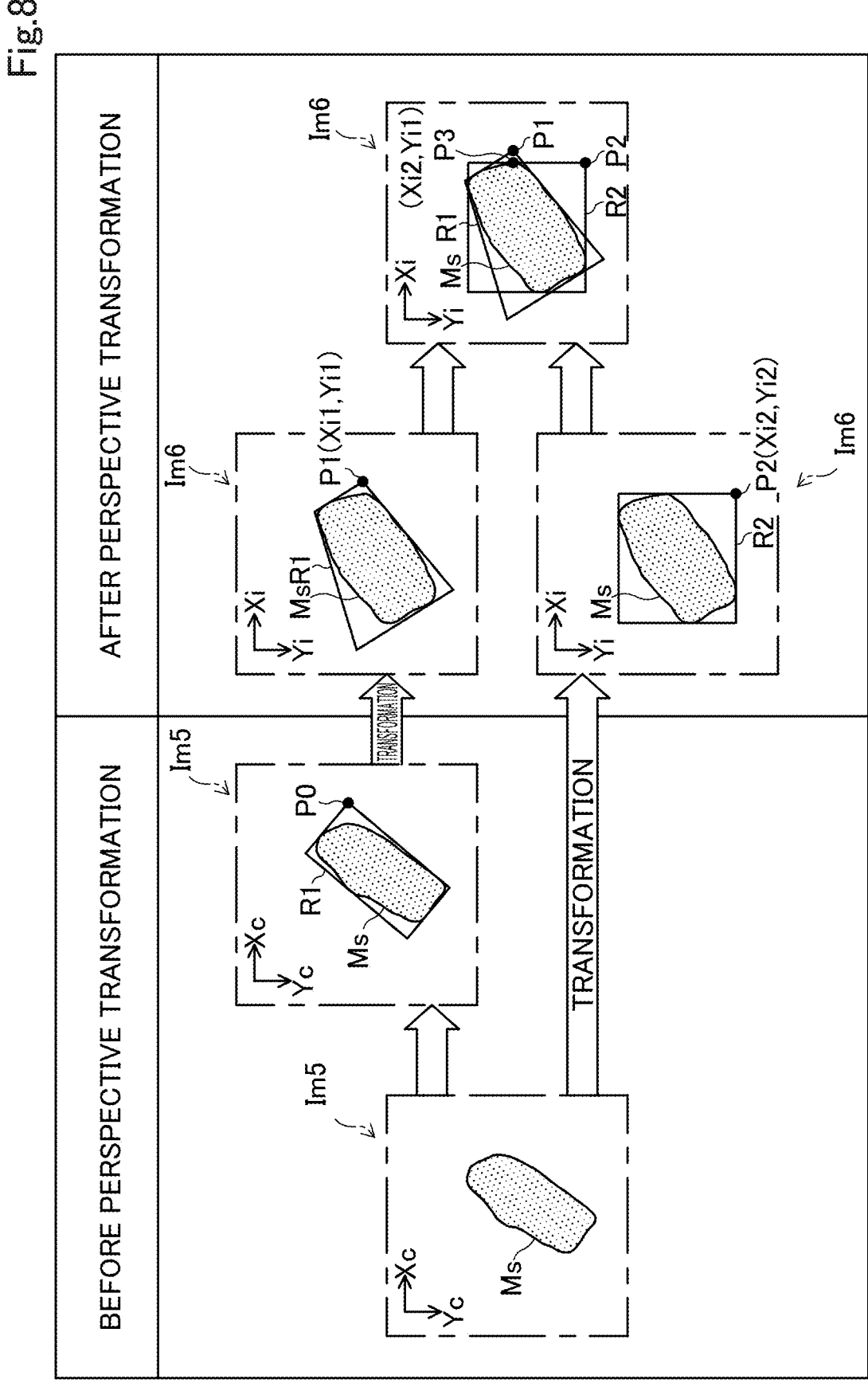
FIG. 8 is a diagram for illustrating details of a coordinate point calculation step.
Figure 9:
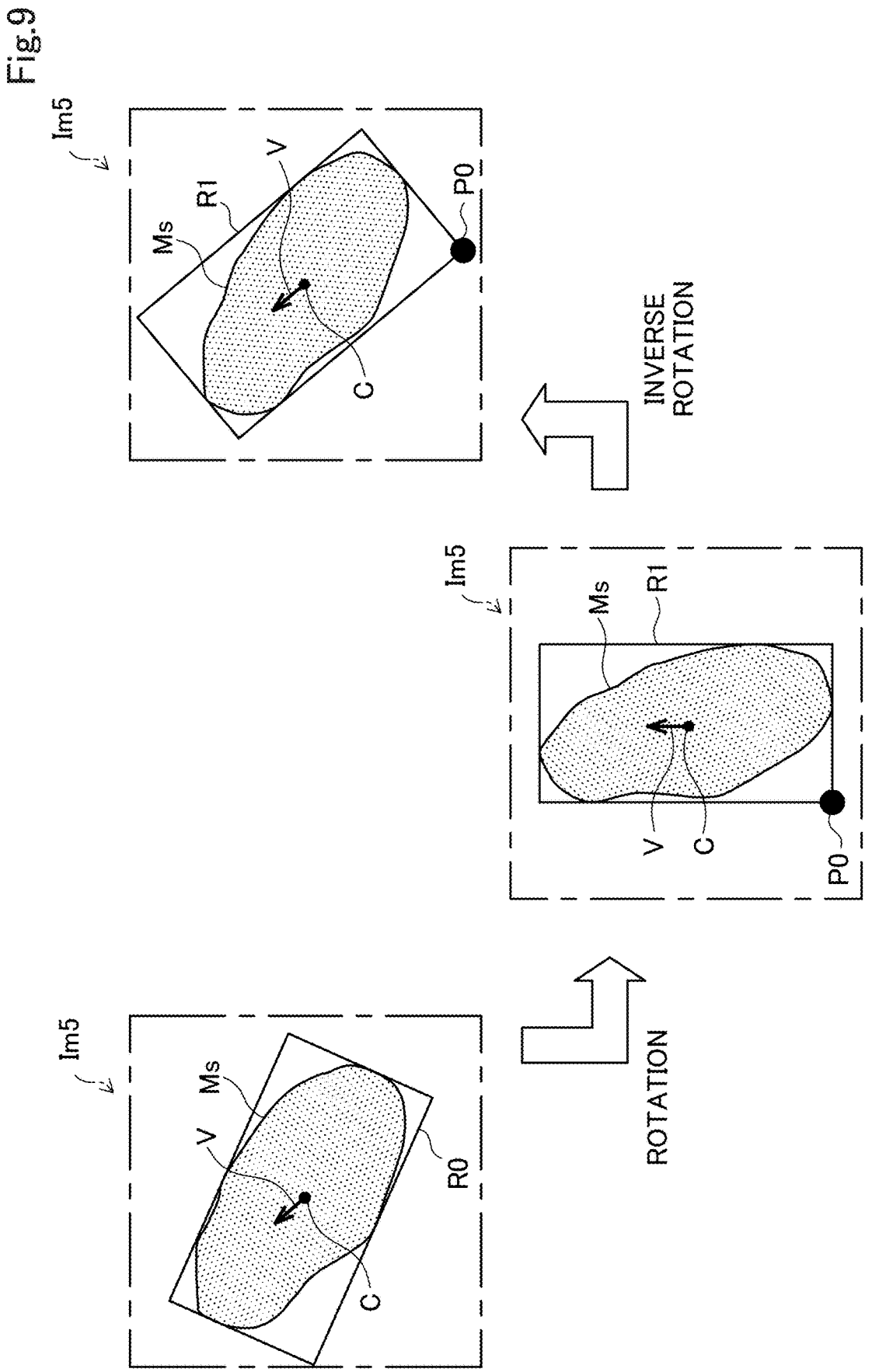
FIG. 9 is a diagram for illustrating a calculation method for base coordinate points.

In a coordinate point calculation step (step S470), the position acquisition unit 215 calculates a local coordinate point, which indicates the position of the vehicle 100 in the local coordinate system. FIG. 8 is a diagram for illustrating details of the coordinate point calculation step. To calculate the local coordinate point, the position acquisition unit 215 first calculates a base coordinate point P0 from a first bounding rectangle R1 set in the mask region Ms in the first mask image Im5, which is the image before the perspective transformation. FIG. 9 is a diagram for illustrating a method for calculating the base coordinate point P0. To calculate the base coordinate point P0, the position acquisition unit 215 sets a base bounding rectangle R0 with respect to the mask region Ms in the first mask image Im5. Next, the position acquisition unit 215 rotates the first mask image Im5 by the required amount of rotation with the center of gravity C of the mask region Ms as the rotation center so that the direction of a movement vector V of the vehicle 100 corresponding to the mask region Ms in the first mask image Im5 is directed to a predetermined direction. The predetermined direction is, for example, the upward direction on a screen of a display device that displays the first mask image Im5. Next, the position acquisition unit 215 sets the first bounding rectangle R1 with respect to the mask region Ms of the rotated first mask image Im5 so that the long side thereof becomes parallel to the movement vector V. Next, the position acquisition unit 215 inversely rotates the first mask image Im5 in which the first bounding rectangle R1 is added, with the center of gravity C of the mask region Ms as the rotation center, by the above rotation amount. The position acquisition unit 215 thus sets, as the base coordinate point P0, the coordinate point of the vertex that is one of the four vertices of the first bounding rectangle R1 and that has the coordinates with the closest distance to the positioning point 10e of the vehicle 100.

Next, as shown in FIG. 8, the position acquisition unit 215 performs perspective transformation with respect to the inversely rotated first mask image Im5, i.e., the first mask image Im5 after the calculation of the base coordinate point P0. In this way, the position acquisition unit 215 sets the coordinate point corresponding to the base coordinate point P0 as a first coordinate point P1 in the first bounding rectangle R1 deformed by the perspective transformation.

Next, the position acquisition unit 215 sets a second bounding rectangle R2 with respect to the mask region Ms in the second mask image Im6 obtained by perspective transformation of the first mask image Im5. Then, the position acquisition unit 215 sets, as a second coordinate point P2, a vertex that indicates the same position as the first coordinate point P1 from among the vertices of the second bounding rectangle R2. In other words, the first coordinate point P1 and the second coordinate point P2 are correlated with each other, as they are coordinate points indicating the same position.

Next, the position acquisition unit 215 performs a correction to replace the coordinates (Xi1, Yi1) of the first coordinate point P1 with the coordinates (Xi2, Yi2) of the second coordinate point P2 according to the relative magnitude between the coordinate values of the first coordinate point P1 and the second coordinate point P2. When the coordinate value Xi1 in the Xi direction of the first coordinate point P1 is greater than the coordinate value Xi2 in the Xi direction of the second coordinate point P2 (Xi1>Xi2), the position acquisition unit 215 replaces the coordinate value Xi1 in the Xi direction of the first coordinate point P1 with the coordinate value Xi2 in the Xi direction of the second coordinate point P2. When the coordinate value Yi1 in the Yi direction of the first coordinate point P1 is greater than the coordinate value Yi2 in the Yi direction of the second coordinate point P2 (Yi1>Yi2), the position acquisition unit 215 replaces the coordinate value Yi1 in the Yi direction of the first coordinate point P1 with the coordinate value Yi2 in the Yi direction of the second coordinate point P2. In the example shown in FIG. 8, the coordinate value Xi1 in the Xi direction of the first coordinate point P1 is greater than the coordinate value Xi2 in the Xi direction of the second coordinate point P2. Further, the coordinate value Yi1 in the Yi direction of the first coordinate point P1 is smaller than the coordinate value Yi2 in the Yi direction of the second coordinate point P2. Accordingly, a local coordinate point P3 has the coordinates (Xi2, Yi1). In this way, the position acquisition unit 215 calculates the local coordinate point P3, which indicates the position of the vehicle 100 in the local coordinate system, by correcting the first coordinate point P1 using the second coordinate point P2.

In a position transformation step (step S480), the position acquisition unit 215 calculates a vehicle coordinate point that indicates the position of the positioning point 10e of the vehicle 100 in the global coordinate system GC by transforming the local coordinate point P3 into the vehicle coordinate point. The position acquisition unit 215 transforms the local coordinate point P3 into the vehicle coordinate point using the relational expressions in the formulae (1) to (3) described later, which include the vehicle coordinate point as the objective variable and the local coordinate point P3, the imaging parameter, and the vehicle parameter as the explanatory variables. The imaging parameter is a parameter regarding the distance of the external camera 300 from a predefined reference point. In the present embodiment, the imaging parameter is a height H (see FIG. 10 described later) of the external camera 300 from the road surface Rs. The vehicle parameter is a parameter regarding the distance of the positioning point 10e of the vehicle 100 from the reference point. In the present embodiment, the vehicle parameter is a height h (see FIG. 10 described later) of the positioning point 10e of the vehicle 100 from the road surface Rs.

Figure 10:
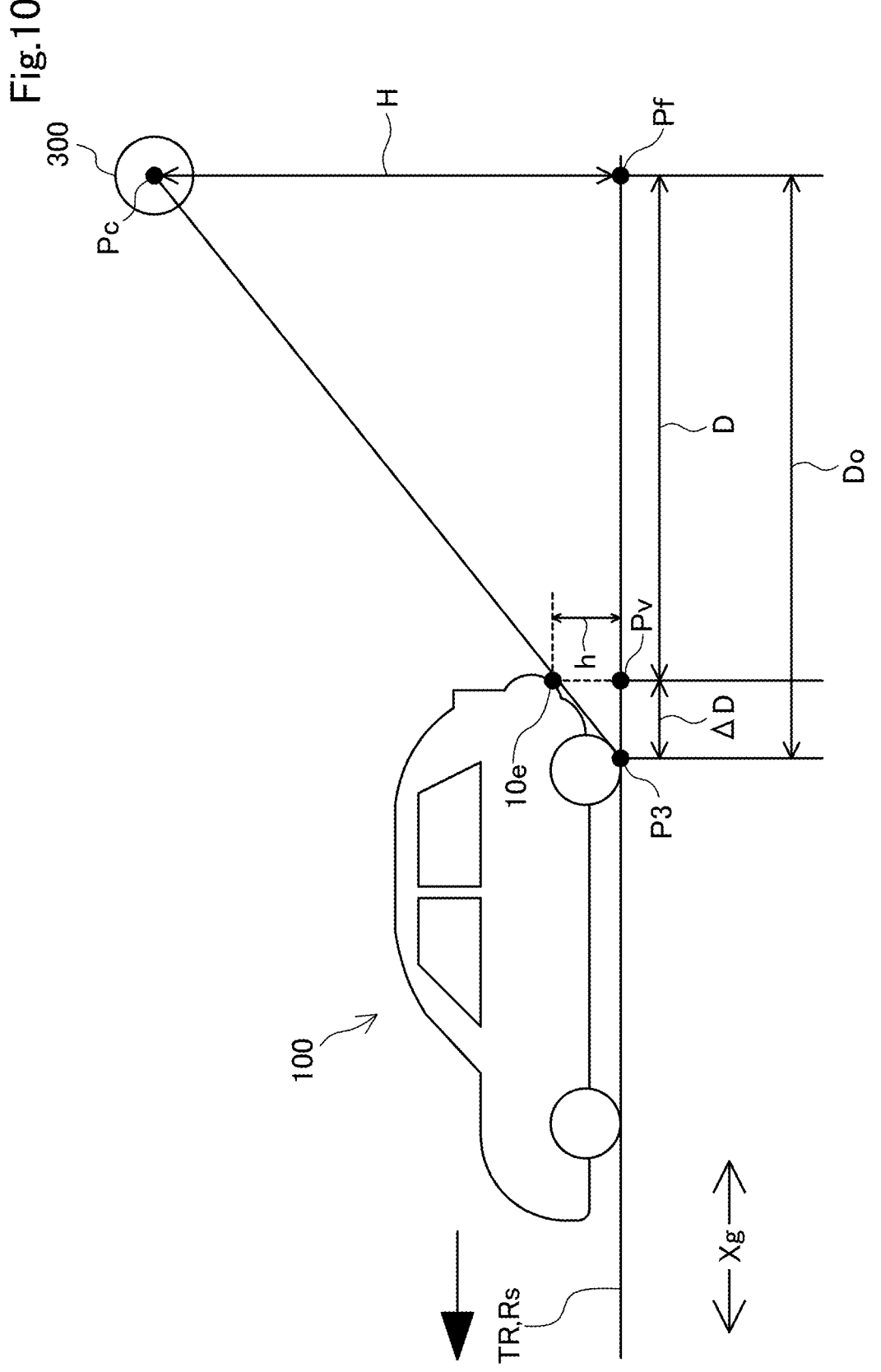
FIG. 10 is a first diagram for illustrating details of a position transformation step.
Figure 11:
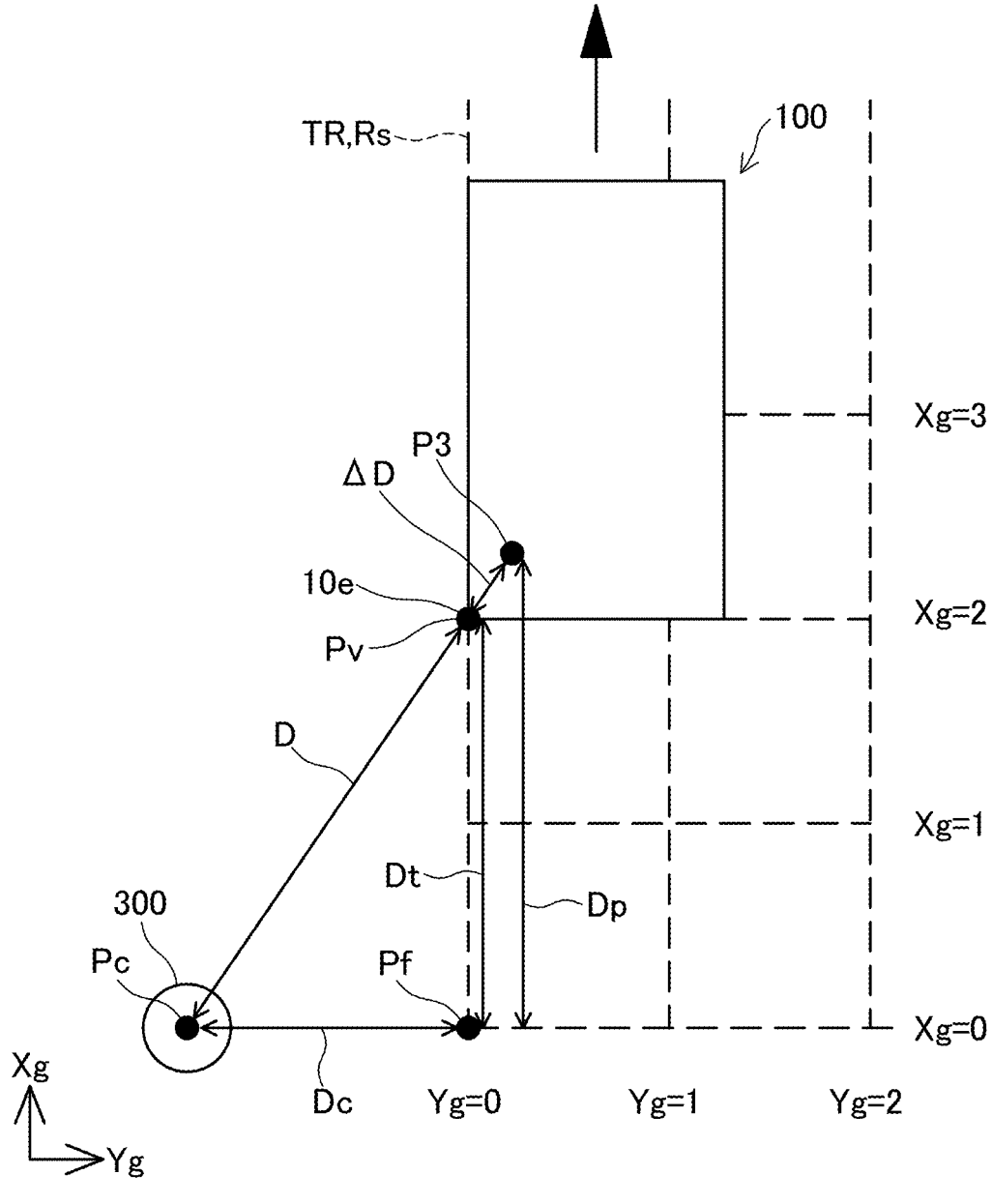
FIG. 11 is a second diagram for illustrating details of a position transformation step.

FIG. 10 is a first diagram for illustrating details of the position transformation step. FIG. 10 shows the vehicle 100 as viewed from the left side surface. FIG. 11 is a second diagram for illustrating details of the position transformation step. FIG. 11 shows the vehicle 100 as viewed from the roof side. The global coordinate system GC shown in FIG. 10 and FIG. 11 is a coordinate system with a fixed coordinate point Pf, which indicates an arbitrary reference position on the road surface Rs, as the origin and the coordinate axes indicated by the Xg axis and the Yg axis, which is orthogonal to the Xg axis. An imaging coordinate point Pc is a coordinate point indicating the position of the external camera 300 that outputs the original image Im1 used to calculate the local coordinate point P3, in the global coordinate system GC. The fixed coordinate point Pf and the imaging coordinate point Pc are stored in advance, for example, in the memory 202 of the information processing device 200.

As shown in FIG. 10, Do represents an observation distance between the position of the external camera 300 and the position of the vehicle 100 (local coordinate point P3) on the XgYg plane. ΔD represents an observation error. H represents a height [m] of the external camera 300 from the road surface Rs as the imaging parameter. h represents a height [m] of the positioning point 10e of the vehicle 100 from the road surface Rs as the vehicle parameter. In this case, the observation error ΔD can be expressed by the following formula (1).

$$\Delta D = h/H \times Do \qquad \text{Formula (1)}$$

In other words, the larger the observation distance Do, the larger the observation error ΔD.

Assuming that a first distance D represents an actual distance between the position of the external camera 300 and the position of the positioning point 10e of the vehicle 100, the first distance D can be expressed by the following formula (2).

$$D = Do \times (1 - h/H) \qquad \text{Formula (2)}$$

In other words, the first distance D is determined by the observation distance Do, the height H of the external camera 300 as the imaging parameter, and the height h of the positioning point 10e of the vehicle 100 as the vehicle parameter.

As shown in FIG. 11, assuming that an estimated distance Dp represents a distance between the reference position and an estimation position of the vehicle 100, and a second distance Dt represents an actual distance between the reference position and the vehicle 100, the second distance Dt can be expressed by the following formula (3).

$$Dt = Dp \times (1 - h/H) \qquad \text{Formula (3)}$$

Here, the estimated distance Dp can be calculated using a third distance Dc, which is an actual distance obtained from the fixed coordinate point Pf and the imaging coordinate point Pc, as well as the local coordinate point P3 and the fixed coordinate point Pf. Therefore, the position acquisition unit 215 calculates a vehicle coordinate point Pv using the second distance Dt obtained by correcting the estimated distance Dp using the formula (3) shown above, and the fixed coordinate point Pf. The vehicle coordinate point Pv thus calculated is a coordinate point indicating the position of the positioning point 10e of the vehicle 100 in the global coordinate system GC, and therefore it corresponds to the position of the vehicle 100 in real space.

According to the first embodiment described above, the first learning model DM1 is prepared. The first learning model DM1 has been trained in advance using a plurality of first initial training data sets that correspond to the respective imaging ranges of the plurality of external cameras 300. In each first initial training data set, a training image including a background image corresponding to the imaging range and a vehicle image is associated with a region correct answer label. The information processing device 200 can perform the following process if the accuracy is less than a threshold when captured images Im1 to Im4 acquired by some of the plurality of external cameras 300 are input to the trained first learning model DM1. In this case, the information process-ing device 200 can retrain the first learning model DM1 using the first additional training data set in which a training image including a background image corresponding to the imaging range of the external camera 300 that acquired the captured images Im1 to Im4 for which the accuracy is less than a threshold and the vehicle image is associated with a region correct answer label. In this way, it is possible to suppress the decrease in detection accuracy in detecting the vehicle 100 from the captured images Im1 to Im4 acquired by some of the plurality of external cameras 300. Therefore, it is possible to suppress the decrease in accuracy of the first learning model DM1 when the appearance state in the imaging range of some of the plurality of external cameras 300 has changed from the appearance state at the time when the first learning model DM1 was trained.

Further, according to the first embodiment described above, the information processing device 200 stores a plu-rality of first learning models DM1 prepared for the respec-tive ones of the plurality of external cameras 300. This enables the information processing device 200 to perform the following process if the accuracy is less than a threshold when the captured images Im1 to Im4 acquired by some of the plurality of external cameras 300 are input to the trained first learning model DM1. In this case, the information processing device 200 can retrain only the first learning model DM1 corresponding to the external camera 300 that acquired the captured images Im1 to Im4 for which accuracy is less than the threshold. This makes it possible to reduce the burden required for the retraining of the first learning model DM1.

Further, according to the first embodiment described above, when the retraining process is completed, the infor-mation processing device 200 can acquire the shape data Da by inputting the captured images Im1 to Im4 to the first learning model DM1 that has been trained by the retraining process. This makes it possible to suppress the decrease in accuracy of the shape data Da generated using the captured images Im1 to Im4 acquired by some of the plurality of external cameras 300.

Further, according to the first embodiment described above, the information processing device 200 can retrain the first learning model DM1 during the period while control of unmanned driving is performed. In alternative embodi-ments, the information processing device 200 may retrain the first learning model DM1, for example, during the period while control of manned driving is performed, without executing control of unmanned driving.

Further, according to the first embodiment described above, the vehicle 100 runs in the factory by unmanned driving. In this way, the information processing device 200 can retrain the first learning model DM1 in the process of producing the vehicle 100.

B. Second Embodiment

Figure 12:
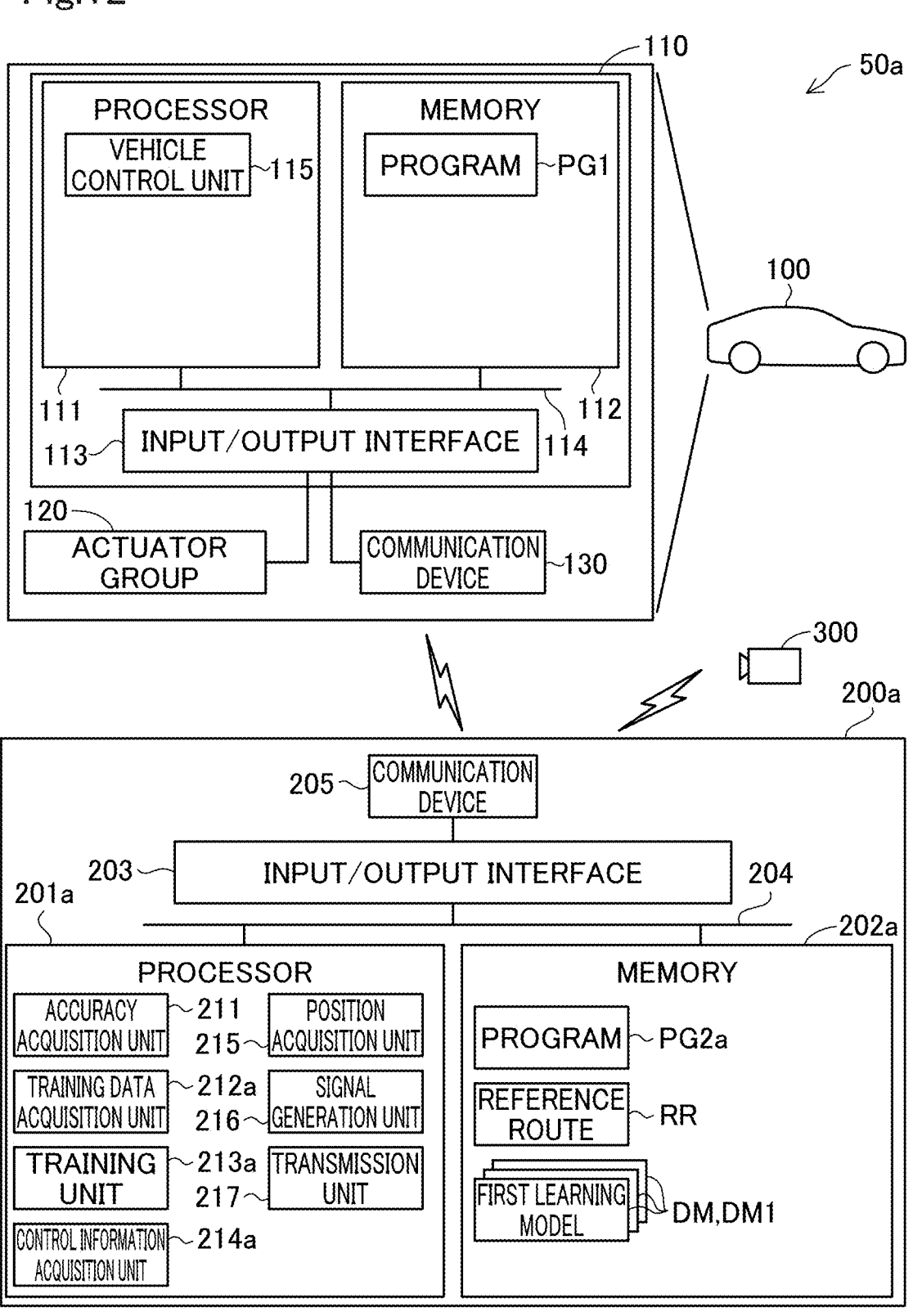
FIG. 12 is a block diagram showing a structure of an information processing system in a second embodiment.

FIG. 12 is a block diagram showing a structure of an information processing system 50a in the second embodi-ment. The information processing system 50a includes one or more vehicles 100, a plurality of external cameras 300, and an information processing device 200a. In the present embodiment, when the captured images Im1 to Im4 acquired by some of the plurality of external cameras 300 are input to the first learning model DM1 and if the accuracy of the first learning model DM1 is less than a predetermined threshold, the information processing device 200a executes, as addi-tional learning, a transfer training process to train the first learning model DM1 by transfer learning. The transfer learning is an example of additional learning. Therefore, the transfer training process is an example of additional training process. The rest of the structure of the information pro-cessing system 50a is the same as that of the first embodi-ment, unless otherwise specified. The same structure as that of the first embodiment is described with the same reference symbols and the explanation thereof is omitted.

The information processing device 200a includes a com-puter with a processor 201a, a memory 202a, the input/output interface 203, and the internal bus 204.

The memory 202a stores various types of information, including a program PG2a that controls operation of the information processing device 200a, the reference route RR, and the plurality of first learning models DM1 prepared for the respective external cameras 300.

The processor 201a functions as the accuracy acquisition unit 211, a training data acquisition unit 212a, a training unit 213a, a control information acquisition unit 214a, the posi-tion acquisition unit 215, the signal generation unit 216, and the transmission unit 217, by executing the program PG2a stored in the memory 202a.

The training data acquisition unit 212a performs the following process if the accuracy of the first learning model DM1 is less than a predetermined threshold when captured images Im1 to Im4 acquired by some of the plurality of external cameras 300 are input to the first learning model DM1. In this case, the training data acquisition unit 212a acquires a first additional training data group, which is used to train the first learning model DM1, for which the accuracy was less than the threshold, by transfer learning as additional learning.

The training unit 213a performs the following process if the accuracy of the first learning model DM1 is less than a predetermined threshold when the captured images Im1 to Im4 acquired by some of the plurality of external cameras 300 are input to the first learning model DM1. In this case, the training unit 213a performs the transfer training process to train the first learning model DM1, for which the accuracy was less than the threshold, by transfer learning. The training unit 213a performs, for example, the following process as the transfer training process. Specifically, the training unit 213a adds a layer of CNN that constitutes the first learning model DM1 for which the accuracy was less than the threshold. The training unit 213a then updates the param-eters regarding the added layer using the acquired first additional training data set without updating the trained parameters.

When the transfer training process is completed, the control information acquisition unit 214a acquires the shape data Da by inputting the captured images Im1 to Im4 to the first learning model DM1 that has been trained by the transfer training process.

Figure 13:
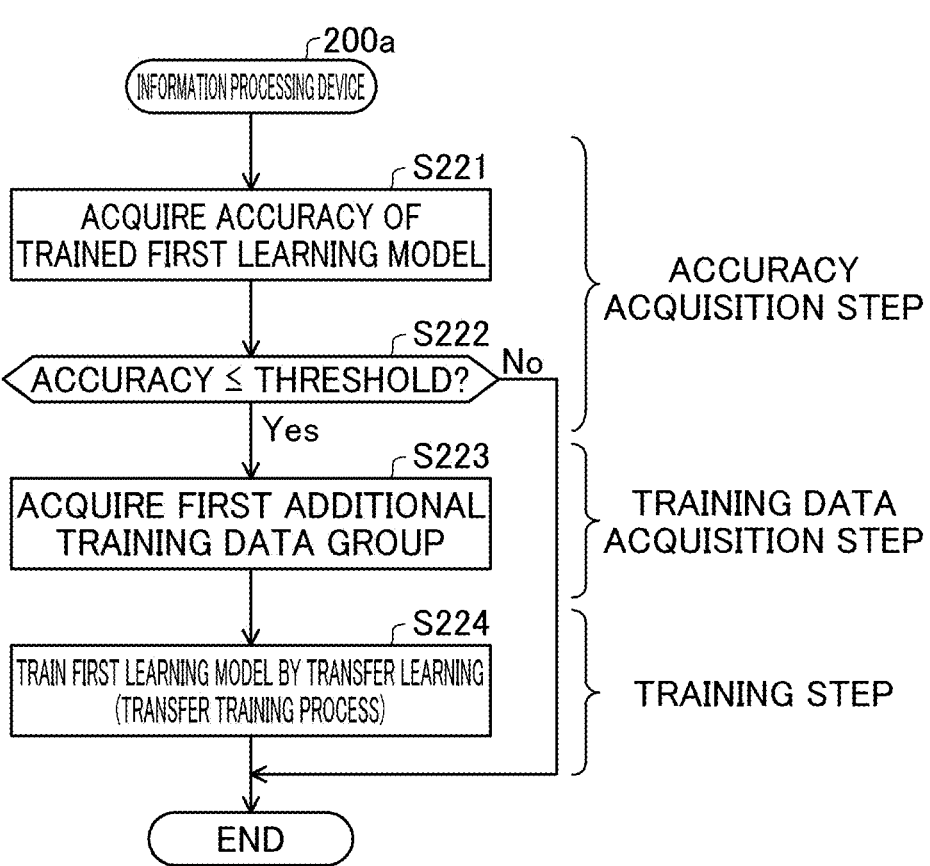
FIG. 13 is a flowchart showing a method for training process in the second embodiment.

FIG. 13 is a flowchart showing a method for training process in the second embodiment. The flow shown in FIG. 13 is repeated, for example, every predetermined time from the time point at which the running of the vehicle 100 by unmanned driving is started.

In an accuracy acquisition step, the accuracy acquisition unit 211 acquires the accuracy of the first learning model DM1, which has been trained in advance using the first initial training data group (step S221). A training data acquisition step is performed if the accuracy of the first learning model DM1 is less than a predetermined threshold when captured images Im1 to Im4 acquired by some of the plurality of external cameras 300 are input to the first learning model DM1 (step S222: Yes). In the training data acquisition step, the training data acquisition unit 212a acquires the first additional training data group (step S223). After the training data acquisition step, a training step is performed. In the training step, the training unit 213a performs the transfer training process for training the first learning model DM1 by transfer learning using the acquired first additional training data group (step S224). On the other hand, the processor 201a ends the flow without performing the training data acquisition step or the training step if the accuracy of the first learning model DM1 is equal to or greater than a predetermined threshold when captured images Im1 to Im4 acquired by some of the plurality of external cameras 300 are input to the first learning model DM1 (step S222: No).

Figure 14:
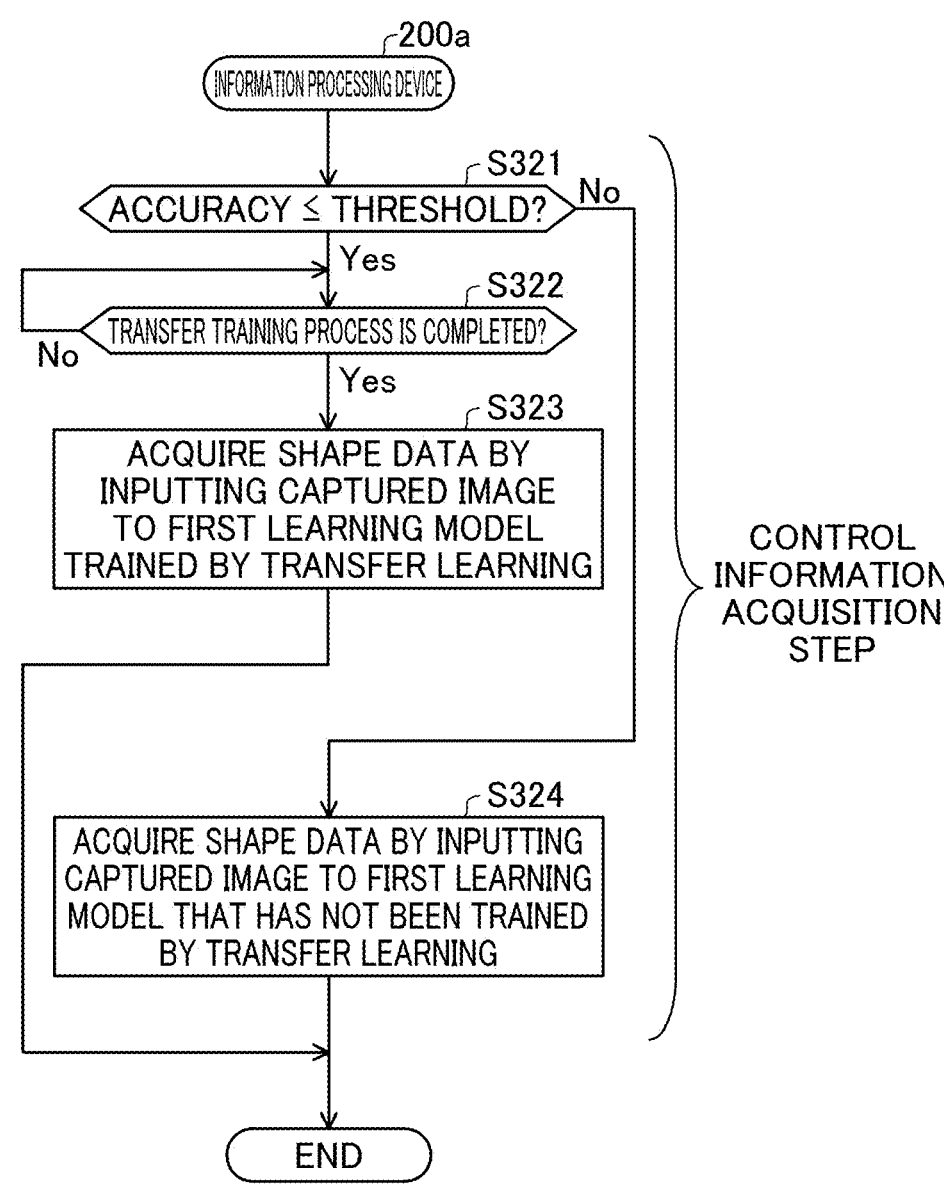
FIG. 14 is a flowchart showing a method for acquiring shape data in the second embodiment.

FIG. 14 is a flowchart showing a method for acquiring the shape data Da in the second embodiment. The flow shown in FIG. 14 is repeated, for example, every predetermined time from the time point at which the running of the vehicle 100 by unmanned driving is started.

In a control information acquisition step, the control information acquisition unit 214a acquires the shape data Da by performing the following process. Specifically, if the accuracy of the first learning model DM1 is less than a predetermined threshold when captured images Im1 to Im4 acquired by some of the plurality of external cameras 300 are input to the first learning model DM1 (step S321: Yes), when the transfer training process is completed (step S322: Yes), the control information acquisition unit 214a acquires the shape data Da by inputting the captured images Im1 to Im4 to the first learning model DM1 that has been trained by the transfer training process (step S323). On the other hand, if the accuracy of the first learning model DM1 is equal to or greater than a predetermined threshold when captured images Im1 to Im4 acquired by some of the plurality of external cameras 300 are input to the first learning model DM1 (step S321: No), the control information acquisition unit 214a acquires the shape data Da by inputting the captured images Im1 to Im4 to the first learning model DM1 that has not been trained by the transfer training process (step S324).

According to the second embodiment described above, the information processing device 200a can perform the following process if the accuracy is less than a threshold when captured images Im1 to Im4 acquired by some of the plurality of external cameras 300 are input to the trained first learning model DM1. In this case, the information processing device 200a can train the first learning model DM1 by transfer learning using the first additional training data set in which a training image including a background image corresponding to the imaging range of the external camera 300 that acquired the captured images Im1 to Im4 for which the accuracy is less than a threshold and the vehicle image is associated with a region correct answer label. In this way, it is possible to suppress the decrease in detection accuracy in detecting the vehicle 100 from the captured images Im1 to Im4 acquired by some of the plurality of external cameras 300. This makes it possible to suppress the decrease in accuracy of the shape data Da generated using the captured images Im1 to Im4 acquired by some of the plurality of external cameras 300.

C. Third Embodiment

Figure 15:
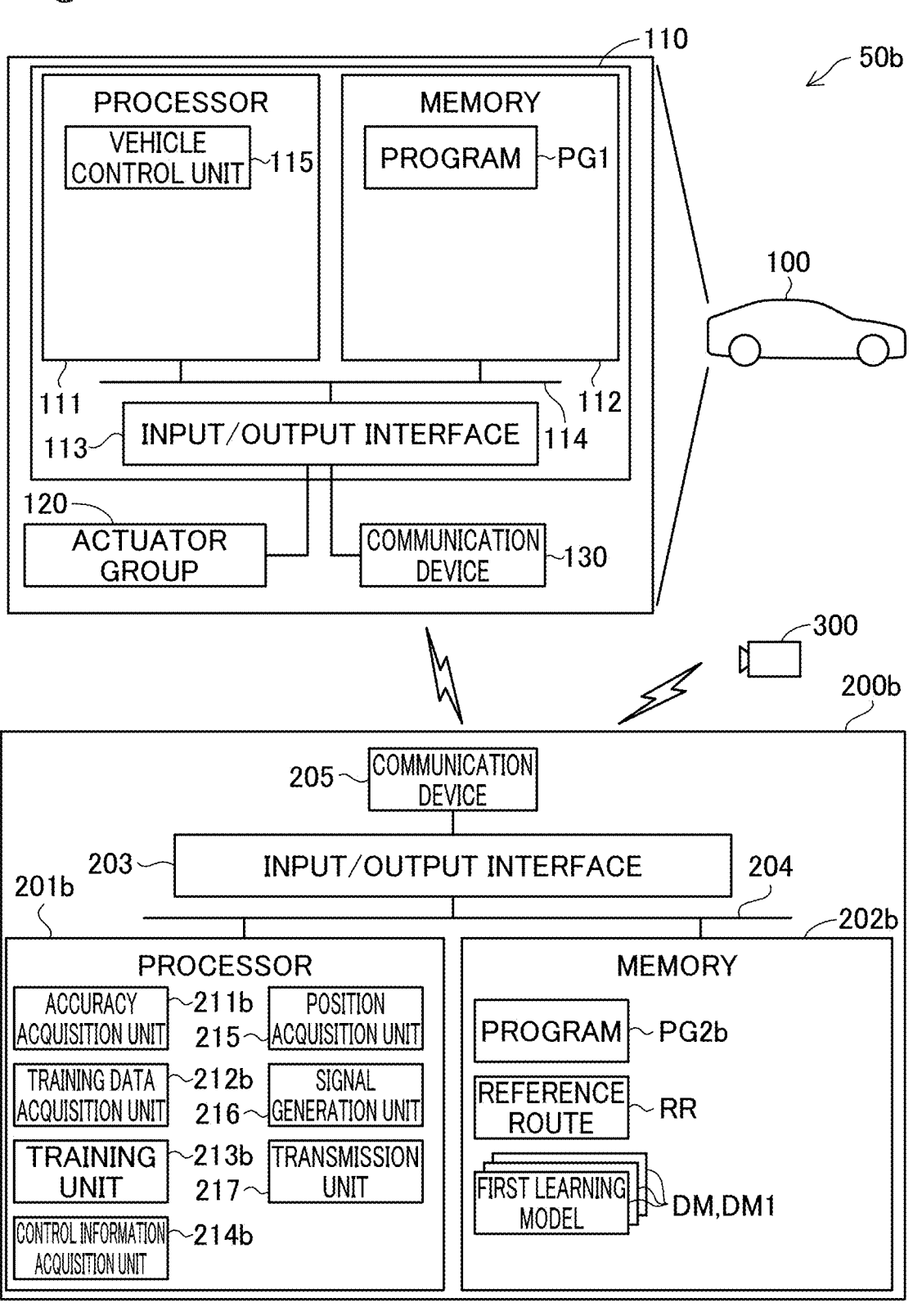
FIG. 15 is a block diagram showing a structure of an information processing system in a third embodiment.

FIG. 15 is a block diagram showing a structure of an information processing system 50b in the third embodiment. The information processing system 50b includes one or more vehicles 100, a plurality of external cameras 300, and an information processing device 200b. In the present embodiment, when the retraining process is completed and the accuracy of the first learning model DM1 that has been trained by the retraining process is equal to or greater than the threshold, the information processing device 200b acquires the shape data Da by inputting the captured images Im1 to Im4 to the first learning model DM1 that has been trained by the retraining process. The rest of the structure of the information processing system 50b is the same as that of the first embodiment, unless otherwise specified. The same structure as that of the first embodiment is described with the same reference symbols and the explanation thereof is omitted.

The information processing device 200b includes a computer with a processor 201b, a memory 202b, the input/output interface 203, and the internal bus 204.

The memory 202b stores various types of information, including a program PG2b that controls operation of the information processing device 200b, the reference route RR, and the plurality of first learning models DM1 prepared for the respective external cameras 300.

The processor 201b functions as an accuracy acquisition unit 211b, a training data acquisition unit 212b, a training unit 213b, a control information acquisition unit 214b, the position acquisition unit 215, the signal generation unit 216, and the transmission unit 217, by executing the program PG2b stored in the memory 202b.

The accuracy acquisition unit 211b acquires the accuracy of the first learning model DM1, which has been trained in advance using the first initial training data group. Further, when the retraining process is completed, the accuracy acquisition unit 211b acquires the accuracy of the first learning model DM1 that has been trained by the retraining process. Below, the accuracy of the first learning model DM1 that has been trained in advance using the first initial training data group, is also referred to as "initial accuracy". The accuracy of the first learning model DM1 that has been trained by the retraining process is also referred to as "post-training accuracy". In the present embodiment, the accuracy acquisition unit 211b acquires the post-training accuracy using a plurality of captured images Im1 to Im4 acquired by imaging a subsequent vehicle 100, which is running behind the vehicle 100 in the training image included in the first initial training data group, by the external camera 300.

The training data acquisition unit 212b acquires the first additional training data group if the accuracy of the first learning model DM1 is less than a predetermined threshold when captured images Im1 to Im4 acquired by some of the plurality of external cameras 300 are input to the first learning model DM1. Further, the training data acquisition unit 212b acquires the first additional training data group again when the post-training accuracy is less than the threshold even after the retraining process is completed. At this time, the first additional training data group thus acquired again may include the same training images as those used in the retraining process for which the post-training accuracy was less than the threshold, or may include different training images.

The training unit 213b performs the retraining process for retraining the first learning model DM1 if the accuracy of the first learning model DM1 is less than a predetermined threshold when the captured images Im1 to Im4 acquired by some of the plurality of external cameras 300 are input to the first learning model DM1. Further, when the post-training accuracy is less than the threshold even after the retraining process is completed, the training unit 213b performs the retraining process for retraining the first learning model DM1 using the first additional training data group that has been acquired again.

When the retraining process is completed and the post-training accuracy is equal to or greater than the threshold, the control information acquisition unit 214b acquires the shape data Da by inputting the captured images Im1 to Im4 to the first learning model DM1 that has been trained by the retraining process. At this time, if the ratio of the number of captured images Im1 to Im4 for which the post-training accuracy is equal to or greater than a threshold to the total number of the plurality of captured images Im1 to Im4 used to calculate the post-training accuracy is equal to or greater than a predetermined reference value, the control information acquisition unit 214b acquires the shape data Da by inputting the captured images Im1 to Im4 to the first learning model DM1 that has been trained by the retraining process.

FIG. 16 is a flowchart showing a method for training process in the third embodiment. The flow shown in FIG. 16 is repeated, for example, every predetermined time from the time point at which the running of the vehicle 100 by unmanned driving is started.

In an accuracy acquisition step, the accuracy acquisition unit 211b acquires the initial accuracy (step S231). A training data acquisition step is performed if the initial accuracy is less than a predetermined threshold when captured images Im1 to Im4 acquired by some of the plurality of external cameras 300 are input to the first learning model DM1 (step S232: Yes). In the training data acquisition step, the training data acquisition unit 212b acquires the first additional training data group (step S233). After the training data acquisition step, a training step is performed. In the first training step, the training unit 213b performs the retraining process for retraining the first learning model DM1 using the acquired first additional training data group (step S234). On the other hand, the processor 201b ends the flow without performing the training data acquisition step or the training step if the accuracy of the first learning model DM1 is equal to or greater than a predetermined threshold when captured images Im1 to Im4 acquired by some of the plurality of external cameras 300 are input to the first learning model DM1 (step S232: No).

When the retraining process is completed (step S235: Yes), an accuracy confirmation step is performed. In the accuracy confirmation step, the accuracy acquisition unit 211b acquires the post-training accuracy (step S236). If the ratio of the number of captured images Im1 to Im4 for which the post-training accuracy is equal to or greater than a threshold to the total number of the plurality of captured images Im1 to Im4 used to calculate the post-training accuracy is equal to or greater than a predetermined reference value (step S237: Yes), the flow is ended. On the other hand, if the ratio of the number of captured images Im1 to Im4 for which the post-training accuracy is equal to or greater than a threshold to the total number of the plurality of captured images Im1 to Im4 used to calculate the post-training accuracy is less than the predetermined reference value (step S237: No), each step from the steps S233 to S237 is repeated.

Figure 17:
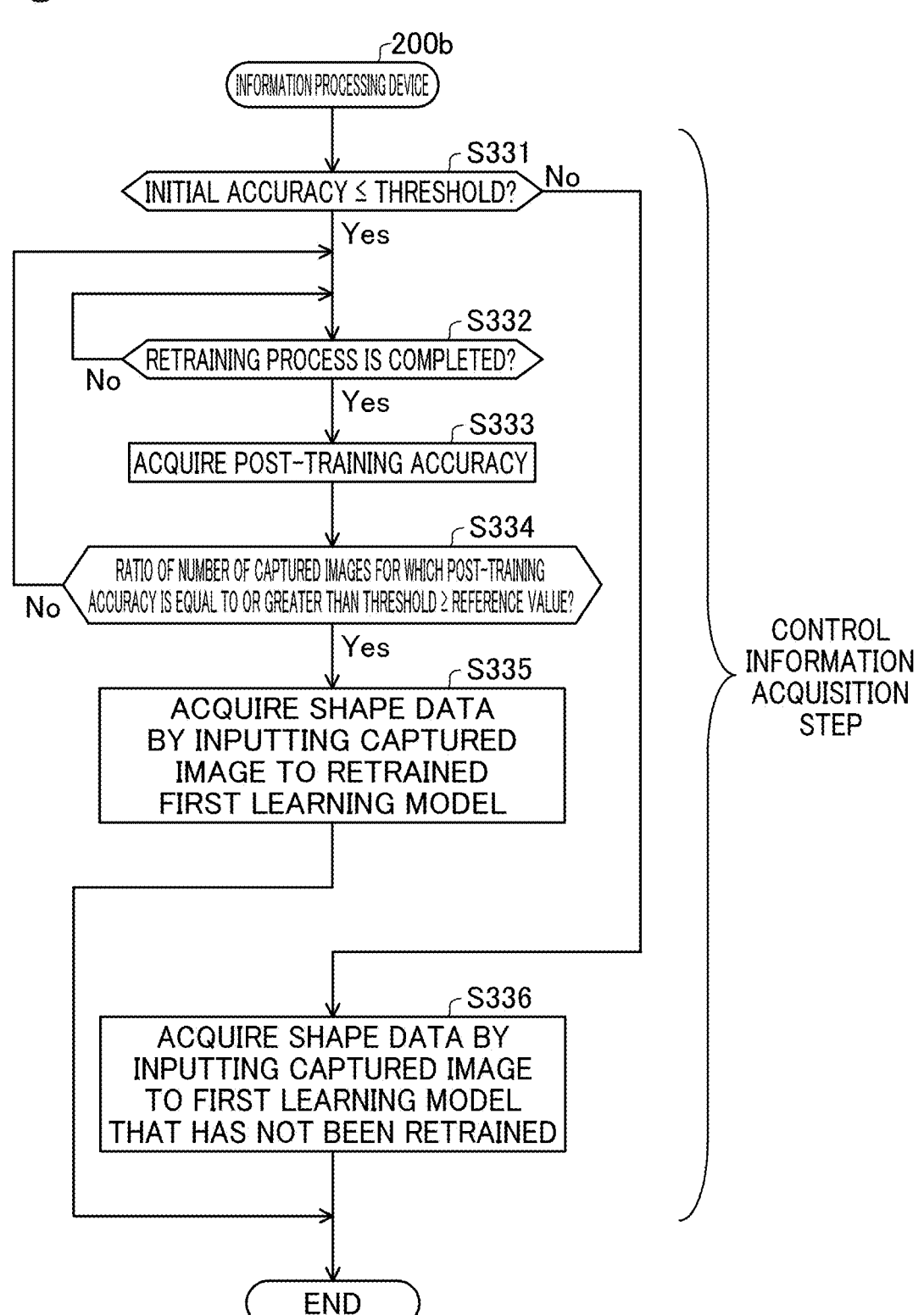
FIG. 17 is a flowchart showing a method for acquiring shape data in the third embodiment.

FIG. 17 is a flowchart showing a method for acquiring the shape data Da in the third embodiment. The flow shown in FIG. 17 is repeated, for example, every predetermined time from the time point at which the running of the vehicle 100 by unmanned driving is started.

If the initial accuracy is less than a predetermined threshold when captured images Im1 to Im4 acquired by some of the plurality of external cameras 300 are input to the first learning model DM1 (step S331: Yes), and when the retraining process is completed (step S332: Yes), the accuracy acquisition unit 211b acquires the post-training accuracy (step S333). If the ratio of the number of captured images Im1 to Im4 for which the post-training accuracy is equal to or greater than a threshold to the total number of the plurality of captured images Im1 to Im4 used to calculate the post-training accuracy is equal to or greater than a predetermined reference value (step S334: Yes), the control information acquisition unit 214b acquires the shape data Da by inputting the captured images Im1 to Im4 to the first learning model DM1 that has been trained by the retraining process (step S335). On the other hand, if the initial accuracy is equal to or greater than a predetermined threshold when captured images Im1 to Im4 acquired by some of the plurality of external cameras 300 are input to the first learning model DM1 (step S331: No), the control information acquisition unit 214b acquires the shape data Da by inputting the captured images Im1 to Im4 to the first learning model DM1 that has not been trained by the retraining process (step S336).

According to the third embodiment described above, when the retraining process is completed and the post-training accuracy is equal to or greater than the threshold, the information processing device 200b can acquire the shape data Da by inputting the captured images Im1 to Im4 to the first learning model DM1 that has been trained by the retraining process.

Further, according to the third embodiment described above, the information processing device 200b can acquire the post-training accuracy using a plurality of captured images Im1 to Im4 acquired by imaging a vehicle 100 running behind the vehicle 100 in the training image included in the first initial training data group by the external camera 300.

Further, according to the third embodiment described above, if the ratio of the number of captured images Im1 to Im4 for which the post-training accuracy is equal to or greater than a threshold to the total number of the plurality of captured images Im1 to Im4 used to calculate the post-training accuracy is equal to or greater than a predetermined reference value, the information processing device 200b can determine that the post-training accuracy is equal to or greater than the threshold.

D. Fourth Embodiment

Figure 18:
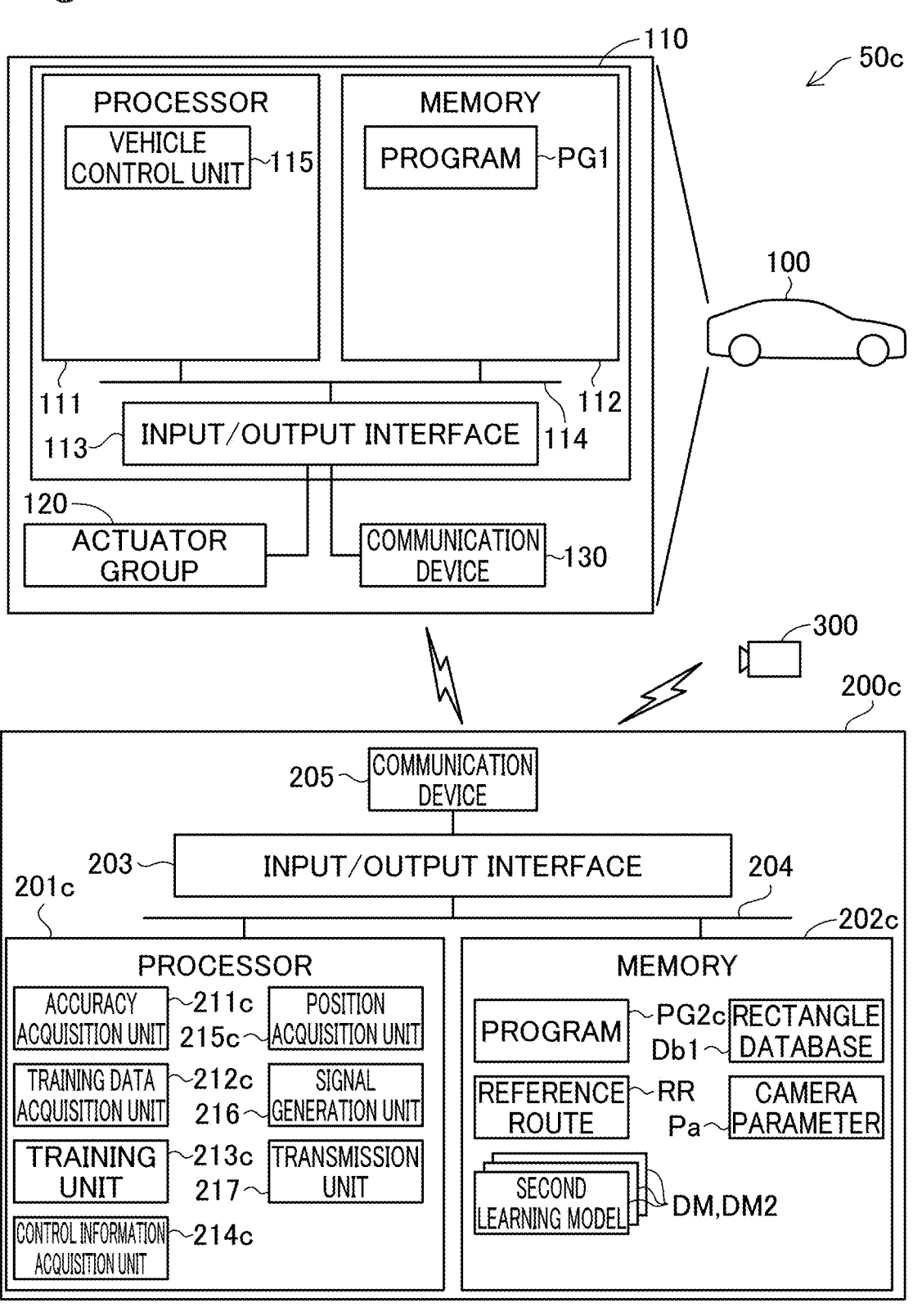
FIG. 18 is a block diagram showing a structure of an information processing system in a fourth embodiment.

FIG. 18 is a block diagram showing a structure of an information processing system 50c in the fourth embodiment. The information processing system 50c includes one or more vehicles 100, a plurality of external cameras 300, and an information processing device 200c. In the present embodiment, the information processing device 200c acquires a rectangle coordinate value as a signal generation parameter by inputting the captured images Im1 to Im4 to a second learning model DM2 as the machine learning model DM. The rest of the structure of the information processing system 50c is the same as that of the first embodiment, unless otherwise specified. The same structure as that of the first embodiment is described with the same reference symbols and the explanation thereof is omitted.

Figure 19:
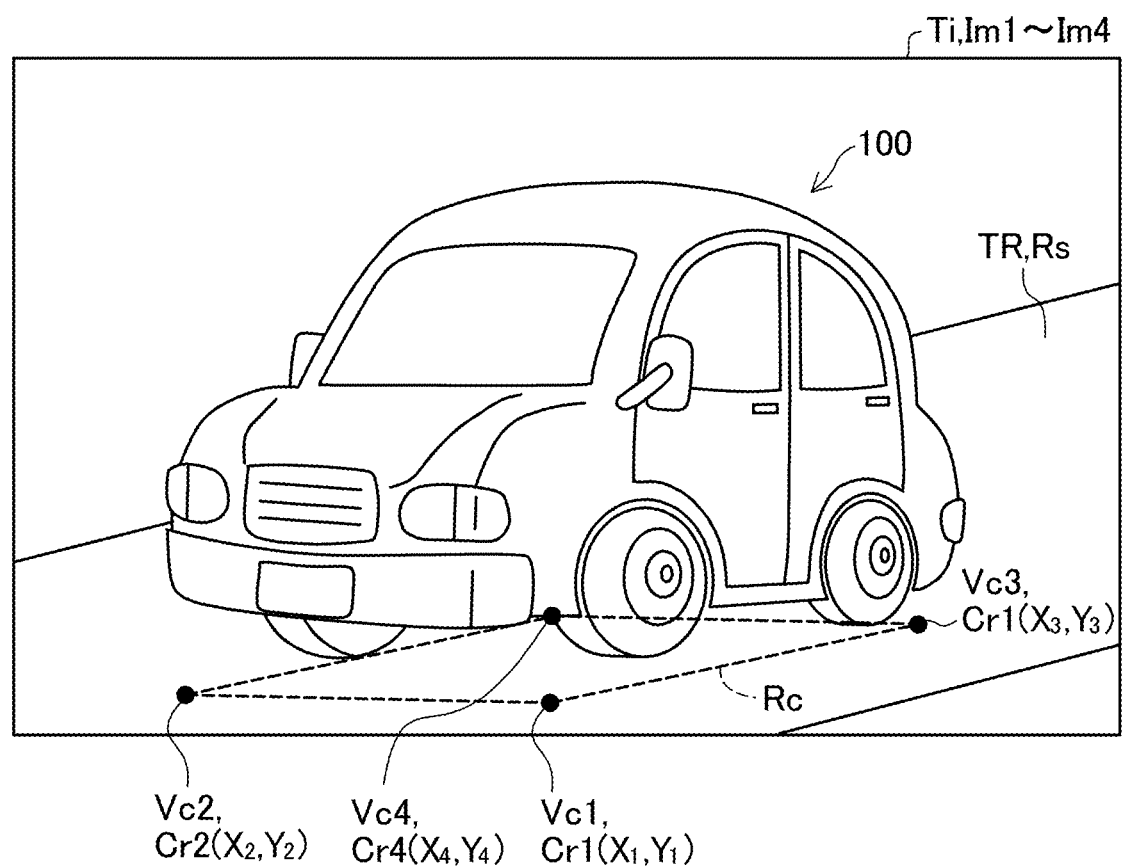
FIG. 19 is a diagram for illustrating a rectangle coordinate value.

FIG. 19 is a diagram for illustrating rectangle coordinate values Cr1 to Cr4. The rectangle coordinate values Cr1 to Cr4 are the coordinate values of four vertices Vc1 to Vc4 of a vehicle bounding rectangle Rc. The vehicle bounding rectangle Rc is a rectangle set to surround the region occupied by the vehicle 100 when the vehicle 100 is projected onto the road surface Rs in the images Ti, and Im1 to Im4. The rectangle coordinate values Cr1 to Cr4 are used to calculate at least one of the position and orientation of the vehicle 100.

As shown in FIG. 18, the information processing device 200c includes a computer with a processor 201c, a memory 202c, the input/output interface 203, and the internal bus 204.

The memory 202c stores various types of information, including a program PG2c that controls operation of the information processing device 200c, the reference route RR, a plurality of second learning models DM2 prepared for the respective external cameras 300, a rectangle database Db1, and a camera parameter Pa.

The second learning model DM2 outputs the rectangle coordinate values Cr1 to Cr4 when captured images Im1 to Im4 are input. The second learning model DM2 has been trained in advance by supervised learning using a second initial training data group. The second initial training data group includes a plurality of second initial training data sets that correspond to respective imaging ranges of the plurality of external cameras 300. In each of the plurality of second initial training data sets, a training image Ti including a background image corresponding to the imaging range of the external camera 300 and a vehicle image is associated with a rectangle coordinate correct answer label. The rectangle coordinate correct answer label is a correct answer label indicating the coordinate values Cr1 to Cr4 of the four vertices Vc1 to Vc4 of the vehicle bounding rectangle Rc set for the vehicle 100 included in the training image Ti. In the rectangle coordinate correct answer label, each of the coordinate values Cr1 to Cr4 is associated with supplementary information indicating which of the four vertices Vc1 to Vc4 of the vehicle bounding rectangle Rc corresponds to each of the coordinate values Cr1 to Cr4. In the present embodiment, the rectangle coordinate values Cr1 to Cr4 output from the second learning model DM2 are coordinate values in the local coordinate system. Therefore, in the rectangle coordinate correct answer label, each of the coordinate values Cr1 to Cr4 is expressed in the local coordinate system.

As the second learning model DM2, for example, a CNN for implementing either semantic segmentation or instance segmentation may be used. Upon the training of the CNN, for example, CNN parameters are updated by back-propagation (error back-propagation) to reduce errors between the output result of the second learning model DM2 and the rectangle coordinate correct answer label.

The rectangle database Db1 is used to calculate the coordinate value of the positioning point 10e of the vehicle 100 from the rectangle coordinate values Cr1 to Cr4. The rectangle database Db1 is a database that shows the relative positions of each of the vertices Vc1 to Vc4 of the vehicle bounding rectangle Rc and the positioning point 10e of the vehicle 100.

The camera parameter Pa is a parameter regarding the external camera 300. In the present embodiment, the camera parameter Pa is used to transform the coordinate value of the positioning point 10e of the vehicle 100 expressed in the local coordinate system to the coordinate value in the global coordinate system GC. The camera parameter Pa is, for example, a location where the external camera 300 is provided, orientation in which the external camera 300 is provided, and a focal length.

The processor 201c functions as an accuracy acquisition unit 211c, a training data acquisition unit 212c, a training unit 213c, a control information acquisition unit 214c, a position acquisition unit 215c, the signal generation unit 216, and the transmission unit 217, by executing the program PG2c stored in the memory 202c.

The accuracy acquisition unit 211c acquires the accuracy of the second learning model DM2, which has been trained in advance using the second initial training data group. In the present embodiment, the second learning model DM2 is prepared for each external camera 300. Therefore, the accuracy acquisition unit 211c acquires the accuracy of each of the plurality of second learning models DM2 corresponding to the respective external cameras 300.

The training data acquisition unit 212c performs the following process if the accuracy of the second learning model DM2 is less than a predetermined threshold when captured images Im1 to Im4 acquired by some of the plurality of external cameras 300 are input to the second learning model DM2. In this case, the training data acquisition unit 212c acquires a second additional training data group, which is used to retrain the second learning model DM2 as additional learning. The second additional training data group includes one or more second additional training data sets in which a training image Ti including a background image corresponding to the imaging range of the external camera 300 that acquired the captured images Im1 to Im4 for which accuracy is less than the threshold and a vehicle image is associated with a rectangle coordinate correct answer label. In the present embodiment, the second learning model DM2 is prepared for each external camera 300. Therefore, the training data acquisition unit 212c acquires the second additional training data group for retraining the second learning model DM2 having accuracy less than the threshold.

The training unit 213c performs the following process if the accuracy of the second learning model DM2 is less than a predetermined threshold when captured images Im1 to Im4 acquired by some of the plurality of external cameras 300 are input to the second learning model DM2. In this case, the training unit 213c performs the retraining process to retrain the second learning model DM2. In the present embodiment, the second learning model DM2 is prepared for each external camera 300. Therefore, the training unit 213c retrains the second learning model DM2 corresponding to the external camera 300 that acquired the captured images Im1 to Im4 for which accuracy is less than the threshold using the acquired second additional training data group.

The control information acquisition unit 214c acquires the rectangle coordinate values Cr1 to Cr4 by inputting the captured images Im1 to Im4 to the second learning model DM2. In the present embodiment, the second learning model DM2 is prepared for each external camera 300. Therefore, the control information acquisition unit 214c acquires the rectangle coordinate values Cr1 to Cr4 by inputting the captured images Im1 to Im4 to the second learning model DM2 corresponding to the external camera 300 that acquired the captured images Im1 to Im4. At this time, when the retraining process is completed, the control information acquisition unit 214c acquires the rectangle coordinate values Cr1 to Cr4 by inputting the captured images Im1 to Im4 to the second learning model DM2 that has been trained by the retraining process.

The position acquisition unit 215c calculates the coordinate value of the positioning point 10e of the vehicle 100 from the rectangle coordinate values Cr1 to Cr4 using the rectangle database Db1. Then, the position acquisition unit 215c transforms the coordinate value of the positioning point 10e of the vehicle 100 expressed in the local coordinate system to the coordinate value in the global coordinate system GC using the camera parameter Pa. Here, in order to acquire the camera parameter Pa, the position acquisition unit 215c may acquire a camera identifier, which is used to distinguish the plurality of external cameras 300 from one another and indicate the external camera 300 that has acquired the captured images Im1 to Im4.

The position acquisition unit 215c further calculates the orientation of the vehicle 100. The position acquisition unit 215c calculates the orientation of the vehicle 100 using, for example, the shape of the vehicle bounding rectangle Rc, the supplementary information indicating which of the four vertices Vc1 to Vc4 of the vehicle bounding rectangle Rc corresponds to each of the coordinate values Cr1 to Cr4, and the like.

Figure 20:
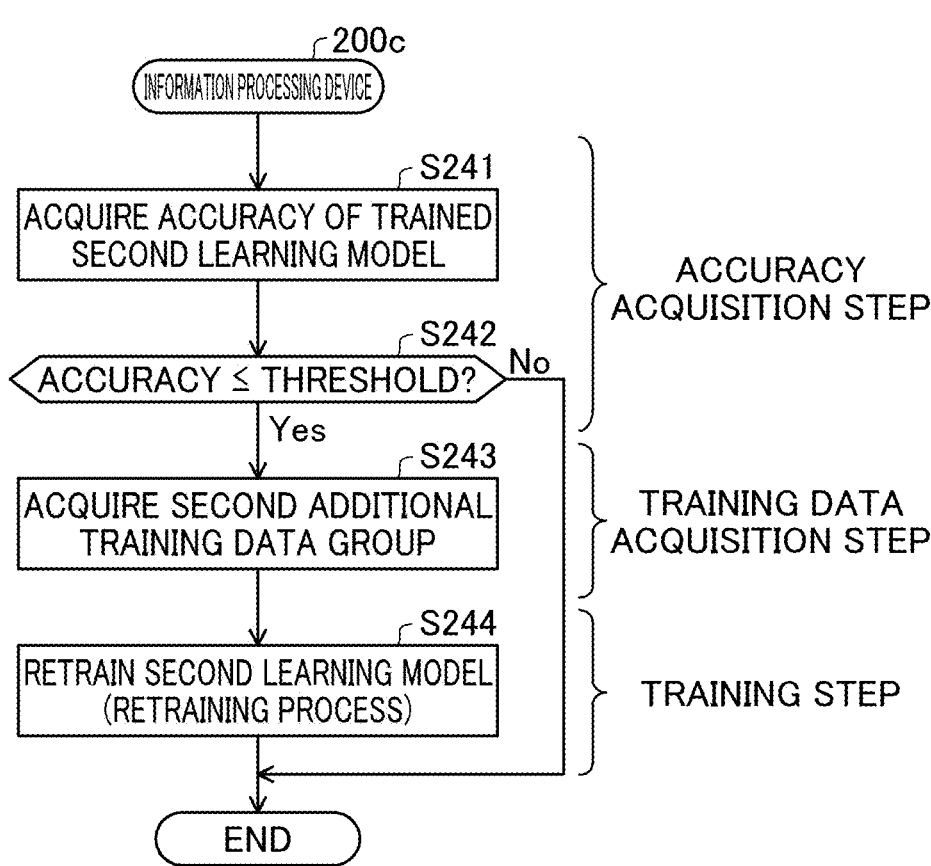
FIG. 20 is a flowchart showing a method for training process in the fourth embodiment.

FIG. 20 is a flowchart showing a method for training process in the fourth embodiment. The flow shown in FIG. 20 is repeated, for example, every predetermined time from the time point at which the running of the vehicle 100 by unmanned driving is started.

In an accuracy acquisition step, the accuracy acquisition unit 211c acquires the accuracy of the second learning model DM2, which has been trained in advance using the second initial training data group (step S241). A training data acquisition step is performed if the accuracy of the second learning model DM2 is less than a predetermined threshold when captured images Im1 to Im4 acquired by some of the plurality of external cameras 300 are input to the second learning model DM2 (step S242: Yes). In the training data acquisition step, the training data acquisition unit 212c acquires the second additional training data group (step S243). After the training data acquisition step, a training step is performed. In the training step, the training unit 213c performs the retraining process for retraining the second learning model DM2 using the acquired second additional training data group (step S244). On the other hand, the processor 201c ends the flow without performing the training data acquisition step or the training step if the accuracy of the second learning model DM2 is equal to or greater than a predetermined threshold when captured images Im1 to Im4 acquired by some of the plurality of external cameras 300 are input to the second learning model DM2 (step S242: No).

Figure 21:
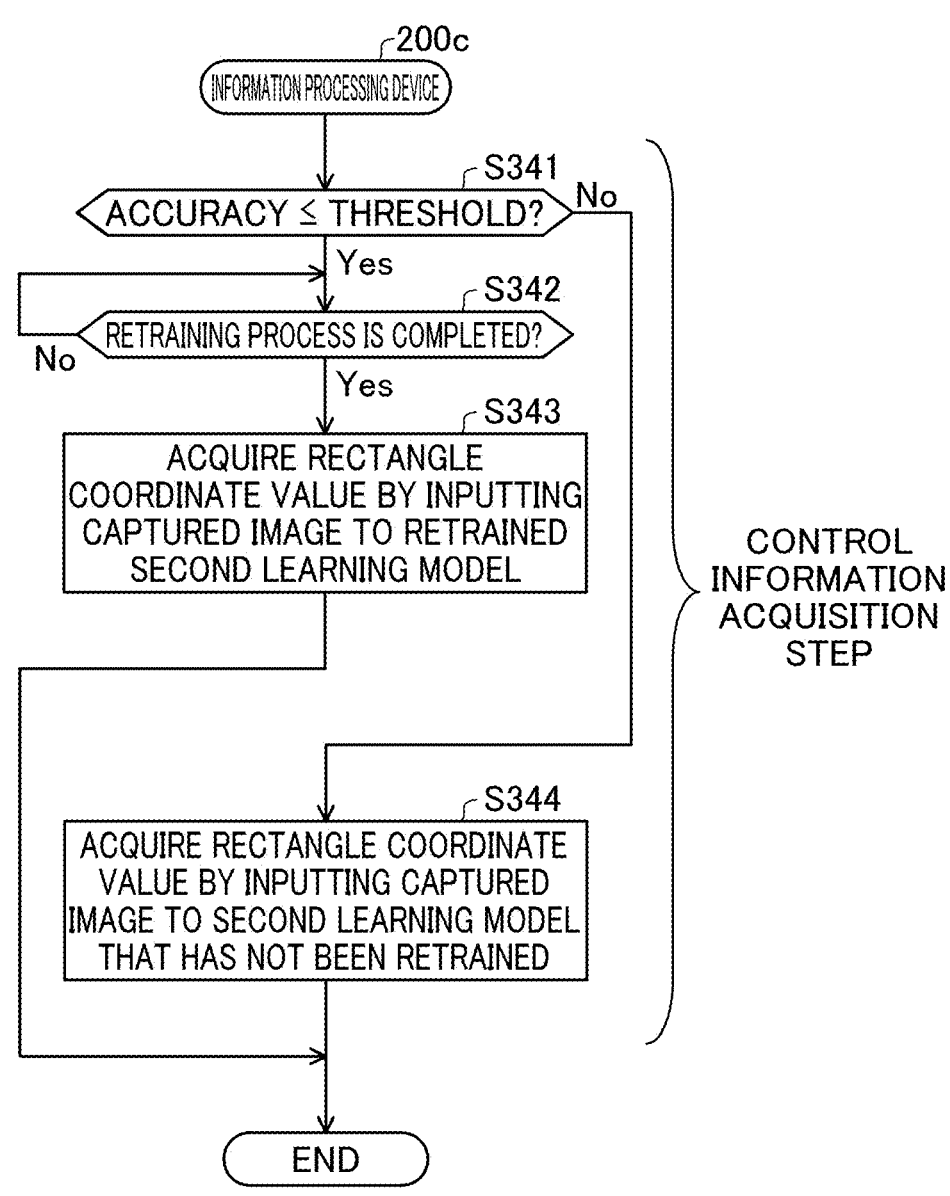
FIG. 21 is a flowchart showing a method for acquiring a rectangle coordinate value.

FIG. 21 is a flowchart showing a method for acquiring the rectangle coordinate values Cr1 to Cr4. The flow shown in FIG. 21 is repeated, for example, every predetermined time from the time point at which the running of the vehicle 100 by unmanned driving is started.

In a control information acquisition step, the control information acquisition unit 214c acquires the rectangle coordinate values Cr1 to Cr4 by performing the following process. Specifically, if the accuracy of the second learning model DM2 is less than a predetermined threshold when captured images Im1 to Im4 acquired by some of the plurality of external cameras 300 are input to the second learning model DM2 (step S341: Yes), when the retraining process is completed (step S342: Yes), the control information acquisition unit 214c acquires the rectangle coordinate values Cr1 to Cr4 by inputting the captured images Im1 to Im4 to the second learning model DM2 that has been trained by the retraining process (step S343). On the other hand, if the accuracy of the second learning model DM2 is equal to or greater than a predetermined threshold when captured images Im1 to Im4 acquired by some of the plurality of external cameras 300 are input to the second learning model DM2 (step S341: No), the control information acquisition unit 214c acquires the rectangle coordinate values Cr1 to Cr4 by inputting the captured images Im1 to Im4 to the second learning model DM2 that has not been trained by the retraining process (step S344).

According to the fourth embodiment described above, the information processing device 200c can perform the following process if the accuracy is less than a threshold when captured images Im1 to Im4 acquired by some of the plurality of external cameras 300 are input to the trained second learning model DM2. In this case, the information processing device 200c can retrain the second learning model DM2 using the second additional training data set in which the training image Ti including a background image corresponding to the imaging range of the external camera 300 that acquired the captured images Im1 to Im4 for which the accuracy is less than a threshold and the vehicle image is associated with the rectangle coordinate correct answer label. In this way, it is possible to suppress the decrease in accuracy of the second learning model DM2 when the appearance state in the imaging range of some of the plurality of external cameras 300 has changed from the appearance state at the time when the second learning model DM2 was trained.

Further, according to the fourth embodiment described above, when the retraining process is completed, the information processing device 200c can acquire the rectangle coordinate values Cr1 to Cr4 by inputting the captured images Im1 to Im4 to the second learning model DM2 that has been trained by the retraining process. This makes it possible to suppress the decrease in accuracy of the rectangle coordinate values Cr1 to Cr4 calculated using the captured images Im1 to Im4 acquired by some of the plurality of external cameras 300.

Note that, the rectangle coordinate values Cr1 to Cr4 may be either the coordinate values in the camera coordinate system or the coordinate values in the global coordinate system GC. If the rectangle coordinate values Cr1 to Cr4 are either the coordinate values in the camera coordinate system or the coordinate values in the global coordinate system GC, the second learning model DM2 is trained, for example, as follows. In this case, the second learning model DM2 is trained, for example, by associating at least one of the camera identifier indicating the external camera 300 that acquired the training image Ti, and the camera parameter Pa of the external camera 300 that acquired the training image Ti, with the training image Ti. Further, in this case, in the rectangle coordinate correct answer label, each of the coordinate values Cr1 to Cr4 is expressed, for example, by the same coordinate system as that of the rectangle coordinate values Cr1 to Cr4 that are output.

Further, the information processing device 200c may acquire the coordinate value of the ground in contact with wheels as the signal generation parameter, instead of the rectangle coordinate values Cr1 to Cr4. Also in such an embodiment, the information processing device 200c acquires the rectangle coordinate values Cr1 to Cr4, thereby generating a running control signal.

E. Fifth Embodiment

Figure 22:
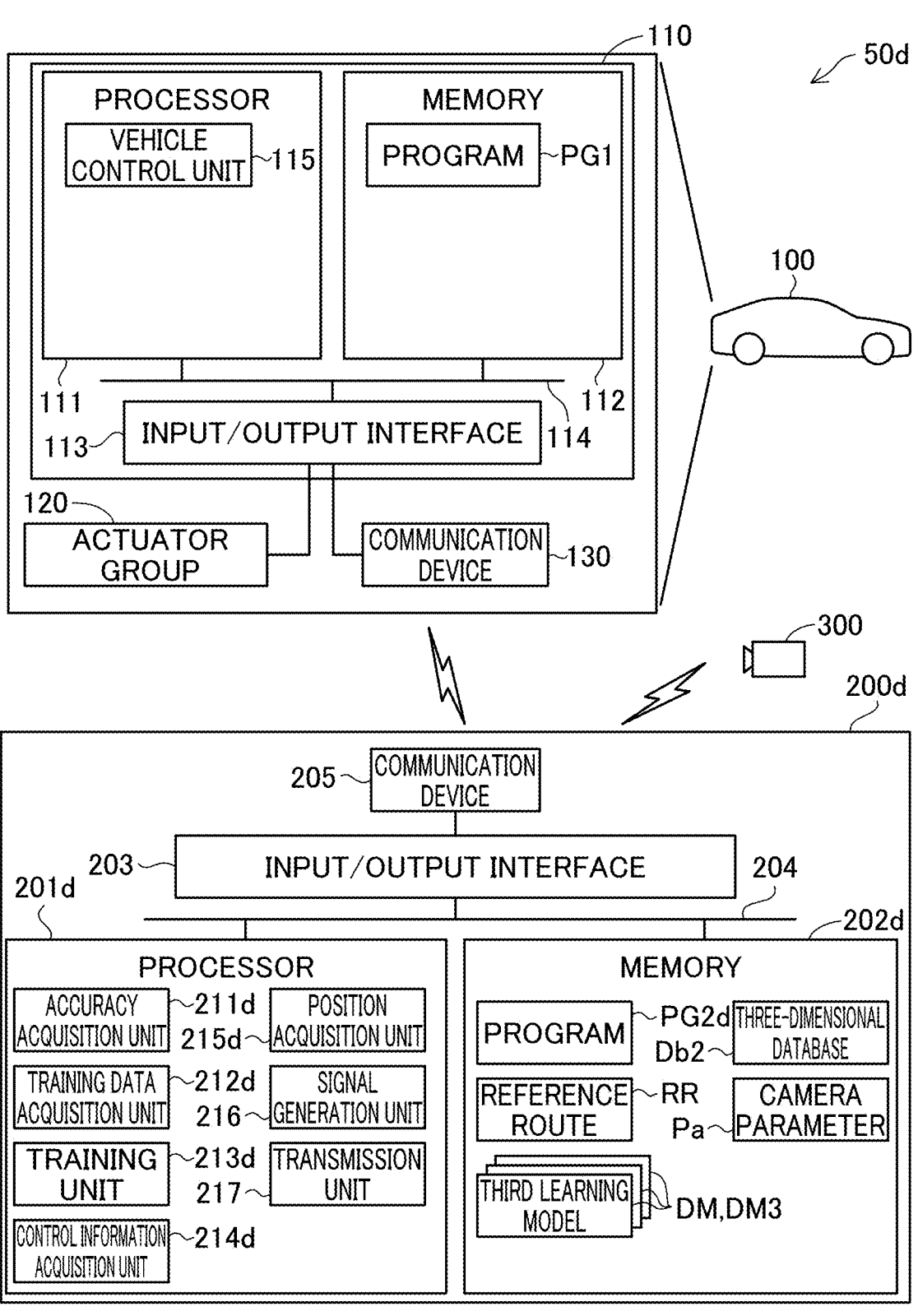
FIG. 22 is a block diagram showing a structure of an information processing system in a fifth embodiment.

FIG. 22 is a block diagram showing a structure of an information processing system 50d in the fifth embodiment. The information processing system 50d includes one or more vehicles 100, a plurality of external cameras 300, and an information processing device 200d. In the present embodiment, the information processing device 200d acquires a three-dimensional coordinate value as the signal generation parameter by inputting the captured images Im1 to Im4 to a third learning model DM3 as the machine learning model DM. The rest of the structure of the information processing system 50d is the same as that of the first embodiment, unless otherwise specified. The same structure as that of the first embodiment is described with the same reference symbols and the explanation thereof is omitted.

Figure 23:
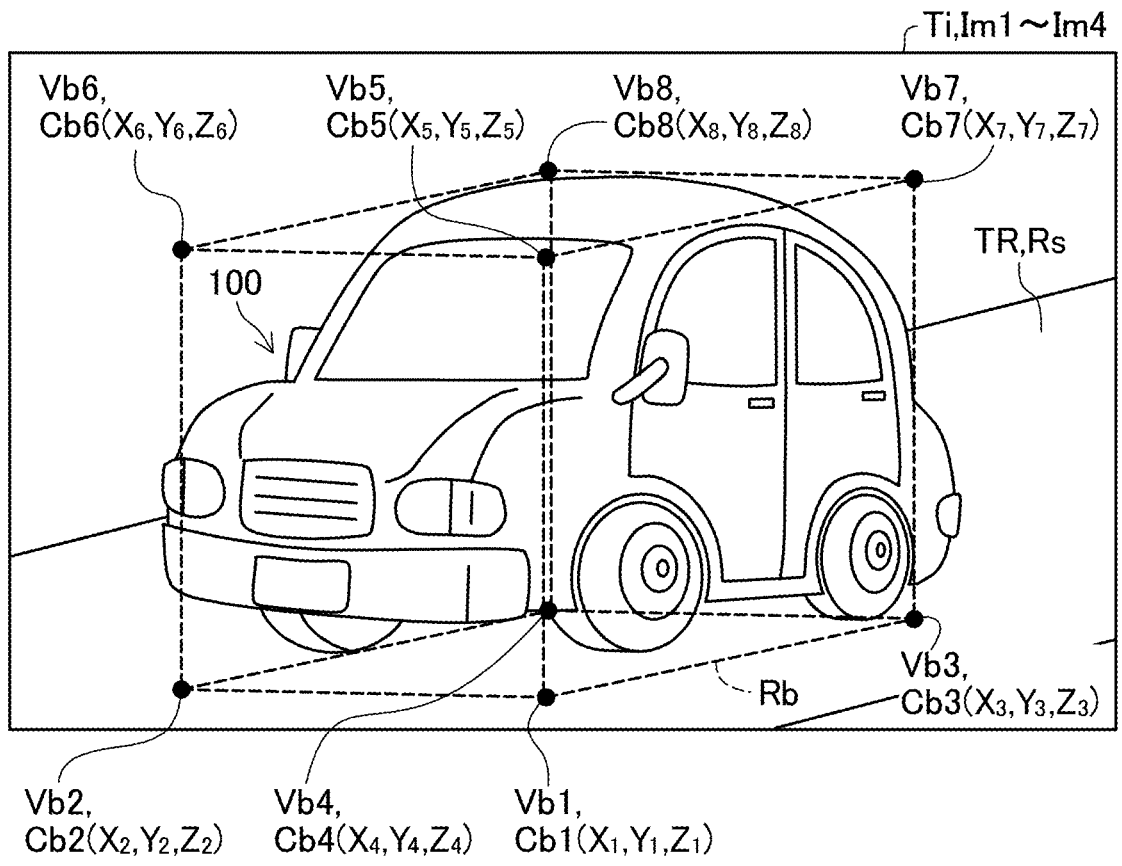
FIG. 23 is a diagram for illustrating a three-dimensional coordinate value.

FIG. 23 is a diagram for illustrating three-dimensional coordinate values Cb1 to Cb8. The three-dimensional coordinate values Cb1 to Cb8 are the coordinate values of eight vertices Vb1 to Vb8 of a vehicle bounding box Rb. The vehicle bounding box Rb is a rectangle set to surround the vehicle 100 in the images Ti, and Im1 to Im4. The three-dimensional coordinate values Cb1 to Cb8 are used to calculate at least one of the position and orientation of the vehicle 100.

As shown in FIG. 22, the information processing device 200d includes a computer with a processor 201d, a memory 202d, the input/output interface 203, and the internal bus 204.

The memory 202d stores various types of information, including a program PG2d that controls operation of the information processing device 200d, the reference route RR, a plurality of third learning models DM3 prepared for the respective external cameras 300, a three-dimensional database Db2, and the camera parameter Pa.

The third learning model DM3 outputs the three-dimensional coordinate values Cb1 to Cb8 when the captured images Im1 to Im4 are input. The third learning model DM3 has been trained in advance by supervised learning using a third initial training data group. The third initial training data group includes a plurality of third initial training data sets that correspond to respective imaging ranges of the plurality of external cameras 300. In each of the plurality of third initial training data sets, a training image Ti including a background image corresponding to the imaging range of the external camera 300 and a vehicle image is associated with a three-dimensional coordinate correct answer label. The three-dimensional coordinate correct answer label is a correct answer label indicating the coordinate values Cb1 to Cb8 of the eight vertices Vb1 to Vb8 of the vehicle bounding box Rb set for the vehicle 100 included in the training image Ti. In the three-dimensional coordinate correct answer label, each of the coordinate values Cb1 to Cb8 is associated with supplementary information indicating which of the eight vertices Vb1 to Vb8 of the vehicle bounding box Rb corresponds to each of the coordinate values Cb1 to Cb8. In the present embodiment, the three-dimensional coordinate values Cb1 to Cb8 output from the third learning model DM3 are coordinate values in the camera coordinate system. Therefore, in the three-dimensional coordinate correct answer label, each of the coordinate values Cb1 to Cb8 is expressed in the camera coordinate system. Further, the third learning model DM3 is trained by associating the training image Ti with at least one of the camera parameter Pa and the camera identifier used to acquire the camera parameter Pa.

As the third learning model DM3, for example, a CNN for implementing either semantic segmentation or instance segmentation may be used. Upon the training of the CNN, for example, CNN parameters are updated by back-propagation (error back-propagation) to reduce errors between the output result of the third learning model DM3 and the three-dimensional coordinate correct answer label.

The three-dimensional database Db2 is used to calculate the coordinate value of the positioning point 10e of the vehicle 100 from the three-dimensional coordinate values Cb1 to Cr8. The three-dimensional database Db2 is a database that shows the relative positions of each of the vertices Vb1 to Vb8 of the vehicle bounding box Rb and the positioning point 10e of the vehicle 100.

The processor 201d functions as an accuracy acquisition unit 211d, a training data acquisition unit 212d, a training unit 213d, a control information acquisition unit 214d, a position acquisition unit 215d, the signal generation unit 216, and the transmission unit 217, by executing the program PG2d stored in the memory 202d.

The accuracy acquisition unit 211d acquires the accuracy of the third learning model DM3, which has been trained in advance using the third initial training data group. In the present embodiment, the third learning model DM3 is prepared for each external camera 300. Therefore, the accuracy acquisition unit 211d acquires the accuracy of each of the plurality of third learning models DM3 corresponding to the respective external cameras 300.

The training data acquisition unit 212d performs the following process if the accuracy of the third learning model DM3 is less than a predetermined threshold when captured images Im1 to Im4 acquired by some of the plurality of external cameras 300 are input to the third learning model DM3. In this case, the training data acquisition unit 212d acquires a third additional training data group, which is used to retrain the third learning model DM3 as additional learning. The third additional training data group includes one or more third additional training data sets in which a training image Ti including a background image corresponding to the imaging range of the external camera 300 that acquired the captured images Im1 to Im4 for which accuracy is less than the threshold and a vehicle image is associated with a three-dimensional coordinate correct answer label. In the present embodiment, the third learning model DM3 is prepared for each external camera 300. Therefore, the training data acquisition unit 212d acquires the third additional training data group for retraining the third learning model DM3 having accuracy less than the threshold.

The training unit 213d performs the following process if the accuracy of the third learning model DM3 is less than a predetermined threshold when captured images Im1 to Im4 acquired by some of the plurality of external cameras 300 are input to the third learning model DM3. In this case, the training unit 213d performs the retraining process to retrain the third learning model DM3. In the present embodiment, the third learning model DM3 is prepared for each external camera 300. Therefore, the training unit 213d retrains the third learning model DM3 corresponding to the external camera 300 that acquired the captured images Im1 to Im4 for which accuracy is less than the threshold using the acquired third additional training data group.

The control information acquisition unit 214d acquires the three-dimensional coordinate values Cb1 to Cb8 by inputting the captured images Im1 to Im4 to the third learning model DM3. In the present embodiment, the third learning model DM3 is prepared for each external camera 300. Therefore, the control information acquisition unit 214d acquires the three-dimensional coordinate values Cb1 to Cb8 by inputting the captured images Im1 to Im4 to the third learning model DM3 corresponding to the external camera 300 that acquired the captured images Im1 to Im4. At this time, when the retraining process is completed, the control information acquisition unit 214d acquires the three-dimensional coordinate values Cb1 to Cb8 by inputting the captured images Im1 to Im4 to the third learning model DM3 that has been trained by the retraining process.

The position acquisition unit 215d calculates the coordinate value of the positioning point 10e of the vehicle 100 from the three-dimensional coordinate values Cb1 to Cb8 using the three-dimensional database Db2. Then, the position acquisition unit 215d transforms the coordinate value of the positioning point 10e of the vehicle 100 expressed in the local coordinate system to the coordinate value in the camera coordinate system using the camera parameter Pa. Here, in order to acquire the camera parameter Pa, the position acquisition unit 215d may acquire the camera identifier.

The position acquisition unit 215d further calculates the orientation of the vehicle 100. The position acquisition unit 215d calculates the orientation of the vehicle 100 using, for example, the shape of the vehicle bounding box Rb, the supplementary information indicating which of the eight vertices Vb1 to Vb8 of the vehicle bounding box Rb corresponds to each of the coordinate values Cb1 to Cb8, and the like.

Figure 24:
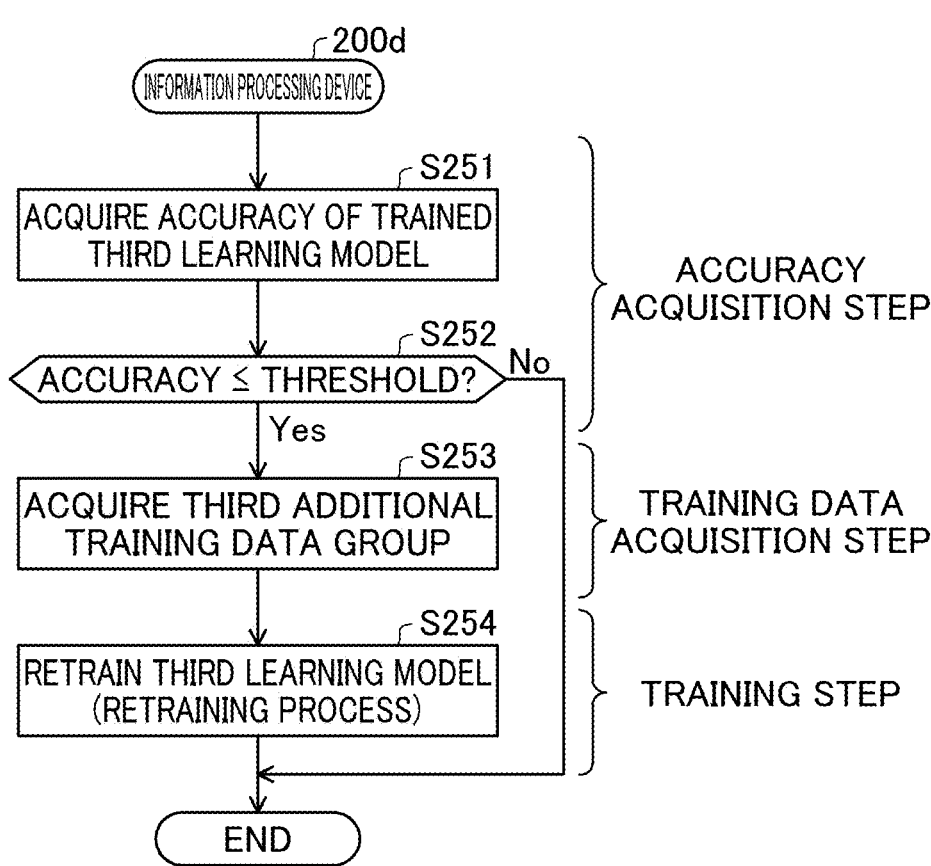
FIG. 24 is a flowchart showing a method for training process in the fifth embodiment.

FIG. 24 is a flowchart showing a method for training process in the fifth embodiment. The flow shown in FIG. 24 is repeated, for example, every predetermined time from the time point at which the running of the vehicle 100 by unmanned driving is started.

In an accuracy acquisition step, the accuracy acquisition unit 211d acquires the accuracy of the third learning model DM3, which has been trained in advance using the third initial training data group (step S251). A training data acquisition step is performed if the accuracy of the third learning model DM3 is less than a predetermined threshold when captured images Im1 to Im4 acquired by some of the plurality of external cameras 300 are input to the third learning model DM3 (step S252: Yes). In the training data acquisition step, the training data acquisition unit 212d acquires the third additional training data group (step S253). After the training data acquisition step, a training step is performed. In the training step, the training unit 213d performs the retraining process for retraining the third learning model DM3 using the acquired third additional training data group (step S254). On the other hand, the processor 201d ends the flow without performing the training data acquisition step or the training step if the accuracy of the third learning model DM3 is equal to or greater than a predetermined threshold when captured images Im1 to Im4 acquired by some of the plurality of external cameras 300 are input to the third learning model DM3 (step S252: No).

Figure 25:
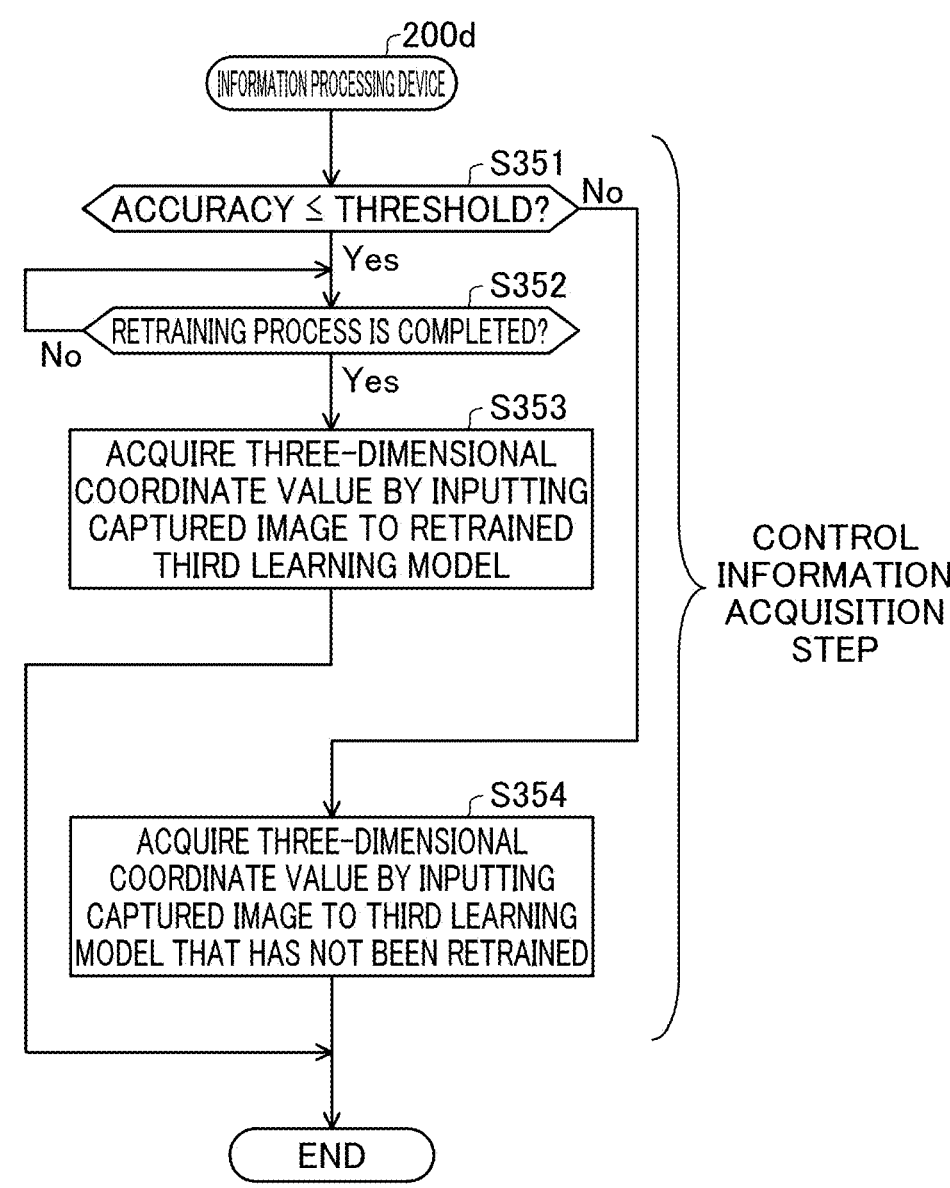
FIG. 25 is a flowchart showing a method for acquiring a three-dimensional coordinate value.

FIG. 25 is a flowchart showing a method for acquiring the three-dimensional coordinate values Cb1 to Cb8. The flow shown in FIG. 25 is repeated, for example, every predetermined time from the time point at which the running of the vehicle 100 by unmanned driving is started.

In a control information acquisition step, the control information acquisition unit 214d acquires the three-dimensional coordinate values Cb1 to Cb8 by performing the following process. Specifically, if the accuracy of the third learning model DM3 is less than a predetermined threshold when captured images Im1 to Im4 acquired by some of the plurality of external cameras 300 are input to the third learning model DM3 (step S351: Yes), when the retraining process is completed (step S352: Yes), the control information acquisition unit 214d acquires the three-dimensional coordinate values Cb1 to Cb8 by inputting the captured images Im1 to Im4 to the third learning model DM3 that has been trained by the retraining process (step S353). On the other hand, if the accuracy of the third learning model DM3 is equal to or greater than a predetermined threshold when captured images Im1 to Im4 acquired by some of the plurality of external cameras 300 are input to the third learning model DM3 (step S351: No), the control information acquisition unit 214d acquires the three-dimensional coordinate values Cb1 to Cb8 by inputting the captured images Im1 to Im4 to the third learning model DM3 that has not been trained by the retraining process (step S354).

According to the fifth embodiment described above, the information processing device 200d can perform the following process if the accuracy is less than a threshold when captured images Im1 to Im4 acquired by some of the plurality of external cameras 300 are input to the trained third learning model DM3. In this case, the information processing device 200d can retrain the third learning model DM3 using the third additional training data set in which the training image Ti including a background image corresponding to the imaging range of the external camera 300 that acquired the captured images Im1 to Im4 for which the accuracy is less than a threshold and the vehicle image is associated with the three-dimensional coordinate correct answer label. In this way, it is possible to suppress the decrease in accuracy of the third learning model DM3 when the appearance state in the imaging range of some of the plurality of external cameras 300 has changed from the appearance state at the time when the third learning model DM3 was trained.

Further, according to the fifth embodiment described above, when the retraining process is completed, the information processing device 200d can acquire the three-dimensional coordinate values Cb1 to Cb8 by inputting the captured images Im1 to Im4 to the third learning model DM3 that has been trained by the retraining process. This makes it possible to suppress the decrease in accuracy of the three-dimensional coordinate values Cb1 to Cb8 calculated using the captured images Im1 to Im4 acquired by some of the plurality of external cameras 300.

Note that, the three-dimensional coordinate values Cb1 to Cb8 may be either the coordinate values in the local coordinate system or the coordinate values in the global coordinate system GC.

F. Sixth Embodiment

Figure 26:
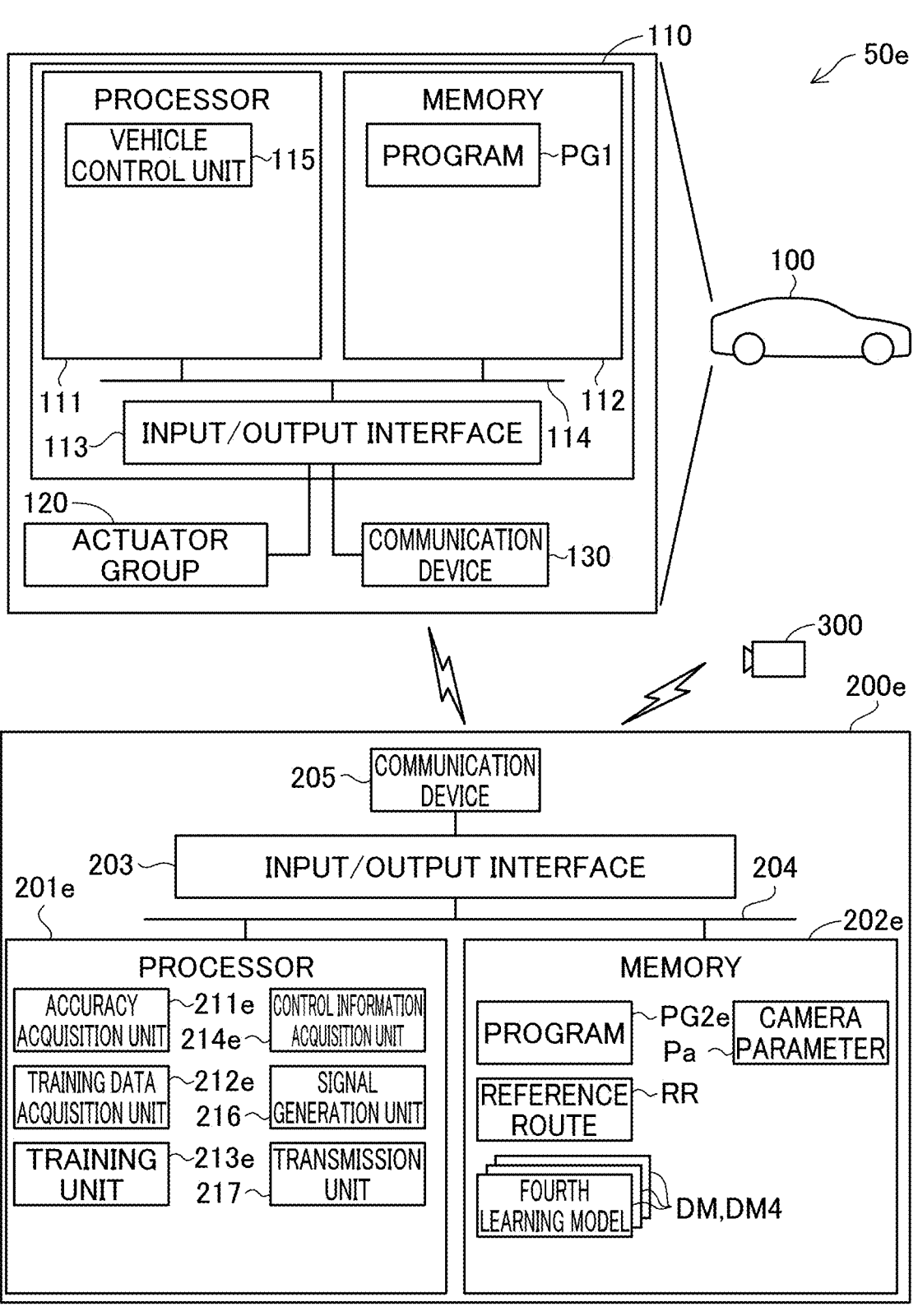
FIG. 26 is a block diagram showing a structure of an information processing system in a sixth embodiment.

FIG. 26 is a block diagram showing a structure of an information processing system 50e in the sixth embodiment. The information processing system 50e includes one or more vehicles 100, a plurality of external cameras 300, and an information processing device 200e. In the present embodiment, the information processing device 200e acquires the vehicle position information as the signal generation parameter by inputting the captured images Im1 to Im4 to a fourth learning model DM4 as the machine learning model DM. The rest of the structure of the information processing system 50e is the same as that of the first embodiment, unless otherwise specified. The same structure as that of the first embodiment is described with the same reference symbols and the explanation thereof is omitted.

The information processing device 200e includes a computer with a processor 201e, a memory 202e, the input/output interface 203, and the internal bus 204.

The memory 202e stores various types of information, including a program PG2e that controls operation of the information processing device 200e, the reference route RR, a plurality of fourth learning models DM4 prepared for the respective external cameras 300, and the camera parameter Pa. In the present embodiment, a program for generating a running control signal is prepared for each external camera 300. Therefore, the reference route RR is prepared for each external camera 300. Further, the target location determined in the process of generating a running control signal is expressed by X, Y, and Z coordinates in the camera coordinate system.

The fourth learning model DM4 outputs the vehicle position information when the captured images Im1 to Im4 are input. In the present embodiment, when the captured images Im1 to Im4 are input, the fourth learning model DM4 outputs the coordinate value of the positioning point 10e of the vehicle 100 and the orientation of the vehicle 100. The fourth learning model DM4 has been trained in advance by supervised learning using a fourth initial training data group. The fourth initial training data group includes a plurality of fourth initial training data sets that correspond to respective imaging ranges of the plurality of external cameras 300. In each of the plurality of fourth initial training data sets, a training image Ti including a background image corresponding to the imaging range of the external camera 300 and a vehicle image is associated with a position coordinate correct answer label and an orientation correct answer label. The orientation correct answer label is a correct answer label indicating the orientation of the vehicle 100 included in the training image Ti. The position coordinate correct answer label is a correct answer label indicating the coordinate value of the positioning point 10e of the vehicle 100 included in the training image Ti. In the present embodiment, the coordinate value of the positioning point 10e of the vehicle 100 output from the fourth learning model DM4 is the coordinate value in the camera coordinate system. Therefore, in the position coordinate correct answer label, the coordinate value of the positioning point 10e of the vehicle 100 is expressed in the camera coordinate system. Further, the fourth learning model DM4 is trained by associating the training image Ti with at least one of the camera parameter Pa and the camera identifier used to acquire the camera parameter Pa.

As the fourth learning model DM4, for example, a CNN for implementing either semantic segmentation or instance segmentation may be used. Upon the training of the CNN, for example, CNN parameters are updated by back-propagation (error back-propagation) to reduce errors between the output result of the fourth learning model DM4 and the position coordinate correct answer label and the orientation correct answer label.

The processor 201e functions as an accuracy acquisition unit 211e, a training data acquisition unit 212e, a training unit 213e, a control information acquisition unit 214e, the signal generation unit 216, and the transmission unit 217, by executing the program PG2e stored in the memory 202e.

The accuracy acquisition unit 211e acquires the accuracy of the fourth learning model DM4, which has been trained in advance using the fourth initial training data group. In the present embodiment, the fourth learning model DM4 is prepared for each external camera 300. Therefore, the accuracy acquisition unit 211e acquires the accuracy of each of the plurality of fourth learning models DM4 corresponding to the respective external cameras 300.

The training data acquisition unit 212e performs the following process if the accuracy of the fourth learning model DM4 is less than a predetermined threshold when captured images Im1 to Im4 acquired by some of the plurality of external cameras 300 are input to the fourth learning model DM4. In this case, the training data acquisition unit 212e acquires a fourth additional training data group, which is used to retrain the fourth learning model DM4 as additional learning. The fourth additional training data group includes one or more fourth additional training data sets in which a training image Ti including a background image corresponding to the imaging range of the external camera 300 that acquired the captured images Im1 to Im4 for which accuracy is less than the threshold and a vehicle image is associated with a position coordinate correct answer label and an orientation correct answer label. In the present embodiment, the fourth learning model DM4 is prepared for each external camera 300. Therefore, the training data acquisition unit 212e acquires the fourth additional training data group for retraining the fourth learning model DM4 having accuracy less than the threshold.

The training unit 213e performs the following process if the accuracy of the fourth learning model DM4 is less than a predetermined threshold when captured images Im1 to Im4 acquired by some of the plurality of external cameras 300 are input to the fourth learning model DM4. In this case, the training unit 213e performs the retraining process to retrain the fourth learning model DM4. In the present embodiment, the fourth learning model DM4 is prepared for each external camera 300. Therefore, the training unit 213e retrains the fourth learning model DM4 corresponding to the external camera 300 that acquired the captured images Im1 to Im4 for which accuracy is less than the threshold using the acquired fourth additional training data group.

The control information acquisition unit 214e acquires the vehicle position information by inputting the captured images Im1 to Im4 to the fourth learning model DM4. In the present embodiment, the fourth learning model DM4 is prepared for each external camera 300. Therefore, the control information acquisition unit 214e acquires the vehicle position information by inputting the captured images Im1 to Im4 to the fourth learning model DM4 corresponding to the external camera 300 that acquired the captured images Im1 to Im4. At this time, when the retraining process is completed, the control information acquisition unit 214e acquires the vehicle position information by inputting the captured images Im1 to Im4 to the fourth learning model DM4 that has been trained by the retraining process.

Figure 27:
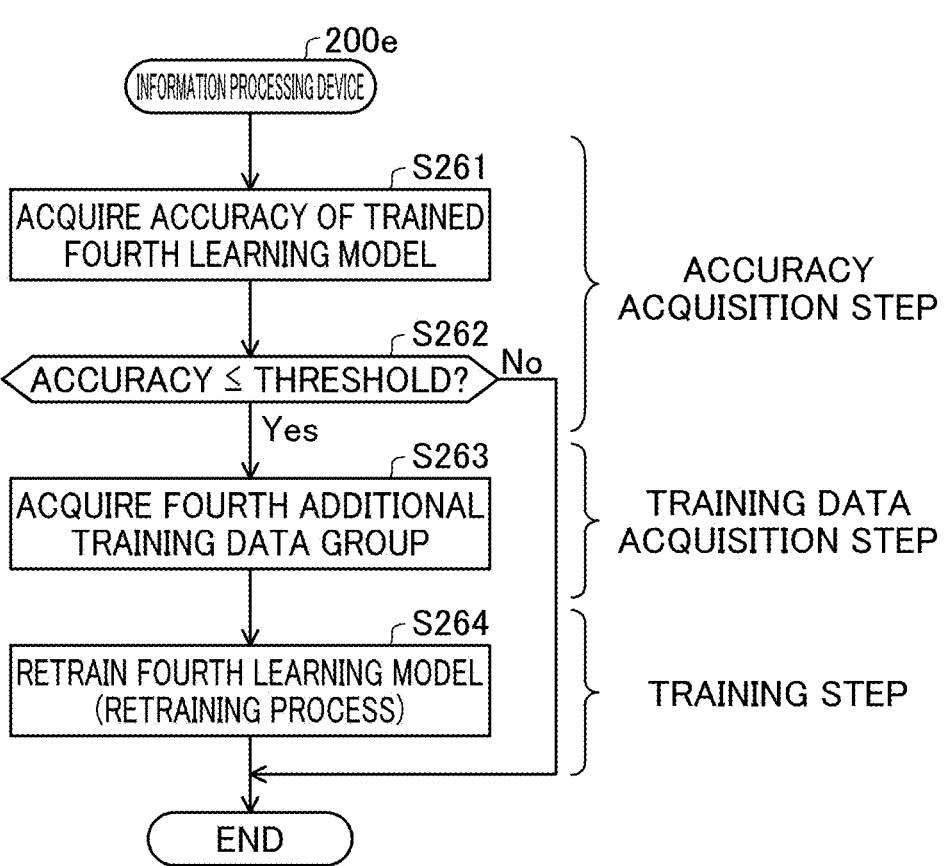
FIG. 27 is a flowchart showing a method for training process in the sixth embodiment.

FIG. 27 is a flowchart showing a method for training process in the sixth embodiment. The flow shown in FIG. 27 is repeated, for example, every predetermined time from the time point at which the running of the vehicle 100 by unmanned driving is started.

In an accuracy acquisition step, the accuracy acquisition unit 211e acquires the accuracy of the fourth learning model DM4, which has been trained in advance using the fourth initial training data group (step S261). A training data acquisition step is performed if the accuracy of the fourth learning model DM4 is less than a predetermined threshold when captured images Im1 to Im4 acquired by some of the plurality of external cameras 300 are input to the fourth learning model DM4 (step S262: Yes). In the training data acquisition step, the training data acquisition unit 212e acquires the fourth additional training data group (step S263). After the training data acquisition step, a training step is performed. In the training step, the training unit 213e performs the retraining process for retraining the fourth learning model DM4 using the acquired fourth additional training data group (step S264). On the other hand, the processor 201e ends the flow without performing the training data acquisition step or the training step if the accuracy of the fourth learning model DM4 is equal to or greater than a predetermined threshold when captured images Im1 to Im4 acquired by some of the plurality of external cameras 300 are input to the fourth learning model DM4 (step S262: No).

Figure 28:
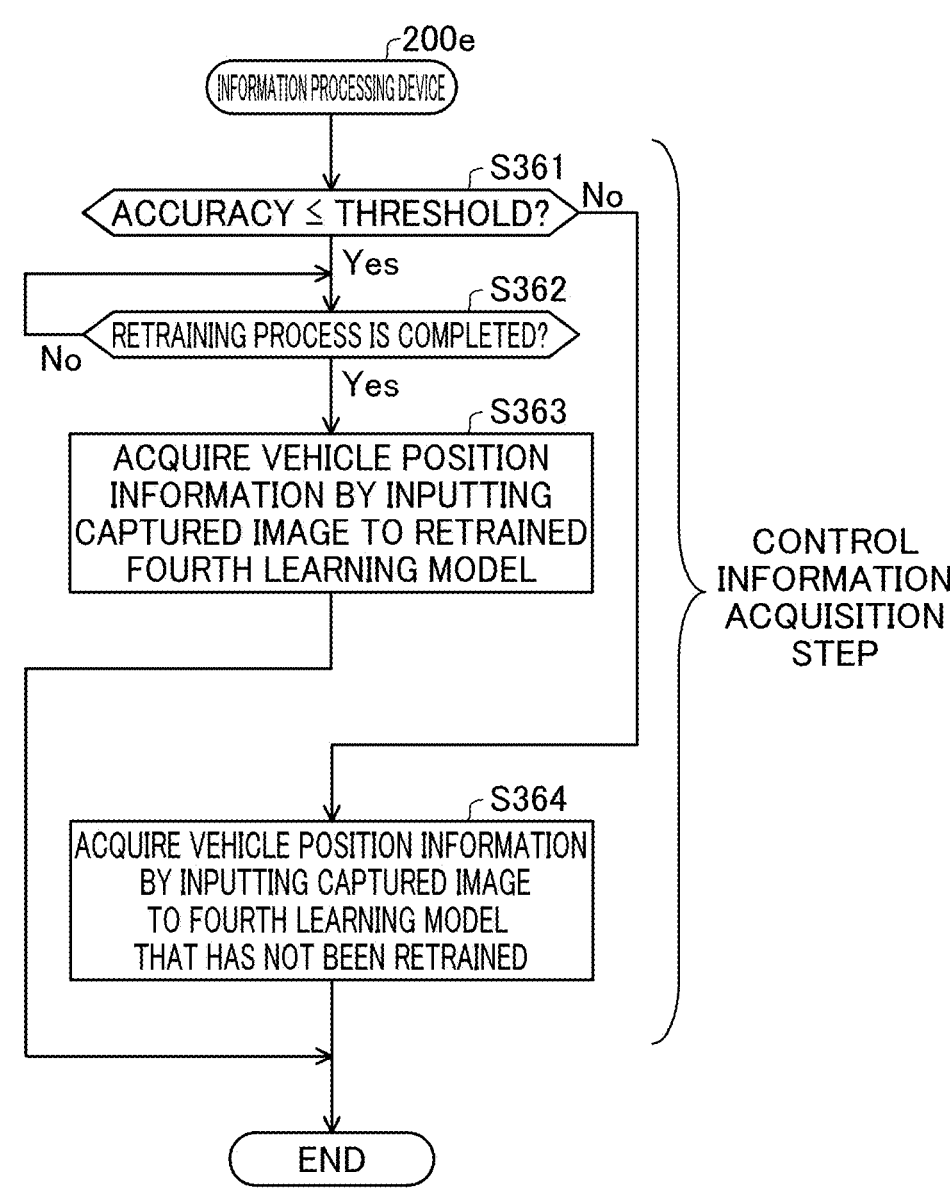
FIG. 28 is a flowchart showing a method for acquiring vehicle position information using a fourth learning model.

FIG. 28 is a flowchart showing a method for acquiring the vehicle position information using the fourth learning model DM4. The flow shown in FIG. 28 is repeated, for example, every predetermined time from the time point at which the running of the vehicle 100 by unmanned driving is started.

In a control information acquisition step, the control information acquisition unit 214e acquires the vehicle position information by performing the following process. Specifically, if the accuracy of the fourth learning model DM4 is less than a predetermined threshold when captured images Im1 to Im4 acquired by some of the plurality of external cameras 300 are input to the fourth learning model DM4 (step S361: Yes), when the retraining process is completed (step S362: Yes), the control information acquisition unit 214e acquires the vehicle position information by inputting the captured images Im1 to Im4 to the fourth learning model DM4 that has been trained by the retraining process (step S363). On the other hand, if the accuracy of the fourth learning model DM4 is equal to or greater than a predetermined threshold when captured images Im1 to Im4 acquired by some of the plurality of external cameras 300 are input to the fourth learning model DM4 (step S361: No), the control information acquisition unit 214e acquires the vehicle position information by inputting the captured images Im1 to Im4 to the fourth learning model DM4 that has not been trained by the retraining process (step S364).

According to the sixth embodiment described above, the information processing device 200e can perform the following process if the accuracy is less than a threshold when captured images Im1 to Im4 acquired by some of the plurality of external cameras 300 are input to the trained fourth learning model DM4. In this case, the information processing device 200e can retrain the fourth learning model DM4 using the fourth additional training data set in which the training image Ti including a background image corresponding to the imaging range of the external camera 300 that acquired the captured images Im1 to Im4 for which the accuracy is less than a threshold and the vehicle image is associated with the position coordinate correct answer label and the orientation correct answer label. In this way, it is possible to suppress the decrease in accuracy of the fourth learning model DM4 when the appearance state in the imaging range of some of the plurality of external cameras 300 has changed from the appearance state at the time when the fourth learning model DM4 was trained.

Further, according to the sixth embodiment described above, when the retraining process is completed, the information processing device 200e can acquire the vehicle position information by inputting the captured images Im1 to Im4 to the fourth learning model DM4 that has been trained by the retraining process. This makes it possible to suppress the decrease in accuracy of the vehicle position information calculated using the captured images Im1 to Im4 acquired by some of the plurality of external cameras 300.

G. Seventh Embodiment

Figure 29:
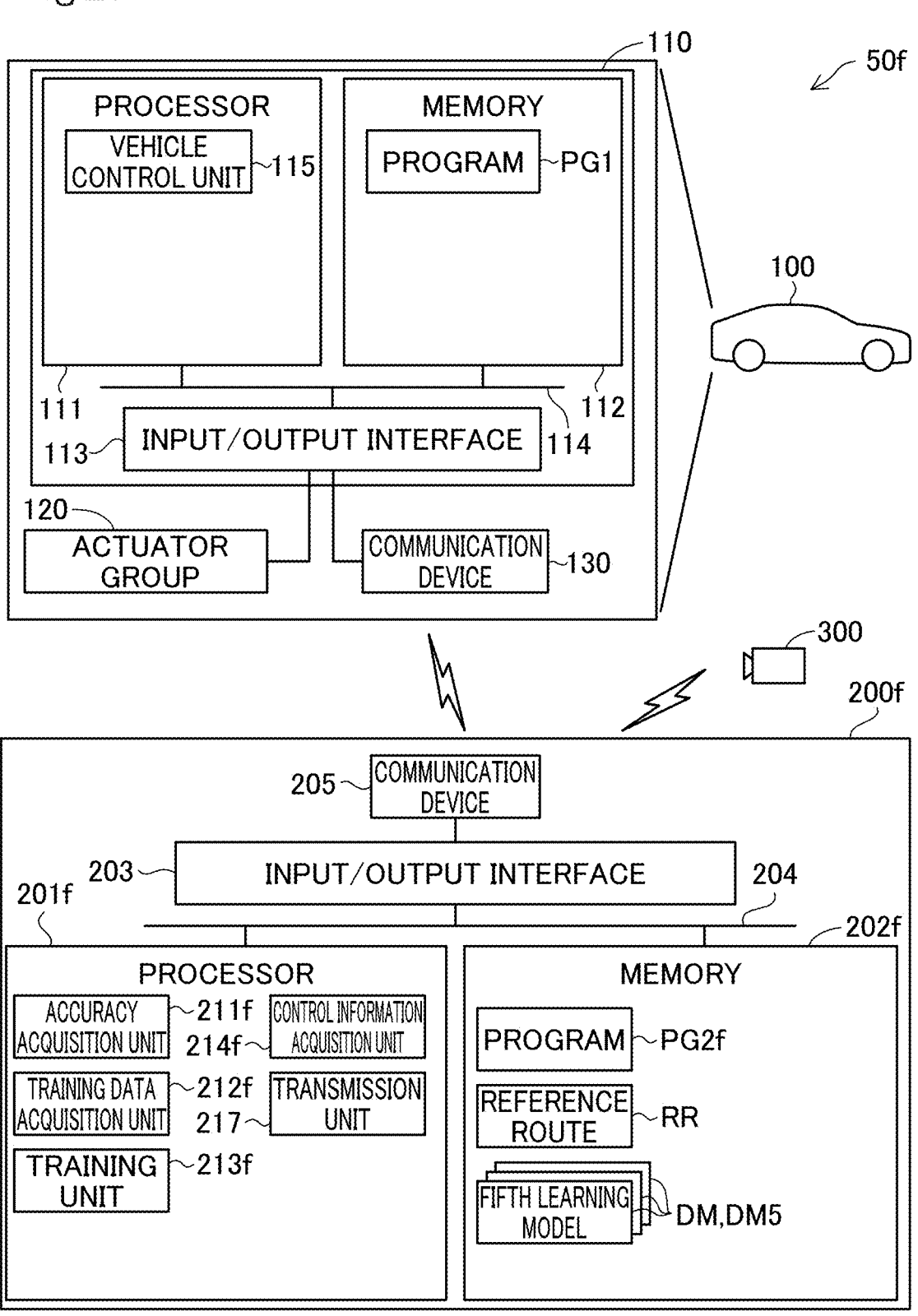
FIG. 29 is a block diagram showing a structure of an information processing system in a seventh embodiment.

FIG. 29 is a block diagram showing a structure of an information processing system 50f in the seventh embodiment. The information processing system 50f includes one or more vehicles 100, a plurality of external cameras 300, and an information processing device 200f. In the present embodiment, the information processing device 200f acquires the running control signal by inputting the captured images Im1 to Im4 and the camera identifier to the fifth learning model DM5 as the machine learning model DM. The rest of the structure of the information processing system 50f is the same as that of the first embodiment, unless otherwise specified. The same structure as that of the first embodiment is described with the same reference symbols and the explanation thereof is omitted.

The information processing device 200f includes a computer with a processor 201f, a memory 202f, the input/output interface 203, and the internal bus 204.

The memory 202f stores various types of information, including a program PG2f that controls operation of the information processing device 200f, the reference route RR, and a plurality of fifth learning models DM5 prepared for the respective external cameras 300.

The fifth learning model DM5 outputs the running control signal when the captured images Im1 to Im4 and the camera identifier indicating the external camera 300 that acquired the captured images Im1 to Im4 are input. The fifth learning model DM5 has been trained in advance by supervised learning using a fifth initial training data group. The fifth initial training data group includes a plurality of fifth initial training data sets that correspond to respective imaging ranges of the plurality of external cameras 300. In each of the plurality of fifth initial training data sets, a training image Ti including a background image corresponding to the imaging range of the external camera 300 and a vehicle image is associated with a signal correct answer label. The signal correct answer label is a correct answer label that indicates the target value of each parameter included in the running control signal. The signal correct answer label is generated based on the reference route RR and the target speed in the imaging range of the external camera 300 that acquired the training image Ti.

As the fifth learning model DM5, for example, a CNN for implementing either semantic segmentation or instance segmentation may be used. Upon the training of the CNN, for example, CNN parameters are updated by back-propagation (error back-propagation) to reduce errors between the output result of the fifth learning model DM5 and the signal correct answer label.

The processor 201f functions as an accuracy acquisition unit 211f, a training data acquisition unit 212f, a training unit 213f, a control information acquisition unit 214f, and the transmission unit 217, by executing the program PG2f stored in the memory 202f.

The accuracy acquisition unit 211f acquires the accuracy of the fifth learning model DM5, which has been trained in advance using the fifth initial training data group. In the present embodiment, the fifth learning model DM5 is prepared for each external camera 300. Therefore, the accuracy acquisition unit 211f acquires the accuracy of each of the plurality of fifth learning models DM5 corresponding to the respective external cameras 300.

The training data acquisition unit 212f performs the following process if the accuracy of the fifth learning model DM5 is less than a predetermined threshold when captured images Im1 to Im4 acquired by some of the plurality of external cameras 300 are input to the fifth learning model DM5. In this case, the training data acquisition unit 212f acquires a fifth additional training data group, which is used to retrain the fifth learning model DM5 as additional learning. The fifth additional training data group includes one or more fifth additional training data sets in which a training image Ti including a background image corresponding to the imaging range of the external camera 300 that acquired the captured images Im1 to Im4 for which accuracy is less than the threshold and a vehicle image is associated with a signal correct answer label. In the present embodiment, the fifth learning model DM5 is prepared for each external camera 300. Therefore, the training data acquisition unit 212f acquires the fifth additional training data group for retraining the fifth learning model DM5 having accuracy less than the threshold.

The training unit 213f performs the following process if the accuracy of the fifth learning model DM5 is less than a predetermined threshold when captured images Im1 to Im4 acquired by some of the plurality of external cameras 300 are input to the fifth learning model DM5. In this case, the training unit 213f performs the retraining process to retrain the fifth learning model DM5. In the present embodiment, the fifth learning model DM5 is prepared for each external camera 300. Therefore, the training unit 213f retrains the fifth learning model DM5 corresponding to the external camera 300 that acquired the captured images Im1 to Im4 for which accuracy is less than the threshold using the acquired fifth additional training data group.

The control information acquisition unit 214f acquires the running control signal by inputting the captured images Im1 to Im4 to the fifth learning model DM5. In the present embodiment, the fifth learning model DM5 is prepared for each external camera 300. Therefore, the control information acquisition unit 214f acquires the running control signal by inputting the captured images Im1 to Im4 to the fifth learning model DM5 corresponding to the external camera 300 that acquired the captured images Im1 to Im4. At this time, when the retraining process is completed, the control information acquisition unit 214f acquires the running control signal by inputting the captured images Im1 to Im4 to the fifth learning model DM5 that has been trained by the retraining process.

Figure 30:
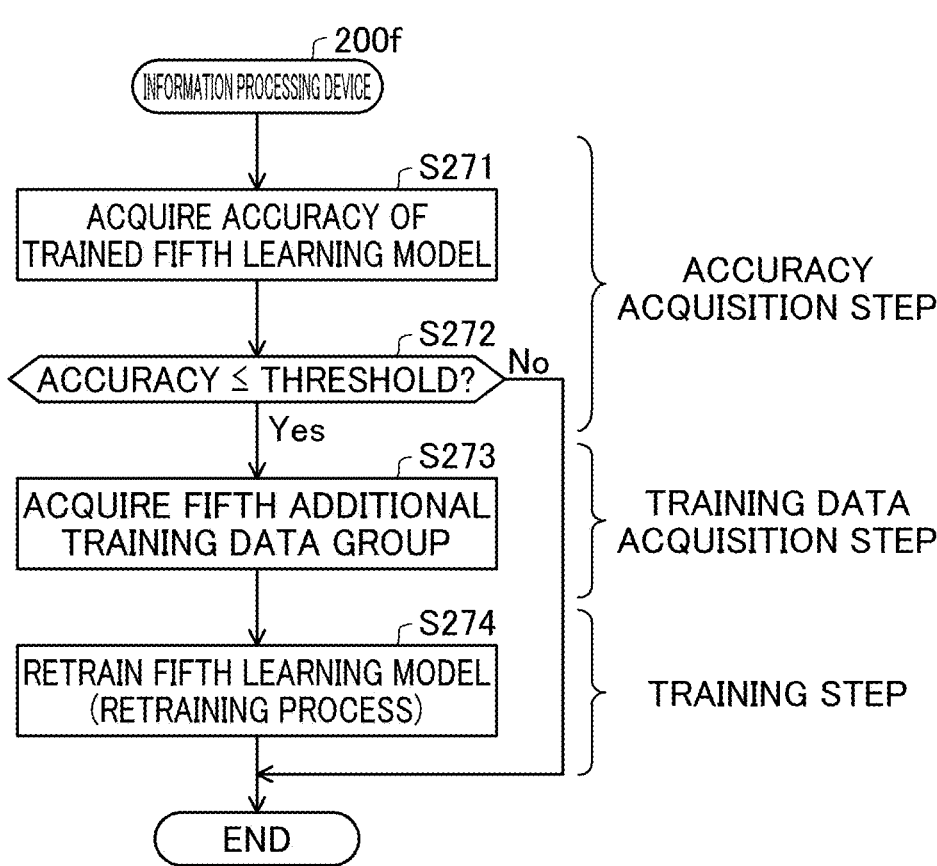
FIG. 30 is a flowchart showing a method for training process in the seventh embodiment.

FIG. 30 is a flowchart showing a method for training process in the seventh embodiment. The flow shown in FIG. 30 is repeated, for example, every predetermined time from the time point at which the running of the vehicle 100 by unmanned driving is started.

In an accuracy acquisition step, the accuracy acquisition unit 211f acquires the accuracy of the fifth learning model DM5, which has been trained in advance using the fifth initial training data group (step S271). A training data acquisition step is performed if the accuracy of the fifth learning model DM5 is less than a predetermined threshold when captured images Im1 to Im4 acquired by some of the plurality of external cameras 300 are input to the fifth learning model DM5 (step S272: Yes). In the training data acquisition step, the training data acquisition unit 212f acquires the fifth additional training data group (step S273). After the training data acquisition step, a training step is performed. In the training step, the training unit 213f performs the retraining process for retraining the fifth learning model DM5 using the acquired fifth additional training data group (step S274). On the other hand, the processor 201f ends the flow without performing the training data acquisition step or the training step if the accuracy of the fifth learning model DM5 is equal to or greater than a predetermined threshold when captured images Im1 to Im4 acquired by some of the plurality of external cameras 300 are input to the fifth learning model DM5 (step S272: No).

Figure 31:
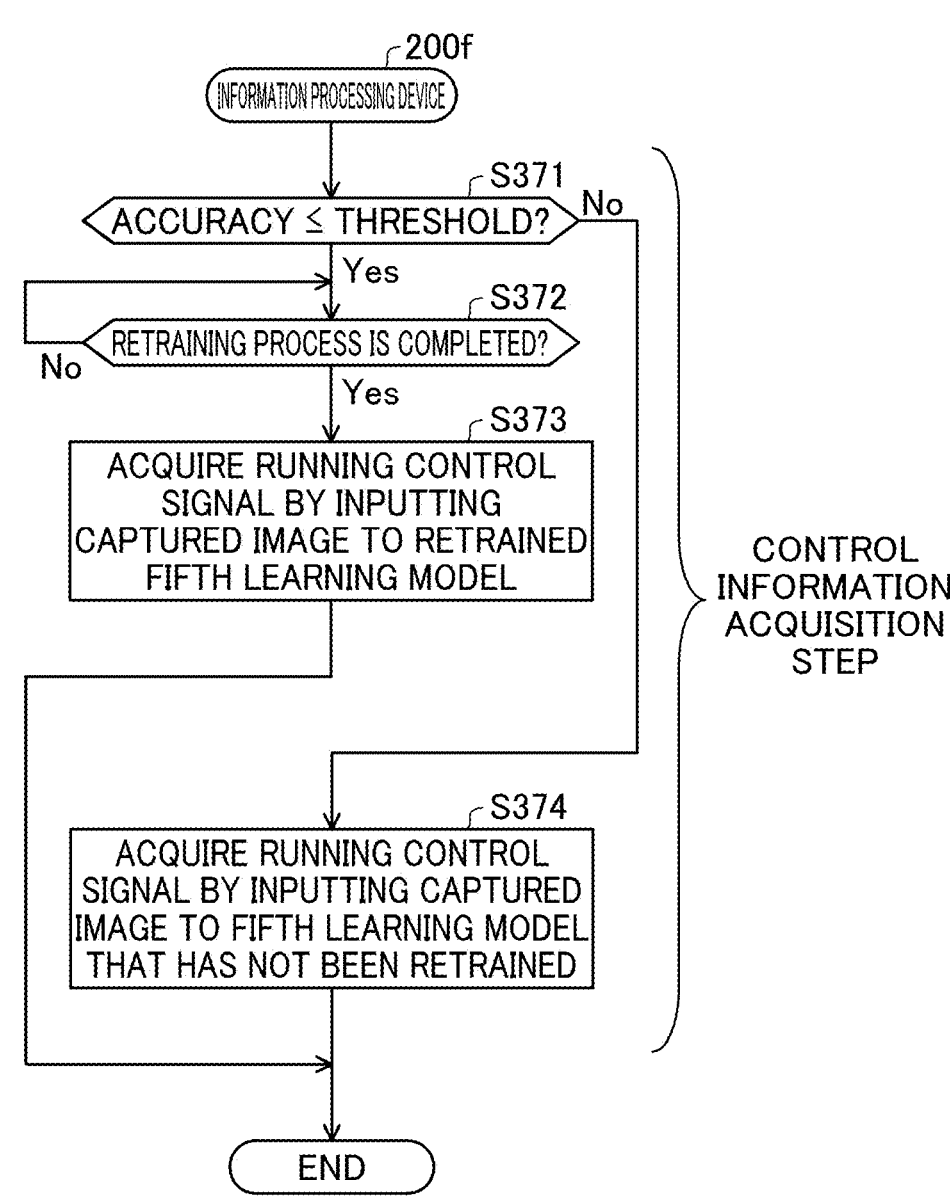
FIG. 31 is a flowchart showing a method for acquiring a running control signal using a fifth learning model.

FIG. 31 is a flowchart showing a method for acquiring the running control signal using the fifth learning model DM5. The flow shown in FIG. 31 is repeated, for example, every predetermined time from the time point at which the running of the vehicle 100 by unmanned driving is started.

In a control information acquisition step, the control information acquisition unit 214f acquires the running control signal by performing the following process. Specifically, if the accuracy of the fifth learning model DM5 is less than a predetermined threshold when captured images Im1 to Im4 acquired by some of the plurality of external cameras 300 are input to the fifth learning model DM5 (step S371: Yes), when the retraining process is completed (step S372: Yes), the control information acquisition unit 214f acquires the running control signal by inputting the captured images Im1 to Im4 to the fifth learning model DM5 that has been trained by the retraining process (step S373). On the other hand, if the accuracy of the fifth learning model DM5 is equal to or greater than a predetermined threshold when captured images Im1 to Im4 acquired by some of the plurality of external cameras 300 are input to the fifth learning model DM5 (step S371: No), the control information acquisition unit 214f acquires the running control signal by inputting the captured images Im1 to Im4 to the fifth learning model DM5 that has not been trained by the retraining process (step S374).

According to the seventh embodiment described above, the information processing device 200f can perform the following process if the accuracy is less than a threshold when captured images Im1 to Im4 acquired by some of the plurality of external cameras 300 are input to the trained fifth learning model DM5. In this case, the information processing device 200f can retrain the fifth learning model DM5 using the fifth additional training data set in which a training image Ti including a background image corresponding to the imaging range of the external camera 300 that acquired the captured images Im1 to Im4 for which the accuracy is less than a threshold and the vehicle image is associated with a signal correct answer label. In this way, it is possible to suppress the decrease in accuracy of the fifth learning model DM5 when the appearance state in the imaging range of some of the plurality of external cameras 300 has changed from the appearance state at the time when the fifth learning model DM5 was trained.

Further, according to the seventh embodiment described above, when the retraining process is completed, the information processing device 200f can acquire the running control signal by inputting the captured images Im1 to Im4 to the fifth learning model DM5 that has been trained by the retraining process. This makes it possible to suppress the decrease in accuracy of the running control signal generated using the captured images Im1 to Im4 acquired by some of the plurality of external cameras 300.

The information to be input to the fifth learning model DM5 is not limited to those described above. The information processing device 200f may acquire the running control signal by inputting, in addition to the captured images Im1 to Im4 and the camera identifier, other types of information, such as speed information indicating the running speed of the vehicle 100, route information indicating the reference route RR of the vehicle 100, a pinion angle, and the like, to the fifth learning model DM5. In such an embodiment, the information processing device 200f can acquire more appropriate running control signals according to the running status of the vehicle 100 and the reference route RR.

H. Eighth Embodiment

Figure 32:
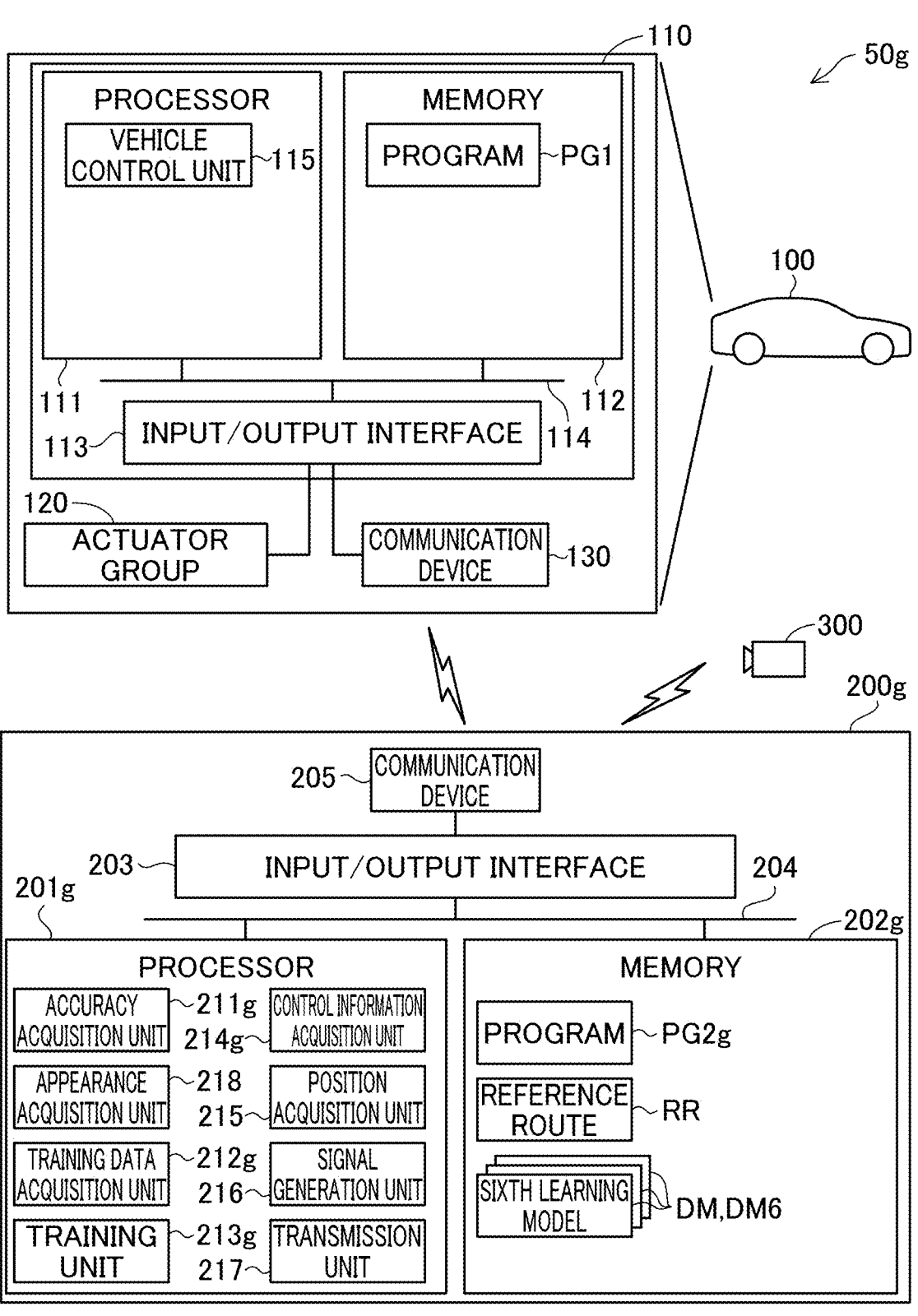
FIG. 32 is a block diagram showing a structure of an information processing system in an eighth embodiment.

FIG. 32 is a block diagram showing a structure of an information processing system 50g in the eighth embodiment. The information processing system 50g includes one or more vehicles 100, a plurality of external cameras 300, and an information processing device 200g. In the present embodiment, the information processing device 200g acquires the shape data Da by inputting the captured images Im1 to Im4 to a sixth learning model DM6 as the machine learning model DM. The rest of the structure of the information processing system 50g is the same as that of the first embodiment, unless otherwise specified. The same structure as that of the first embodiment is described with the same reference symbols and the explanation thereof is omitted.

Figure 33:
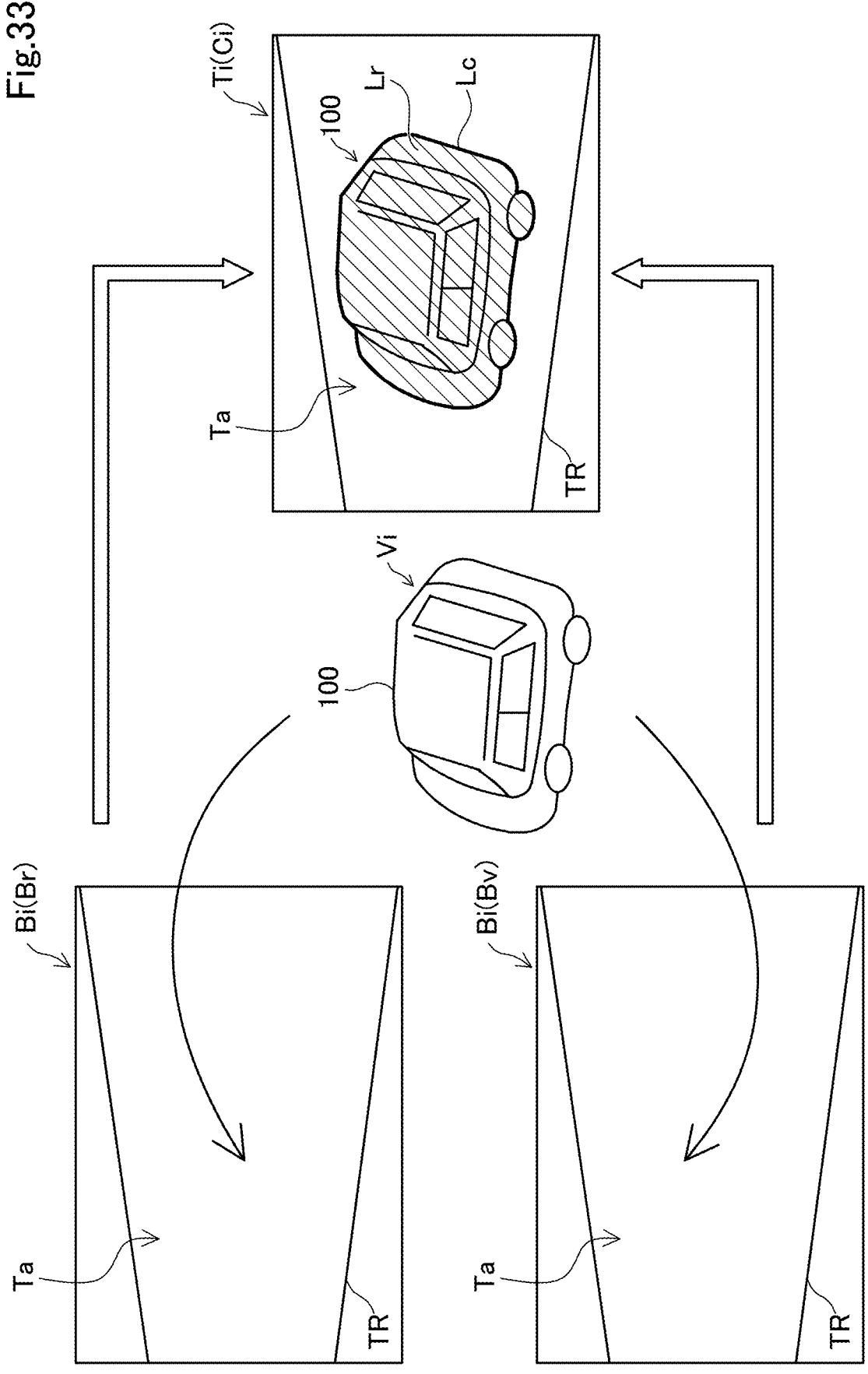
FIG. 33 is a diagram showing an example of a method for generating a training image used for training of a sixth learning model.

FIG. 33 is a diagram showing an example of a method for generating a training image Ti used for the training of the sixth learning model DM6. In the present embodiment, the training image Ti is a composite image Ci that reproduces the real space. The composite image Ci is a two-dimensional image generated by combining a virtual vehicle image Vi with a background image Bi, which is either a real background image Br or a virtual background image Bv. The real background image Br is the background image Bi acquired by actually capturing an image of the target region TA using the external camera 300. The virtual background image Bv is the background image Bi that virtually replicates the target region TA. The virtual background image Bv is, for example, either 2D CAD data or 3D CAD data representing the target region TA. The virtual vehicle image Vi is an image that virtually replicates the vehicle 100. The virtual vehicle image Vi is either 2D CAD data or 3D CAD data representing the vehicle 100.

In the present embodiment, the composite image Ci is generated by combining the virtual vehicle image Vi with the virtual background image Bv. Specifically, the composite image Ci is generated by combining the virtual vehicle image Vi with the target region TA, for example, by super-imposing the virtual vehicle image Vi onto each target region TA of a production line in the factory FC replicated in a virtual space. That is, in the present embodiment, the training image Ti is generated using digital twins.

Further, in the present embodiment, the composite image Ci is generated using the virtual vehicle image Vi that virtually reproduces the vehicle 100 according to the appearance state of the vehicle 100 as a detection target. The appearance state of the vehicle 100 is classified based on, for example, the body type, the exterior color, and the product name of the vehicle 100. The body type of the vehicle 100 is a group of vehicle types when vehicles 100 are classified into multiple types of vehicle 100 depending on the exterior shape of the vehicle 100. If the appearance state of the vehicle 100 is classified based on the body type of the vehicle 100, the vehicle 100 is classified as one body type based on the vehicle class determined by the overall length, width, and height of the vehicle 100, as well as the exterior shape of the vehicle 100. The vehicle class is also referred to as vehicle body or body size. In the present embodiment, the body types include, for example, "SUV," "sedan," "station wagon," "minivan," "one-box," "compact car," and "light vehicle." In addition, the appearance state of the vehicle 100 may be classified using a predetermined classification number that is given as appropriate based on the model code, specifications, and the like.

Note that, in the case where the virtual background image Bv is 3D data, the virtual background image Bv is transformed from 3D data to 2D data in the process of generating the composite image Ci. In the case where the virtual vehicle image Vi is 3D data, the virtual vehicle image Vi is transformed from 3D data to 2D data in the process of generating the composite image Ci. In addition, during the process of combining the virtual vehicle image Vi with the background image Bi, it is possible to adjust arrangement of the virtual vehicle image Vi with respect to the background image Bi, or adjust the pixel values of the images Bi, Ci, and Vi.

The information processing device 200g includes a computer with a processor 201g, a memory 202g, the input/output interface 203, and the internal bus 204.

The memory 202g stores various types of information, including a program PG2g that controls operation of the information processing device 200g, the reference route RR, and a plurality of sixth learning models DM6 prepared for the respective external cameras 300.

The sixth learning model DM6 outputs the shape data Da when the captured images Im1 to Im4 are input. The sixth learning model DM6 has been trained in advance by supervised learning using a sixth initial training data group. The sixth initial training data group includes a plurality of sixth initial training data sets that correspond to respective imaging ranges of the plurality of external cameras 300. In each of the plurality of sixth initial training data sets, a training image Ti including a virtual background image Bv corresponding to the imaging range of the external camera 300 and a virtual vehicle image Vi that virtually reproduces the vehicle 100 according to the appearance state of the vehicle 100 as a detection target is associated with a region correct answer label Lr.

As the sixth learning model DM6, for example, a CNN for implementing either semantic segmentation or instance segmentation may be used. Upon the training of the CNN, for example, CNN parameters are updated by back-propagation (error back-propagation) to reduce errors between the output result of the sixth learning model DM6 and the region correct answer label Lr.

The processor 201g functions as an accuracy acquisition unit 211g, an appearance acquisition unit 218, a training data acquisition unit 212g, a training unit 213g, a control information acquisition unit 214g, the position acquisition unit 215, the signal generation unit 216, and the transmission unit 217, by executing the program PG2g stored in the memory 202g.

The accuracy acquisition unit 211g acquires the accuracy of the sixth learning model DM6, which has been trained in advance using the sixth initial training data group. In the present embodiment, the sixth learning model DM6 is prepared for each external camera 300. Therefore, the accuracy acquisition unit 211g acquires the accuracy of each of the plurality of sixth learning models DM6 corresponding to the respective external cameras 300.

The appearance acquisition unit 218 acquires appearance information. The appearance information is information indicating the appearance state of the vehicle 100 as a detection target. The appearance information is generated, for example, by specifying the appearance state of the vehicle 100 as a detection target using management information. The management information is information indicating the order of running of a plurality of vehicles 100 that run in the imaging range of the external camera 300. In the management information, a vehicle identifier and a camera identifier are associated with each other. The vehicle identifier is a unique identifier assigned to the plurality of vehicles 100 to identify them one another, and there is no overlap of vehicle identifier among the vehicles 100. The management information is created using, for example, the vehicle position information, a transmission history of running control signals to the vehicle 100, and the location where the external camera 300 is provided.

The training data acquisition unit 212g performs the following process if the accuracy of the sixth learning model DM6 is less than a predetermined threshold when captured images Im1 to Im4 acquired by some of the plurality of external cameras 300 are input to the sixth learning model DM6. In this case, the training data acquisition unit 212g acquires a sixth additional training data group, which is used to retrain the sixth learning model DM6 as additional learning. The sixth additional training data group includes one or more sixth additional training data sets in which a training image Ti including a virtual background image Bv corresponding to the imaging range of the external camera 300 that acquired the captured images Im1 to Im4 for which accuracy is less than the threshold and a virtual vehicle image Vi that virtually reproduces the vehicle 100 with an appearance state specified by the appearance information is associated with a region correct answer label Lr. In the present embodiment, the sixth learning model DM6 is prepared for each external camera 300. Therefore, the training data acquisition unit 212g acquires the sixth additional training data group for retraining the sixth learning model DM6 having accuracy less than the threshold.

The training unit 213g performs the following process if the accuracy of the sixth learning model DM6 is less than a predetermined threshold when captured images Im1 to Im4 acquired by some of the plurality of external cameras 300 are input to the sixth learning model DM6. In this case, the training unit 213g performs the retraining process to retrain the sixth learning model DM6. In the present embodiment, the sixth learning model DM6 is prepared for each external camera 300. Therefore, the training unit 213g retrains the sixth learning model DM6 corresponding to the external camera 300 that acquired the captured images Im1 to Im4 for which accuracy is less than the threshold using the acquired sixth additional training data group. That is, the training unit 213g retrains the sixth learning model DM6 using the virtual vehicle image Vi that virtually reproduces the vehicle 100 with an appearance state specified by the appearance information.

The control information acquisition unit 214g acquires the shape data Da by inputting captured images Im1 to Im4 to the sixth learning model DM6. In the present embodiment, the sixth learning model DM6 is prepared for each external camera 300. Therefore, the control information acquisition unit 214g acquires the shape data Da by inputting the captured images Im1 to Im4 to the sixth learning model DM6 corresponding to the external camera 300 that acquired the captured images Im1 to Im4. At this time, if the retraining process is completed, the control information acquisition unit 214g acquires the shape data Da by inputting captured images Im1 to Im4 to the sixth learning model DM6 that has been trained by the retraining process.

Figure 34:
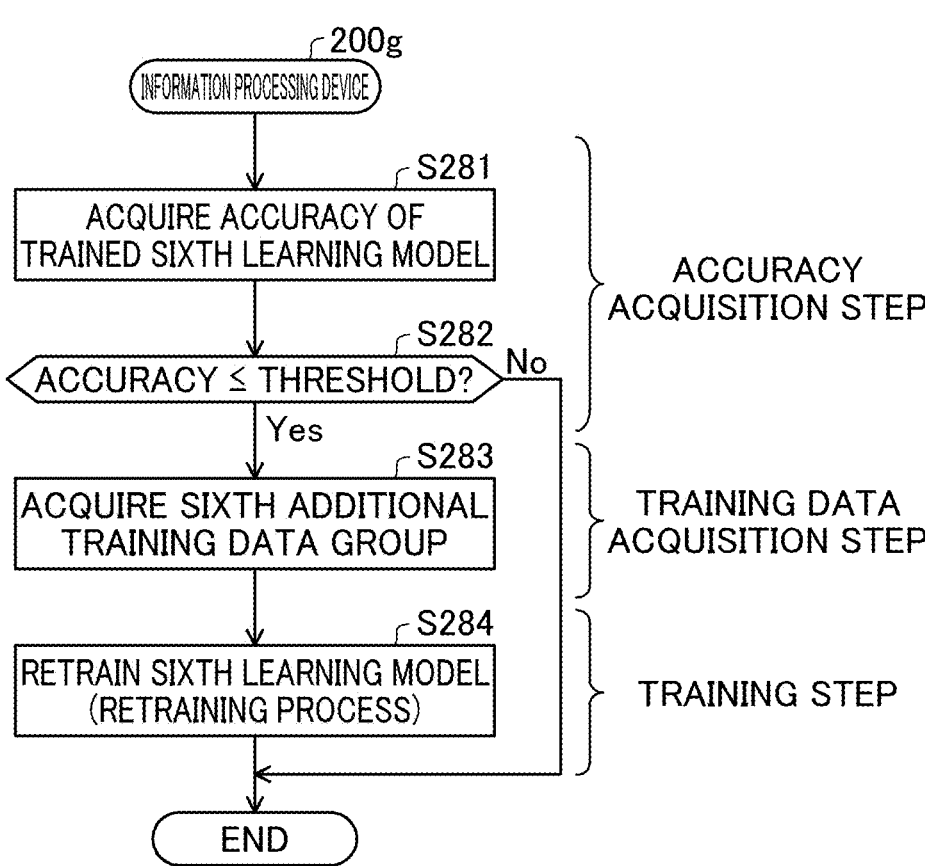
FIG. 34 is a flowchart showing a method for training process in the eighth embodiment.

FIG. 34 is a flowchart showing a method for training process in the eighth embodiment. The flow shown in FIG. 34 is repeated, for example, every predetermined time from the time point at which the running of the vehicle 100 by unmanned driving is started.

In an accuracy acquisition step, the accuracy acquisition unit 211g acquires the accuracy of the sixth learning model DM6, which has been trained in advance using the sixth initial training data group (step S281). A training data acquisition step is performed if the accuracy of the sixth learning model DM6 is less than a predetermined threshold when captured images Im1 to Im4 acquired by some of the plurality of external cameras 300 are input to the sixth learning model DM6 (step S282: Yes). In the training data acquisition step, the training data acquisition unit 212g acquires the sixth additional training data group (step S283). After the training data acquisition step, a training step is performed. In the training step, the training unit 213g performs the retraining process for retraining the sixth learning model DM6 using the acquired sixth additional training data group (step S284). On the other hand, the processor 201g ends the flow without performing the training data acquisition step or the training step if the accuracy of the sixth learning model DM6 is equal to or greater than a predetermined threshold when captured images Im1 to Im4 acquired by some of the plurality of external cameras 300 are input to the sixth learning model DM6 (step S282: No).

Figure 35:
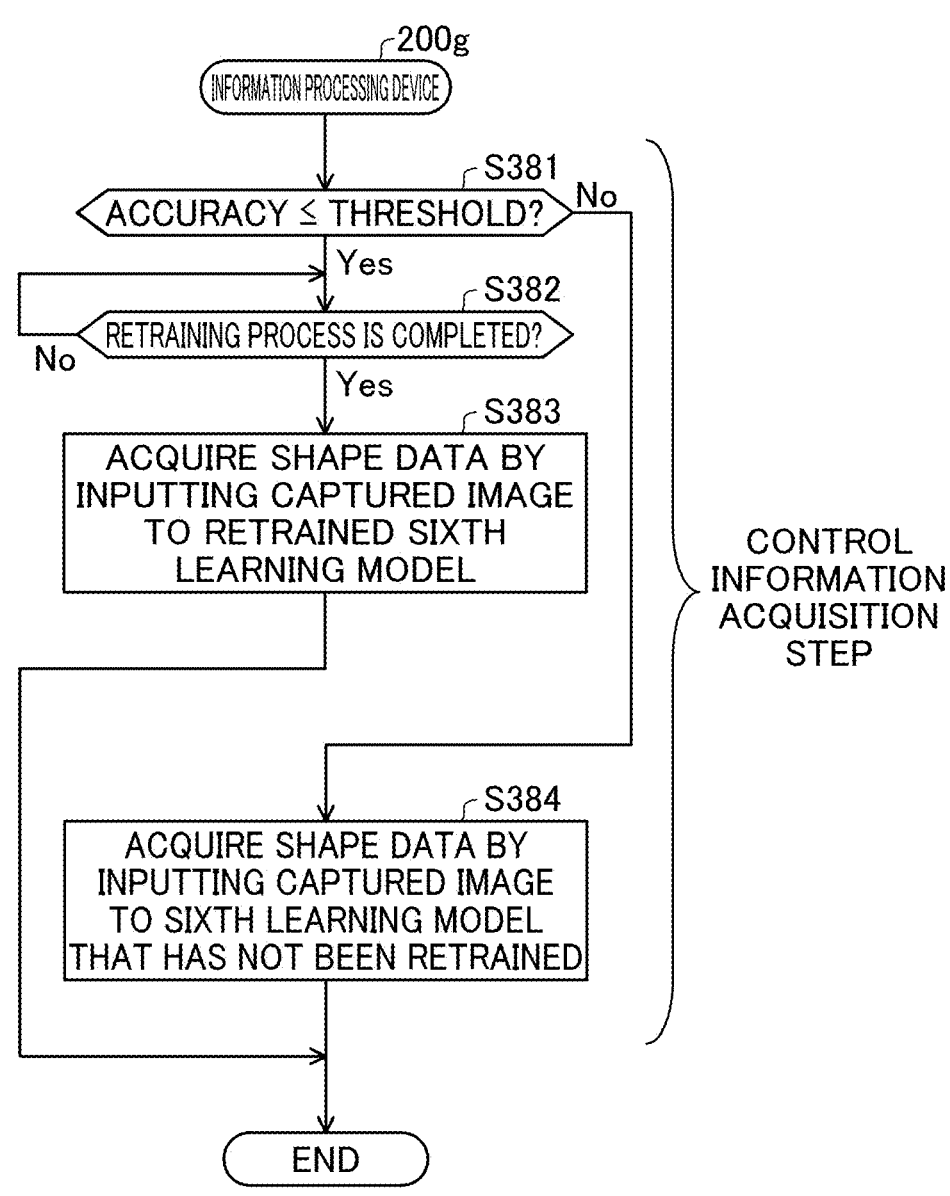
FIG. 35 is a flowchart showing a method for acquiring shape data in the eighth embodiment.

FIG. 35 is a flowchart showing a method for acquiring the shape data Da in the eighth embodiment. The flow shown in FIG. 35 is repeated, for example, every predetermined time from the time point at which the running of the vehicle 100 by unmanned driving is started.

In the control information acquisition step, the control information acquisition unit 214g acquires the shape data Da by performing the following process. Specifically, if the accuracy of the sixth learning model DM6 is less than a predetermined threshold when captured images Im1 to Im4 acquired by some of the plurality of external cameras 300 are input to the sixth learning model DM6 (step S381: Yes), when the retraining process is completed (step S382: Yes), the control information acquisition unit 214g acquires the shape data Da by inputting the captured images Im1 to Im4 to the sixth learning model DM6 that has been trained by the retraining process (step S383). On the other hand, if the accuracy of the sixth learning model DM6 is equal to or greater than a predetermined threshold when captured images Im1 to Im4 acquired by some of the plurality of external cameras 300 are input to the sixth learning model DM6 (step S381: No), the control information acquisition unit 214g acquires the shape data Da by inputting the captured images Im1 to Im4 to the sixth learning model DM6 that has not been trained by the retraining process (step S384).

According to the eighth embodiment described above, the information processing device 200g can perform the following process if the accuracy is less than a threshold when captured images Im1 to Im4 acquired by some of the plurality of external cameras 300 are input to the trained sixth learning model DM6. In this case, the information processing device 200g can retrain the sixth learning model DM6 by using the composite image Ci, which is generated by combining the virtual vehicle image Vi with the background image Bi as the training image Ti.

Further, according to the eighth embodiment described above, the information processing device 200g can retrain the sixth learning model DM6 using the sixth additional training data set that includes the virtual vehicle image Vi that virtually reproduces the vehicle 100 with an appearance state specified by the appearance information. In this way, upon the retraining of the sixth learning model DM6, it is possible to allow the sixth learning model DM6 to learn the feature quantity according to the appearance state of the vehicle 100 as a detection target. This improves the accuracy of the sixth learning model DM6.

Further, according to the eighth embodiment described above, when the virtual vehicle image Vi is combined with the background image Bi, it is possible to change at least one of the position and orientation of the vehicle 100 by adjusting the arrangement of the virtual vehicle image Vi with respect to the background image Bi. In this way, it is possible to easily generate a plurality of training images Ti varied in at least one of the position and orientation of the vehicle 100 with respect to the pathway TR.

Further, according to the eighth embodiment described above, in the process of combining the virtual vehicle image Vi with the background image Bi, it is possible to change the pixel value of at least one of the background image Bi, the virtual vehicle image Vi, and the composite image Ci from the initial value. In this way, it is possible to easily generate a plurality of training images Ti varied in imaging condition, such as brightness. Therefore, it is possible to easily generate a plurality of training images Ti assuming that the pixel values such as brightness change depending on the weather, time zone, season, lighting environment, and the like.

As in the present embodiment, when the training image Ti is the composite image Ci, the correct answer label of the sixth learning model DM6 may be a contour correct answer label Lc instead of the region correct answer label Lr. The contour correct answer label Lc is a correct answer label that represents the contour of the vehicle 100 extracted from the virtual vehicle image Vi. According to such an embodiment, it is possible to easily identify whether each region that constitutes the training image Ti represents a region indicating the vehicle 100 or a region indicating other than the vehicle 100 by extracting the outer shape of the virtual vehicle image Vi. This makes it possible to alleviate the burden required for the preparation of the training of the sixth learning model DM6.

I. Ninth Embodiment

Figure 36:
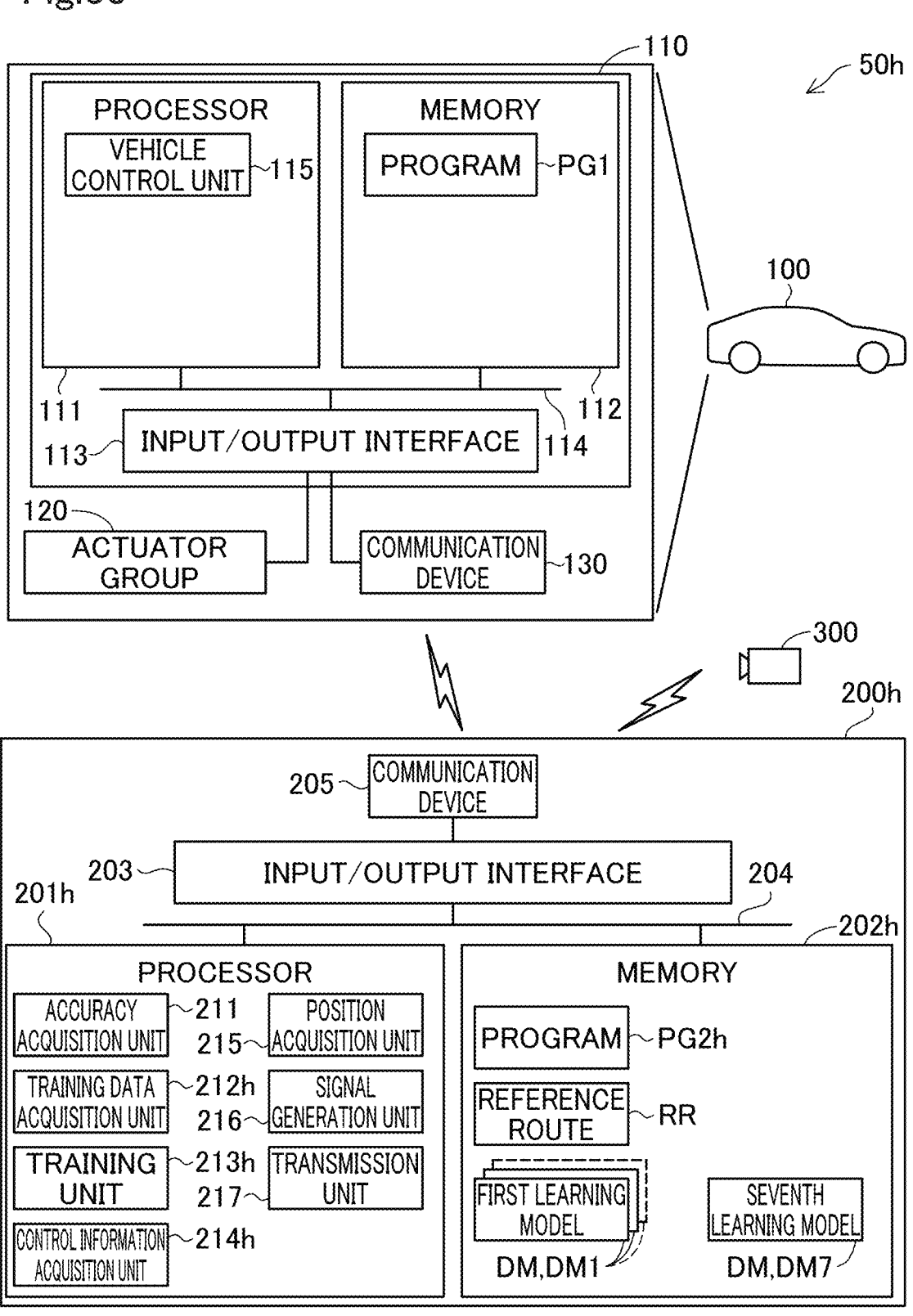
FIG. 36 is a block diagram showing a structure of an information processing system in a ninth embodiment.

FIG. 36 is a block diagram showing a structure of an information processing system 50h in the ninth embodiment. The information processing system 50h includes one or more vehicles 100, a plurality of external cameras 300, and an information processing device 200h. In the present embodiment, when the captured images Im1 to Im4 acquired by some of the plurality of external cameras 300 are input to the first learning model DM1, if the accuracy of the first learning model DM1 is less than a predetermined threshold, the information processing device 200h trains a seventh learning model DM7 as the machine learning model DM, apart from the first learning model DM1. Further, the information processing device 200h acquires the shape data Da by inputting the captured images Im1 to Im4 to the seventh learning model DM7. The rest of the structure of the information processing system 50h is the same as that of the first embodiment, unless otherwise specified. The same structure as that of the first embodiment is described with the same reference symbols and the explanation thereof is omitted.

The information processing device 200h includes a computer with a processor 201h, a memory 202h, the input/output interface 203, and the internal bus 204.

The memory 202h stores various types of information, including a program PG2h that controls operation of the information processing device 200h, the reference route RR, and the plurality of first learning models DM1 prepared for the respective external cameras 300.

The processor 201h functions as the accuracy acquisition unit 211, a training data acquisition unit 212h, a training unit 213h, a control information acquisition unit 214h, the position acquisition unit 215, the signal generation unit 216, and the transmission unit 217, by executing the program PG2h stored in the memory 202h.

The training data acquisition unit 212h performs the following process if the accuracy of the first learning model DM1 is less than a predetermined threshold when captured images Im1 to Im4 acquired by some of the plurality of external cameras 300 are input to the first learning model DM1. In this case, the training data acquisition unit 212h discards the first learning model DM1 having accuracy less than the threshold and acquires a new training data group used for new training of the seventh learning model DM7. The new training data group includes one or more new training data sets in which a training image Ti including a background image Bi corresponding to the imaging range of the external camera 300 that acquired the captured images Im1 to Im4 for which accuracy is less than the threshold and a vehicle image is associated with the region correct answer label Lr. In the present embodiment, the first learning model DM1 is prepared for each external camera 300. Therefore, the training data acquisition unit 212h discards the first learning model DM1 having accuracy less than the threshold and acquires a new training data group for new training of the seventh learning model DM7.

The training unit 213h performs the following process if the accuracy of the first learning model DM1 is less than a predetermined threshold when the captured images Im1 to Im4 acquired by some of the plurality of external cameras 300 are input to the first learning model DM1. In this case, the training unit 213h discards the first learning model DM1. Then, the training unit 213h executes a new training process for new training of the seventh learning model DM7. In the present embodiment, the first learning model DM1 is prepared for each external camera 300. Therefore, the training unit 213h discards the first learning model DM1 corresponding to the external camera 300 that acquired the captured images Im1 to Im4 for which accuracy is less than the threshold. Then, the training unit 213h trains the seventh learning model DM7 corresponding to the external camera 300 that acquired the captured images Im1 to Im4 for which accuracy is less than the threshold using the acquired new training data group. As the seventh learning model DM7, for example, a CNN for implementing either semantic segmentation or instance segmentation may be used. Upon the training of the CNN, for example, CNN parameters are updated by back-propagation (error back-propagation) to reduce errors between the output result of the seventh learning model DM7 and the region correct answer label Lr. The training unit 213h stores the created seventh learning model DM7 in the memory 202h.

If the accuracy of the first learning model DM1 is equal to or greater than a predetermined threshold when captured images Im1 to Im4 acquired by some of the plurality of external cameras 300 are input to the first learning model DM1, the control information acquisition unit 214h acquires the shape data Da by inputting the captured images Im1 to Im4 to the first learning model DM1. On the other hand, if the accuracy of the first learning model DM1 is less than a predetermined threshold when captured images Im1 to Im4 acquired by some of the plurality of external cameras 300 are input to the first learning model DM1, the control information acquisition unit 214h acquires the shape data Da by inputting the captured images Im1 to Im4 to the seventh learning model DM7. In the present embodiment, each of the learning models DM1 and DM7 is prepared for each external camera 300. Therefore, the control information acquisition unit 214h acquires the shape data Da by inputting the captured images Im1 to Im4 to the learning model DM1, DM7 corresponding to the external camera 300 that acquired the captured images Im1 to Im4.

Figure 37:
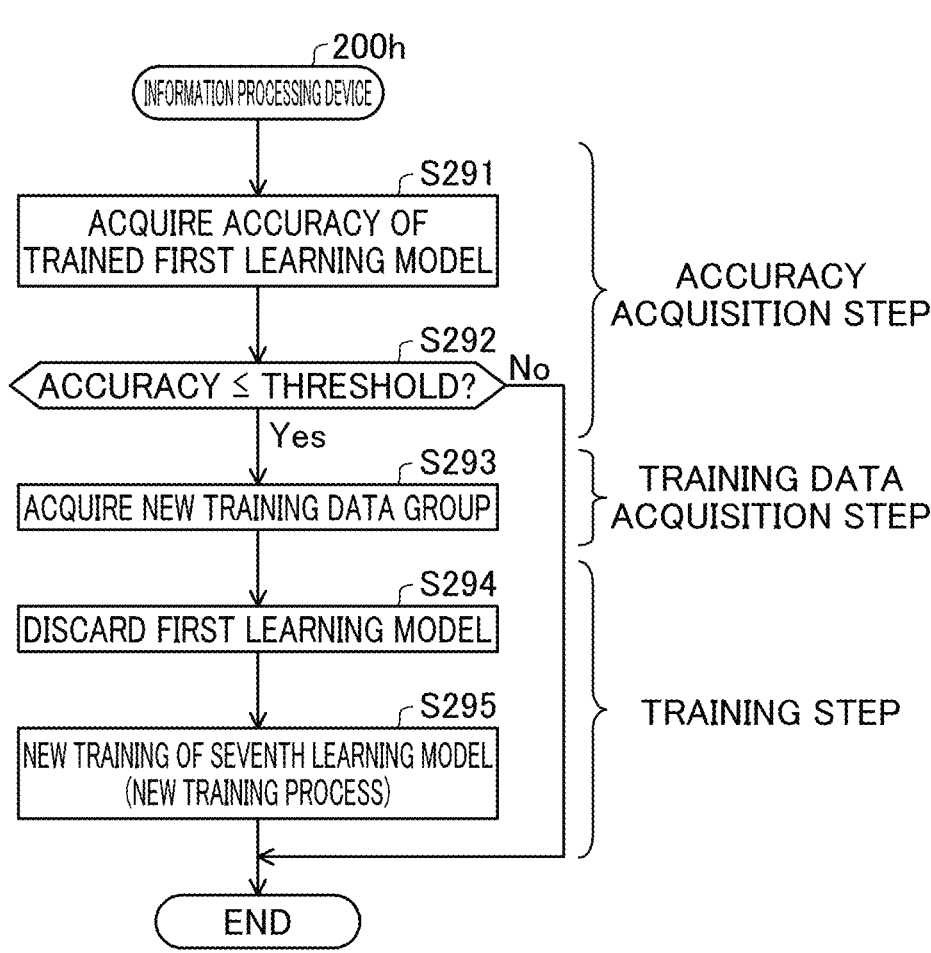
FIG. 37 is a flowchart showing a method for training process in the ninth embodiment.

FIG. 37 is a flowchart showing a method for training process in the ninth embodiment. The flow shown in FIG. 37 is repeated, for example, every predetermined time from the time point at which the running of the vehicle 100 by unmanned driving is started.

In an accuracy acquisition step, the accuracy acquisition unit 211 acquires the accuracy of the first learning model DM1, which has been trained in advance using the first initial training data group (step S291). A training data acquisition step is performed if the accuracy of the first learning model DM1 is less than a predetermined threshold when captured images Im1 to Im4 acquired by some of the plurality of external cameras 300 are input to the first learning model DM1 (step S292: Yes). In the training data acquisition step, the training data acquisition unit 212*h* acquires the new training data group (step S293). After the training data acquisition step, a training step is performed. In the training step, the training unit 213*h* discards the first learning model DM1 stored in the memory 202*h* (step S294). Then, the training unit 213*h* performs the new training process for new training of the seventh learning model DM7 using the acquired new training data group (step S295). On the other hand, the processor 201*h* ends the flow without performing the training data acquisition step or the training step if the accuracy of the first learning model DM1 is equal to or greater than a predetermined threshold when captured images Im1 to Im4 acquired by some of the plurality of external cameras 300 are input to the first learning model DM1 (step S292: No).

Figure 38:
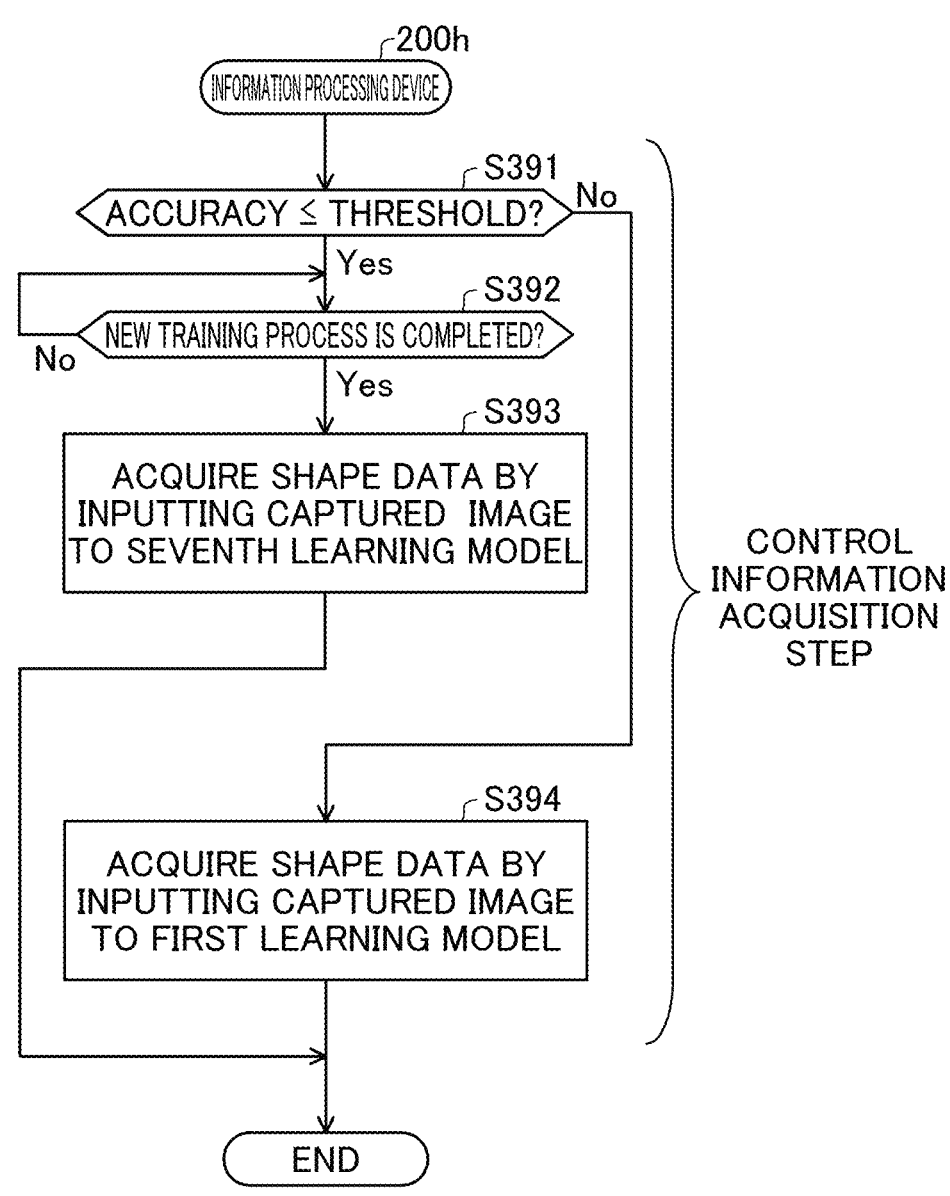
FIG. 38 is a flowchart showing a method for acquiring shape data in the ninth embodiment.

FIG. 38 is a flowchart showing a method for acquiring the shape data Da in the ninth embodiment. The flow shown in FIG. 38 is repeated, for example, every predetermined time from the time point at which the running of the vehicle 100 by unmanned driving is started.

In the control information acquisition step, the control information acquisition unit 214*h* acquires the shape data Da by performing the following process. Specifically, if the accuracy of the first learning model DM1 is less than a predetermined threshold when captured images Im1 to Im4 acquired by some of the plurality of external cameras 300 are input to the first learning model DM1 (step S391: Yes), when the new training process on the seventh learning model DM7 is completed (step S392: Yes), the control information acquisition unit 214*h* performs the following process. In this case, the control information acquisition unit 214*h* acquires the shape data Da by inputting the captured images Im1 to Im4 to the seventh learning model DM7 (step S393). On the other hand, if the accuracy of the first learning model DM1 is equal to or greater than a predetermined threshold when captured images Im1 to Im4 acquired by some of the plurality of external cameras 300 are input to the first learning model DM1 (step S391: No), the control information acquisition unit 214*h* acquires the shape data Da by inputting the captured images Im1 to Im4 to the first learning model DM1 (step S394).

According to the ninth embodiment described above, the information processing device 200*h* can perform the following process if the accuracy is less than a threshold when captured images Im1 to Im4 acquired by some of the plurality of external cameras 300 are input to the trained first learning model DM1. In this case, the information processing device 200*h* can perform new training of the seventh learning model DM7 using the new training data set in which a training image Ti including the background image Bi corresponding to the imaging range of the external camera 300 that acquired the captured images Im1 to Im4 for which the accuracy is less than a threshold and the vehicle image is associated with the region correct answer label Lr. In this way, it is possible to suppress the decrease in accuracy of the machine learning models DM1 and DM7 when the appearance state in the imaging range of some of the plurality of external cameras 300 has changed from the appearance state at the time when the first learning model DM1 was trained.

Further, according to the ninth embodiment described above, when the new training of the seventh learning model DM7 is completed, the information processing device 200*h* can acquire the shape data Da by inputting the captured images Im1 to Im4 to the seventh learning model DM7. This makes it possible to suppress the decrease in accuracy of the shape data Da generated using the captured images Im1 to Im4 acquired by some of the plurality of external cameras 300.

J. Tenth Embodiment

Figure 39:
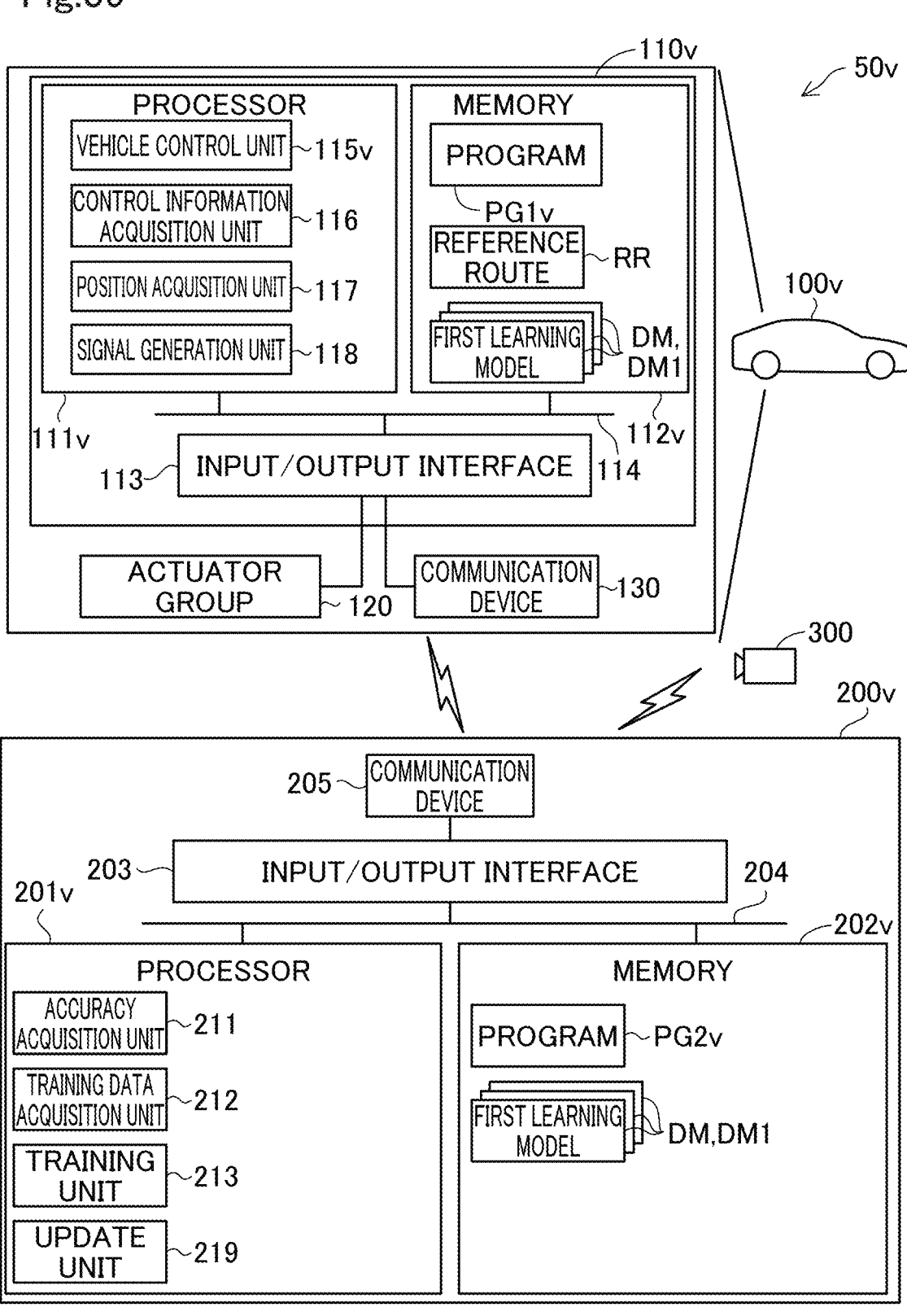
FIG. 39 is a block diagram showing a structure of an information processing system in a tenth embodiment.

FIG. 39 is a block diagram showing a structure of an information processing system 50*v* in the tenth embodiment. The information processing system 50*v* includes one or more vehicles 100*v*, a plurality of external cameras 300, and an information processing device 200*v*. In the present embodiment, a vehicle control device 110*v* mounted on the vehicle 100*v* acquires the vehicle position information using detection results output from the external cameras 300, thereby generating the running control signal. The rest of the structure of the information processing system 50*v* is the same as that of the first embodiment, unless otherwise specified. The same structure as that of the first embodiment is described with the same reference symbols and the explanation thereof is omitted.

The information processing device 200*v* includes a computer with a processor 201*v*, a memory 202*v*, the input/output interface 203, and the internal bus 204.

The memory 202*v* stores various types of information, including a program PG2*v* that controls operation of the information processing device 200*v*, and the plurality of first learning models DM1 prepared for the respective external cameras 300.

The processor 201*v* functions as the accuracy acquisition unit 211, the training data acquisition unit 212, the training unit 213, and an update unit 219 by executing the program PG2*v* stored in the memory 202*v*.

The update unit 219 updates the first learning model DM1 stored in the vehicle control device 110*v* so that the first learning model DM1 stored in the vehicle control device 110*v* has the latest state, and the update is applied each time the first learning model DM1 is retrained.

The vehicle control device 110*v* includes a computer with a processor 111*v*, a memory 112*v*, the input/output interface 113, and the internal bus 114.

The memory 112*v* stores various types of information, including a program PG1*v* that controls operation of the vehicle control device 110*v*, the reference route RR, and the plurality of first learning models DM1 prepared for the respective external cameras 300.

The processor 111*v* functions as a control information acquisition unit 116, a position acquisition unit 117, a signal generation unit 118, and a vehicle control unit 115*v* by executing the program PG1*v* stored in the memory 112*v*.

The control information acquisition unit 116 acquires the shape data Da by inputting the captured images Im1 to Im4 to the first learning model DM1. In the present embodiment, the first learning model DM1 is prepared for each external camera 300. Therefore, the control information acquisition unit 116 acquires the shape data Da by inputting the captured images Im1 to Im4 to the first learning model DM1 corresponding to the external camera 300 that acquired the captured images Im1 to Im4. At this time, the first learning model DM1 stored in the memory 112*v* is updated each time the retraining process is performed. Therefore, in the information processing device 200*v*, when the retraining process is completed, the control information acquisition unit 116 acquires the shape data Da by inputting the captured images Im1 to Im4 to the first learning model DM1 that has been trained by the retraining process.

The position acquisition unit 117 acquires the vehicle position information using the shape data Da. The signal generation unit 118 generates running control signals. The vehicle control unit 115$v$ controls the actuator group 120 using the generated running control signal, thereby causing the vehicle 100 to run.

Figure 40:
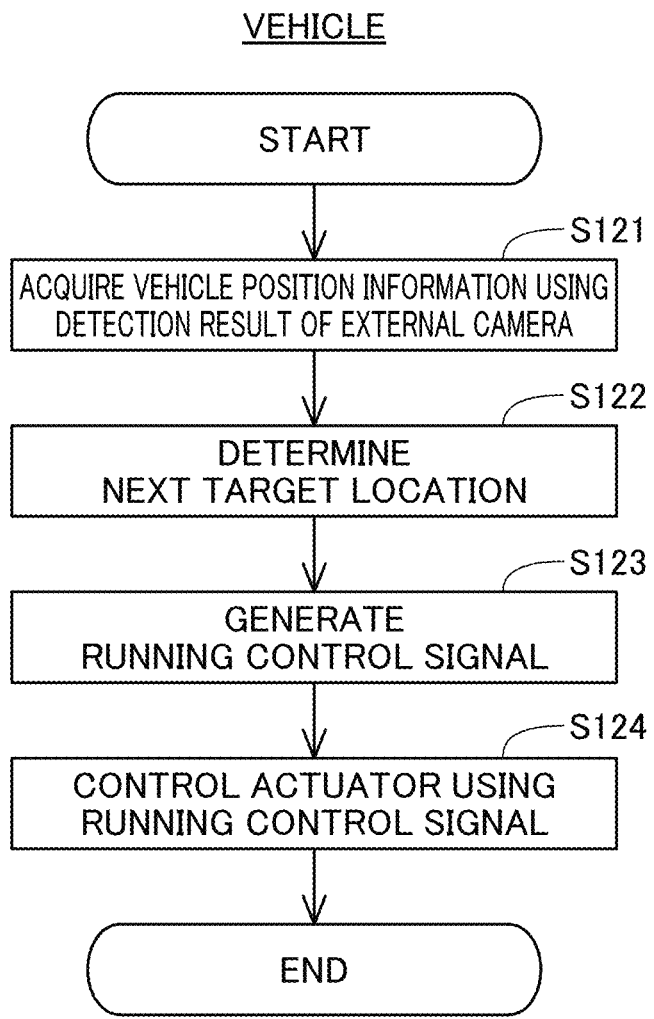
FIG. 40 is a flowchart showing procedures in the process of running control of a vehicle in the tenth embodiment.

FIG. 40 is a flowchart showing procedures in the process of running control of the vehicle 100$v$ in the tenth embodiment. The flow shown in FIG. 40 is repeated, for example, every predetermined time from the time point at which the running of the vehicle 100 by unmanned driving is started.

In step S121, the position acquisition unit 117 acquires vehicle location information using detection result output from the external camera 300 as an external sensor. In step S122, the signal generation unit 118 determines a target location to which the vehicle 100$v$ is to move next. In step S123, the signal generation unit 118 generates a running control signal for causing the vehicle 100$v$ to run to the determined target location. In step S124, the vehicle control unit 115$v$ controls the actuator group 120 using the generated running control signal, thereby causing the vehicle 100$v$ to run by following a parameter indicated by the running control signal. The processor 111$v$ repeats the acquisition of vehicle location information, the determination of a target location, the generation of a running control signal, and the control over the actuator in a predetermined cycle. According to the information processing system 50$v$ in the present embodiment, it is possible to cause the vehicle 100$v$ to run by autonomous control without controlling the vehicle 100$v$ remotely using the information processing device 200$v$.

K. ALTERNATIVE EMBODIMENTS

K-1. Alternative Embodiment 1

At least some of the functions of the information processing devices 200, 200$a$ to 200$h$, 200$v$ may be implemented as a function of the vehicle control device 110, 110$v$ or a function of the external camera 300. For example, if all of the functions of the information processing devices 200, 200$a$ to 200$h$, 200$v$ are implemented by the external camera 300, the information processing devices 200, 200$a$ to 200$h$, 200$v$ can acquire the coordinate values Cr1 to Cr4, Cb1 to Cb8 in the camera coordinate system without using the camera identifier.

K-2. Alternative Embodiment 2

The memories 202, 202$a$ to 202$h$, 202$v$ of the information processing devices 200, 200$a$ to 200$h$, 200$v$ may store a single machine learning model DM commonly used for the captured images Im1 to Im4 respectively acquired by the plurality of external cameras 300. Also in such an embodiment, it is possible to suppress the decrease in accuracy of the machine learning model DM when the appearance state in the imaging range of some of the plurality of external cameras 300 has changed from the appearance state at the time when machine learning model DM was trained.

K-3. Alternative Embodiment 3

When the training process is completed and when the accuracy is equal to or greater than the threshold when captured images Im1 to Im4 acquired by some of the plurality of external cameras 300 are input to the trained machine learning model DM, the control information acquisition units 116, 214, 214$a$ to 214$h$ may acquire control information by inputting the captured images Im1 to Im4 to the trained machine learning model DM. In other words, if the ratio of the number of captured images Im1 to Im4 for which the post-training accuracy is equal to or greater than a threshold to the total number of the plurality of captured images Im1 to Im4 used to calculate the post-training accuracy is 100 percent, the control information acquisition units 116, 214, 214$a$ to 214$h$ may acquire control information by inputting the captured images Im1 to Im4 to the trained machine learning model DM. Such an embodiment also makes it possible to suppress the decrease in accuracy of the control information acquired using the captured images Im1 to Im4 acquired by some of the plurality of external cameras 300.

K-4. Alternative Embodiment 4

The transmission unit 217 of each of the information processing devices 200, 200$a$ to 200$h$ may transmit a running control signal, which is different from a reference control signal, to the vehicle 100 when captured images Im1 to Im4 to be used as the training images Ti in the training process are acquired. The reference control signal is either a running control signal acquired by the control information acquisition unit 214$f$ or a running control signal generated from the signal generation parameter acquired by the control information acquisition units 214, 214$a$ to 214$e$, 214$g$, 214$h$. For example, when the captured images Im1 to Im4 to be used as the training images Ti in the training process are acquired, the transmission unit 217 may transmit the following running control signal to the vehicle 100 in order to acquire clearer captured images Im1 to Im4 with less blur. In this case, the transmission unit 217 transmits to the vehicle 100, for example, a running control signal for allowing the vehicle 100 to run at an acceleration smaller than the acceleration indicated by the reference control signal. In such an embodiment, it is possible to easily generate clearer training images Ti with less blur. In addition, when the captured images Im1 to Im4 to be used as the training images Ti in the training process are acquired, the transmission unit 217 may transmit the following running control signal to the vehicle 100 in order to increase the number of captured images Im1 to Im4 that can be acquired within a certain period of time. In this case, the transmission unit 217 transmits to the vehicle 100, for example, a running control signal for allowing the vehicle 100 to run at an acceleration larger than the acceleration indicated by the reference control signal. In such an embodiment, it is possible to acquire a larger number of captured images Im1 to Im4 within a certain period of time. Further, when the captured images Im1 to Im4 to be used as the training images Ti in the training process are acquired, the transmission unit 217 may transmit the following running control signal to the vehicle 100 in order to acquire captured images Im1 to Im4 including a plurality of vehicles 100 with different orientations. In this case, the transmission unit 217 transmits to the vehicle 100, for example, a running control signal for allowing the vehicle 100 to run at a steering angle different from the steering angle indicated by the reference control signal. In such an embodiment, it is possible to easily generate a plurality of training images Ti varied in orientation of the vehicles 100 with respect to the pathway TR. In addition, if there are two or more routes where the vehicle 100 can run, the transmission unit 217 may transmit the following running control signal to the vehicle 100. In this case, the transmission unit 217 transmits to the vehicle 100 a running control signal generated using a reference route RR different from the reference route RR used to generate the reference control signal. In such an embodiment, it is possible to increase the number of the vehicles 100 run on the pathway TR included in the imaging range targeted in the training process. With the structures described above, the information processing devices 200, 200a to 200h can reduce the burden required for the preparation of the training image Ti or make it easier to generate a desired training image Ti by transmitting to the vehicle 100 a running control signal different from the reference control signal.

K-5. Alternative Embodiment 5

In each of the above-described embodiments from the first embodiment to ninth embodiment, the information processing devices 200, 200a-200h perform the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The information processing devices 200, 200a-200h may acquire vehicle location information, determine a target location to which the vehicle 100 is to move next, and generate a route from a current location of the vehicle 100 indicated by the acquired vehicle location information to the target location. The information processing devices 200, 200a-200h may generate a route to the target location between the current location and a destination or generate a route to the destination. The information processing devices 200, 200a-200h may transmit the generated route to the vehicle 100. The vehicle 100 may generate a running control signal in such a manner as to cause the vehicle 100 to run along the route received from the information processing devices 200, 200a-200h and control the actuator group 120 using the generated running control signal.

(2) The information processing devices 200, 200a-200h may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control the actuator group 120 using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. The internal sensors can include, for example, sensors that detect the state of motion of the vehicle 100, the state of operation of various parts of the vehicle 100, and the environment surrounding the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the information processing devices 200, 200a-200h may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

K-6. Alternative Embodiment 6

In the tenth embodiment described above, the vehicle 100v may be provided with an internal sensor, and detection results output from the internal sensor may be used for at least one of the generation of the route and the generation of the running control signal. For example, the vehicle 100v may acquire the detection result of the internal sensor, and reflect the detection result of the internal sensor to the route when the route is generated. The vehicle 100v may acquire the detection result of the internal sensor, and reflect the detection result of the internal sensor to the running control signal when the running control signal is generated.

K-7. Alternative Embodiment 7

In the tenth embodiment described above, the vehicle 100v acquires vehicle location information using detection result from the external sensor which is a sensor located outside of the vehicle 100v. By contrast, the vehicle 100v may be equipped with an internal sensor, the vehicle 100v may acquire vehicle location information using detection result from the internal sensor, determine a target location to which the vehicle 100v is to move next, generate a route from a current location of the vehicle 100v indicated by the acquired vehicle location information to the target location, generate a running control signal for running along the generated route, and control the actuator group 120 using the generated running control signal. In this case, the vehicle 100v is capable of running without using any detection result from an external sensor. The vehicle 100v may acquire target arrival time or traffic congestion information from outside the vehicle 100v and reflect the target arrival time or traffic congestion information in at least one of the route and the running control signal.

K-8. Alternative Embodiment 8

In each of the above-described embodiments from the first embodiment to ninth embodiment, the information processing devices 200, 200a-200h automatically generate a running control signal to be transmitted to the vehicle 100. By contrast, the information processing devices 200, 200a-200h may generate a running control signal to be transmitted to the vehicle 100 in response to operation by an external operator existing outside the vehicle 100. For example, the external operator may operate an operating device including a display on which a captured images Im1 to Im4 output from the external sensor is displayed, steering, an accelerator pedal, and a brake pedal for operating the vehicle 100 remotely, and a communication device for making communication with the information processing devices 200, 200a-200h through wire communication or wireless communication, for example, and the information processing devices 200, 200a-200h may generate a running control signal responsive to the operation on the operating device.

K-9. Alternative Embodiment 9

In each of the above-described embodiments, the vehicles 100, 100v are simply required to have a configuration to become movable by unmanned driving. The vehicle 100 may embodied as a platform having the following configuration, for example. The vehicles 100, 100v are simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicles 100, 100v. In order for the vehicles 100, 100v to acquire information from outside for unmanned driving, the vehicles 100, 100v are simply required to include the communication device further. Specifically, the vehicles 100, 100v to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicles 100, 100v before the vehicle 100 is shipped from the factory FC, or a remaining component such as a bodyshell may be mounted on the vehicles 100, 100v after the vehicles 100, 100v are shipped from the factory FC while the remaining component such as a bodyshell is not mounted on the vehicles 100, 100v. Each of components may be mounted on the vehicles 100, 100v from any direction such as from above, from below, from the front, from the back, from the right, or from the left. Alternatively, these components may be mounted from the same direction or from respective different directions. The location determination for the platform may be performed in the same way as for the vehicles 100, 100v in each of the above embodiments.

K-10. Alternative Embodiment 10

The vehicle 100, 100v may be produced by combining a plurality of modules. The "module" refers to a unit including a plurality of parts that are grouped together according to the site or function of the vehicles 100, 100v. For example, a platform of the vehicles 100, 100v may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicles 100, 100v different from the platform may be modularized. Various modules may include an arbitrary exterior component such as a bumper or a grill, or an arbitrary interior component such as a seat or a console. Not only the vehicles 100, 100v but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

K-11. Alternative Embodiment 11

A configuration for realizing running of the vehicles 100, 100v by unmanned driving is also called a "Remote Control auto Driving system". Conveying the vehicles 100, 100v using Remote Control Auto Driving system is also called "self-running conveyance". Producing the vehicle s 100, 100v using self-running conveyance is also called "self-running production". In self-running production, for example, at least part of the conveyance of vehicles 100, 100v is realized by self-running conveyance in a factory where the vehicle is manufactured.

K-12. Alternative Embodiment 12

In each of the embodiments described above, some or all of the functions and processes that are implemented by software may also be implemented by hardware. Further, some or all of the functions and processes that are implemented by hardware may also be implemented by software. Examples of the hardware used to implement various functions in each of the embodiments described above include various circuits, such as integrated circuits and discrete circuits.

The present disclosure is not limited to the embodiments described above, but can be realized in various configurations without departing from the spirit thereof. For example, the technical features of the embodiments corresponding to the technical features in each of the aspects stated in the Summary may be replaced or combined as appropriate to solve some or all of the problems described above or to achieve some or all of the effects described above. Further, if the technical feature is not described as essential in this specification, the technical feature may be deleted as appropriate. The present disclosure may be implemented by aspects described below.

(1) According to a first aspect of the present disclosure, an information processing device is provided. An information processing device used to move a moving object that is capable of moving by unmanned driving includes an accuracy acquisition unit, a training data acquisition unit, and a training unit. The accuracy acquisition unit acquires, when a captured image acquired by imaging the moving object by an external cameras provided in places different from a place of the moving object is input, an accuracy of a machine learning model that outputs at least one of a control signal for defining operation of the moving object to move the moving object by the unmanned driving and a parameter used in generating the control signal. The training data acquisition unit acquires a training data group used to train the machine learning model when the accuracy is less than a predetermined threshold. The training unit performs a training process for training the machine learning model using the acquired training data group. The training data group includes one or more training data sets in which a training image is associated with a correct answer label, the training image including a background image representing a target region including a pathway on which the moving object moves and a surrounding area of the pathway and a moving object image representing the moving object. According to the above aspect, the information processing device can train the machine learning model using the acquired training data set when the accuracy of the machine learning model is less than a threshold. In this way, when the appearance state of the imaging range of the external camera has changed from the appearance state at the time when the machine learning model was trained, it is possible to suppress the decrease in accuracy of the machine learning model.

(2) The information processing device according to the above aspect may be such that the external camera is provided in a plurality. The machine learning model is trained in advance using an initial training data group. The training data acquisition unit may acquire an additional training data group as the training data group used to perform additional training of the machine learning model when the accuracy is less than the threshold when the captured image acquired by one or more of the plurality of the external cameras is input to the machine learning model. The training unit may perform an additional training process for additional training of the machine learning model using the acquired additional training data group. The initial training data group may include a plurality of initial training data sets in which a training image including the background image corresponding to the imaging range and the moving object image is associated with a correct answer label, the plurality of initial training data sets respectively corresponding to imaging ranges of the plurality of external cameras. The additional training data group may include one or more additional training data sets in which the training image is associated with the correct answer label, the training image including the background image corresponding to the imaging range of the external camera that acquired the captured image for which the accuracy is less than the threshold and the moving object image. According to the above aspect, a machine learning model, which has been trained in advance using a plurality of initial training data sets that correspond to the respective imaging ranges of the plurality of external cameras, is prepared. In each initial training data set, a training image including a background image corresponding to each imaging range and a moving object image is associated with a correct answer label. The information processing device can perform the following process if the accuracy is less than a threshold when captured images acquired by some of the plurality of external cameras are input to the trained machine learning model. In this case, the information processing device can perform additional training for the machine learning model using an additional training data set in which a training image including a background image corresponding to the imaging range of the external camera that acquired the captured images for which the accuracy is less than a threshold and a moving object image is associated with a correct answer label. In this way, it is possible to suppress the decrease in accuracy of the machine learning model when the appearance state in the imaging range of some of the plurality of external cameras has changed from the appearance state at the time when the machine learning model was trained.

(3) The information processing device according to the above aspect may be such that the external camera is provided in a plurality. The machine learning model is trained in advance using an initial training data group. The training data acquisition unit may acquire a new training data group as the training data group used to perform new training of a machine learning model different from the machine learning model when the accuracy is less than the threshold when the captured image acquired by one or more of the plurality of the external cameras is input to the machine learning model. The training unit may perform a new training process for training the new machine learning model using the acquired new training data group. The initial training data group may include a plurality of initial training data sets in which a training image including the background image corresponding to the imaging range and the moving object image is associated with a correct answer label, the plurality of initial training data sets respectively corresponding to imaging ranges of the plurality of external cameras. The new training data group may include one or more new training data sets in which the training image is associated with the correct answer label, the training image including the background image corresponding to the imaging range of the external camera that acquired the captured image for which the accuracy is less than the threshold and the moving object image. According to the above aspect, a machine learning model, which has been trained in advance using a plurality of initial training data sets that correspond to the respective imaging ranges of the plurality of external cameras, is prepared. In each initial training data set, a training image including a background image corresponding to each imaging range and a moving object image is associated with a correct answer label. The information processing device can perform the following process if the accuracy is less than a threshold when captured images acquired by some of the plurality of external cameras are input to the trained machine learning model. In this case, the information processing device can perform new training for the machine learning model using a new training data set in which a training image including a background image corresponding to the imaging range of the external camera that acquired the captured images for which the accuracy is less than a threshold and a moving object image is associated with a correct answer label. In this way, it is possible to suppress the decrease in accuracy of the machine learning model when the appearance state in the imaging range of some of the plurality of external cameras has changed from the appearance state at the time when the machine learning model was trained.

(4) The information processing device according to the above aspect may be such that the training image is at least one of the captured image and a composite image. The composite image may be generated by combining the background image, which is one of a real background image acquired by imaging the target region by the external camera and a virtual background image generated by virtually reproducing the target region, with a virtual moving object image generated by virtually reproducing the moving object. According to the above aspect, the information processing device can use a composite image generated by combining a virtual moving object image with a background image, which is either a real background image or a virtual background image, as the training image used for training the machine learning model.

(5) The information processing device according to the above aspect may further include an appearance acquisition unit that acquires appearance information indicating an appearance state of the moving object. The training unit may perform the training process using the virtual moving object image generated by virtually reproducing the moving object having the appearance state specified by the appearance information. According to the above aspect, the information processing device can train the machine learning model using a training image including a virtual moving object image that virtually reproduces the moving object with an appearance state specified by the appearance information. In this way, upon the training of the machine learning model, it is possible to allow the machine learning model to learn the feature quantity according to the appearance state of the targeted moving object. This improves the accuracy of the machine learning model.

(6) The information processing device according to the above aspect may be such that the training unit performs the training process during a period when control of the unmanned driving is performed. According to the above aspect, the information processing device can perform a training process for training the machine learning model during the period when the moving object is performing control of unmanned driving.

(7) The information processing device according to the above aspect may further include a control information acquisition unit that acquires control information, which is at least one of the control signal and the parameter, by inputting the captured image to the machine learning model. When the training process is completed, the control information acquisition unit may acquire the control information by inputting the captured image to the machine learning model that has been trained by the training process. According to the above aspect, when the training process is completed, the information processing device can acquire control information by inputting captured images to the machine learning that has been trained by the training process. This makes it possible to suppress the decrease in accuracy of the control information acquired using the captured images acquired by some of the plurality of external cameras.

(8) The information processing device according to the above aspect may further include a control information acquisition unit that acquires control information, which is at least one of the control signal and the parameter, by inputting the captured image to the machine learning model. The accuracy acquisition unit may further acquire an accuracy of the machine learning model that has been trained by the training process. When the training process is completed and the accuracy of the machine learning model that has been trained by the training process is equal to or greater than the threshold, the control information acquisition unit may acquire the control information by inputting the captured image to the machine learning model that has been trained by the training process. According to the above aspect, when the training process is completed and the accuracy of the machine learning model that has been trained by the training process is equal to or greater than the threshold, the information processing device can acquire control information by inputting captured images to the machine learning that has been trained by the training process. This makes it possible to further suppress the decrease in accuracy of the control information acquired using the captured images acquired by some of the plurality of external cameras.

(9) The information processing device according to the above aspect may be such that the accuracy acquisition unit acquires the accuracy of the machine learning model that has been trained by the training process using a plurality of the captured images acquired by imaging the moving object that moves behind the moving object included in the training image by the external camera. When a ratio of a number of the captured images for which the accuracy of the machine learning model that has been trained by the training process is equal to or greater than the threshold to the total number of the plurality of captured images used to calculate the accuracy of the machine learning model that has been trained by the training process is equal to or greater than a reference value, the control information acquisition unit may acquire the control information by inputting the captured images to the machine learning model that has been trained by the training process. According to the above aspect, when a ratio of the number of captured images for which the accuracy of the machine learning model that has been trained by the training process is equal to or greater than the threshold to the total number of the plurality of captured images used to calculate the accuracy of the machine learning model that has been trained by the training process is equal to or greater than a reference value, the information processing device can acquire control information by inputting the captured images to the machine learning model that has been trained by the training process. This makes it possible to further ensure suppression of decrease in accuracy of the control information acquired using the captured images acquired by some of the plurality of external cameras.

(10) The information processing device according to the above aspect may further include a control information acquisition unit and a transmission unit. The control information acquisition unit may acquire control information, which is at least one of the control signal and the parameter, by inputting the captured image to the machine learning model. The transmission unit may transmit the control signal to the moving object. The training image may be the captured image acquired by the external camera by imaging the moving object on which control of the unmanned driving is performed. When the captured image to be used as the training image in the training process is acquired, the transmission unit may transmit, to the moving object, the control signal different from the control signal acquired by the control information acquisition unit and the control signal generated from the parameter acquired by the control information acquisition unit. According to the above aspect, the information processing device can transmit, to the moving object, a control signal, which is different from the control signal acquired using the machine learning model and the control signal generated from the parameter acquired using the machine learning model. This reduces the burden required for the preparation of training images or make it easier to generate desired training images.

(11) According to a second aspect of the present disclosure, an information processing system is provided. An information processing system used to move a moving object that is capable of moving by unmanned driving includes a moving object, a plurality of external cameras provided in places different from a place of the moving object, and the information processing device according to the above aspects. According to the above aspect, the information processing system can train the machine learning model using the acquired training data set when the accuracy of the machine learning model is less than a threshold. In this way, when the appearance state of the imaging range of the external camera has changed from the appearance state at the time when the machine learning model was trained, it is possible to suppress the decrease in accuracy of the machine learning model.

(12) According to a third aspect of the present disclosure, an information processing method is provided. An information processing method used to move a moving object that is capable of moving by unmanned driving includes an accuracy acquisition step, a training data acquisition step, and a training step. The accuracy acquisition step includes acquiring, when a captured image acquired by imaging the moving object by an external camera provided in places different from a place of the moving object is input, an accuracy of a machine learning model that outputs at least one of a control signal for defining operation of the moving object to move the moving object by the unmanned driving and a parameter used in generating the control signal. The training data acquisition step includes acquiring a training data group used to train the machine learning model when the accuracy is less than a predetermined threshold. The training step includes performing a training process for training the machine learning model using the acquired training data group. The training data group includes one or more training data sets in which a training image is associated with a correct answer label, the training image including a background image representing a target region including a pathway on which the moving object moves and a surrounding area of the pathway and a moving object image representing the moving object. According to the above aspect, it is possible to train the machine learning model using the acquired training data set when the accuracy of the machine learning model is less a threshold. In this way, when the appearance state of the imaging range of the external camera has changed from the appearance state at the time when the machine learning model was trained, it is possible to suppress the decrease in accuracy of the machine learning model.

The present disclosure can be realized in various aspects other than the information processing device, the information processing system, and the information processing method described above. For example, the present disclosure may be embodied in aspects of methods for producing an information processing device, an information processing system, and a moving object, control methods for an information processing device, an information processing system, and a moving object, computer programs that execute the control methods, as well as non-transitory storage mediums storing the computer programs, and the like.

What is claimed is:

1. An information processing device used to move a moving object that is capable of moving by unmanned driving, comprising:

an accuracy acquisition unit that acquires, when a captured image acquired by imaging the moving object by an external camera provided in places different from a place of the moving object is input, an accuracy of a machine learning model that outputs at least one of a control signal for defining operation of the moving object to move the moving object by the unmanned driving and a parameter used in generating the control signal;

a training data acquisition unit that acquires a training data group used to train the machine learning model when the accuracy is less than a predetermined threshold; and a training unit that performs a training process for training the machine learning model using the acquired training data group, wherein the training data group includes one or more training data sets in which a training image is associated with a correct answer label, the training image including a background image representing a target region including a pathway on which the moving object moves and a surrounding area of the pathway and a moving object image representing the moving object.

2. The information processing device according to claim 1, wherein the external camera is provided in a plurality, the machine learning model is trained in advance using an initial training data group, the training data acquisition unit acquires an additional training data group as the training data group used to perform additional training of the machine learning model when the accuracy is less than the threshold when the captured image acquired by one or more of the plurality of the external cameras is input to the machine learning model, the training unit performs an additional training process for additional training of the machine learning model using the acquired additional training data group, the initial training data group includes a plurality of initial training data sets in which a training image including the background image corresponding to the imaging range and the moving object image is associated with a correct answer label, the plurality of initial training data sets respectively corresponding to imaging ranges of the plurality of external cameras, and the additional training data group includes one or more additional training data sets in which the training image is associated with the correct answer label, the training image including the background image corresponding to the imaging range of the external camera that acquired the captured image for which the accuracy is less than the threshold and the moving object image.

3. The information processing device according to claim 1, wherein the external camera is provided in a plurality, the machine learning model is trained in advance using an initial training data group, the training data acquisition unit acquires a new training data group as the training data group used to perform new training of a machine learning model different from the machine learning model when the accuracy is less than the threshold when the captured image acquired by one or more of the plurality of the external cameras is input to the machine learning model, the training unit performs a new training process for training the new machine learning model using the acquired new training data group, the initial training data group includes a plurality of initial training data sets in which a training image including the background image corresponding to the imaging range and the moving object image is associated with a correct answer label, the plurality of initial training data sets respectively corresponding to imaging ranges of the plurality of external cameras, and the new training data group includes one or more new training data sets in which the training image is associated with the correct answer label, the training image including the background image corresponding to the imaging range of the external camera that acquired the captured image for which the accuracy is less than the threshold and the moving object image.

4. The information processing device according to claim 1, wherein the training image is at least one of the captured image and a composite image, and the composite image is generated by combining the background image, which is one of a real background image acquired by imaging the target region by the external camera and a virtual background image generated by virtually reproducing the target region, with a virtual moving object image generated by virtually reproducing the moving object.

5. The information processing device according to claim 4, further comprising an appearance acquisition unit that acquires appearance information indicating an appearance state of the moving object, wherein the training unit performs the training process using the virtual moving object image generated by virtually reproducing the moving object having the appearance state specified by the appearance information.

6. The information processing device according to claim 1, wherein the training unit performs the training process during a period when control of the unmanned driving is performed.

7. The information processing device according to claim 1, further comprising a control information acquisition unit that acquires control information, which is at least one of the control signal and the parameter, by inputting the captured image to the machine learning model, wherein, when the training process is completed, the control information acquisition unit acquires the control information by inputting the captured image to the machine learning model that has been trained by the training process.

8. The information processing device according to claim 1, further comprising a control information acquisition unit that acquires control information, which is at least one of the control signal and the parameter, by inputting the captured image to the machine learning model, wherein the accuracy acquisition unit further acquires an accuracy of the machine learning model that has been trained by the training process, and when the training process is completed and the accuracy of the machine learning model that has been trained by the training process is equal to or greater than the threshold, the control information acquisition unit acquires the control information by inputting the captured image to the machine learning model that has been trained by the training process.

9. The information processing device according to claim 8, wherein the accuracy acquisition unit acquires the accuracy of the machine learning model that has been trained by the training process using a plurality of the captured images acquired by imaging the moving object that moves behind the moving object included in the training image by the external camera, and when a ratio of a number of the captured images for which the accuracy of the machine learning model that has been trained by the training process is equal to or greater than the threshold to the total number of the plurality of captured images used to calculate the accuracy of the machine learning model that has been trained by the training process is equal to or greater than a reference value, the control information acquisition unit acquires the control information by inputting the captured images to the machine learning model that has been trained by the training process.

10. The information processing device according to claim 1, further comprising:

a control information acquisition unit that acquires control information, which is at least one of the control signal and the parameter, by inputting the captured image to the machine learning model; and a transmission unit that transmits the control signal to the moving object, wherein the training image is the captured image acquired by the external camera by imaging the moving object on which control of the unmanned driving is performed, and when the captured image to be used as the training image in the training process is acquired, the transmission unit transmits, to the moving object, the control signal different from the control signal acquired by the control information acquisition unit and the control signal generated from the parameter acquired by the control information acquisition unit.

11. An information processing system used to move a moving object that is capable of moving by unmanned driving, comprising:

a moving object;

a plurality of external cameras provided in places different from a place of the moving object; and the information processing device according to claim 1.

12. An information processing method used to move a moving object that is capable of moving by unmanned driving, comprising:

an accuracy acquisition step of acquiring, when a captured image acquired by imaging the moving object by one or more external cameras provided in places different from a place of the moving object is input, an accuracy of a machine learning model that outputs at least one of a control signal for defining operation of the moving object to move the moving object by the unmanned driving and a parameter used in generating the control signal;

a training data acquisition step of acquiring a training data group used to train the machine learning model when the accuracy is less than a predetermined threshold; and a training step of performing a training process for training the machine learning model using the acquired training data group, wherein the training data group includes one or more training data sets in which a training image is associated with a correct answer label, the training image including a background image representing a target region including a pathway on which the moving object moves and a surrounding area of the pathway and a moving object image representing the moving object.

* * * * *